United States Patent
Kato et al.

(10) Patent No.: US 8,124,224 B2
(45) Date of Patent: Feb. 28, 2012

(54) ANTIREFLECTION LAMINATE, POLARIZING PLATE AND IMAGE DISPLAY DEVICE

(75) Inventors: Shinya Kato, Minami-Ashigara (JP); Hiroyuki Yoneyama, Minami-Ashigara (JP); Naohiro Matsunaga, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 97 days.

(21) Appl. No.: 12/044,635

(22) Filed: Mar. 7, 2008

(65) Prior Publication Data

US 2008/0239486 A1 Oct. 2, 2008

(30) Foreign Application Priority Data

Mar. 8, 2007 (JP) ................................ P2007-058223

(51) Int. Cl.
*B32B 5/16* (2006.01)
(52) U.S. Cl. ......................................................... 428/323
(58) Field of Classification Search .................... 428/323
See application file for complete search history.

(56) References Cited

U.S. PATENT DOCUMENTS

| | | | |
|---|---|---|---|
| 2002/0040069 A1* | 4/2002 | Yokota et al. | 521/99 |
| 2002/0085284 A1* | 7/2002 | Nakamura et al. | 359/601 |
| 2006/0153979 A1* | 7/2006 | Asakura et al. | 427/164 |
| 2009/0021834 A1* | 1/2009 | Iwata et al. | 359/580 |

FOREIGN PATENT DOCUMENTS

| | | |
|---|---|---|
| JP | 2005-316450 A | 11/2005 |
| WO | WO 2006088204 A1 * | 8/2006 |

OTHER PUBLICATIONS

Oxford English Dictionary—adjacent definition, 1989, Oxford University Press, second edition.*

* cited by examiner

*Primary Examiner* — Callie Shosho
*Assistant Examiner* — Elizabeth Robinson
(74) *Attorney, Agent, or Firm* — Birch, Stewart, Kolasch & Birch, LLP

(57) ABSTRACT

An antireflection laminate includes a support; a layer having hardcoat property; an overcoat layer; and a low refractive index layer, wherein at least one layer of the layer having hardcoat property and the overcoat layer comprises a metal oxide particle, and the antireflection laminate has a surface haze value of 0 to 12%, an internal haze value of 0 to 60%, and a Sm value of 40 to 200 μm.

13 Claims, 4 Drawing Sheets

ANTIREFLECTION LAMINATE, POLARIZING PLATE AND IMAGE DISPLAY DEVICE

BACKGROUND OF THE INVENTION

1. Field of the Invention

The present invention relates to an antireflection laminate, a polarizing plate and an image display device.

2. Description of the Related Art

In various image display devices such as liquid crystal display device (LCD), plasma display panel (PDP), electroluminescent display (ELD), cathode ray tube display device (CRT), field emission display (FED) and surface-conduction electron-emitter display (SED), an antireflection laminate (antireflection film) is disposed on the display surface so as to prevent the reduction in contrast due to reflection of outside light or external image. Also, a light-diffusing sheet is used on the backlight side of a liquid crystal display device. The antireflection film is used on the outermost surface of a display and therefore, required to satisfy various film strengths, for example, scratch resistance against fine scratches and film hardness high enough to endure the pressure on writing with a writing tool.

In recent years, with the expansion of display market as represented by LCD, PDP and the like and the growing in display size, the antiglare laminate disposed on the outermost surface of a display is also required to be improved in the antiglare and other properties. In particular, there are demanded, for example, 1) an improvement of contrast, 2) an enhancement of sharpness of transmitted image, 3) a reduction in character blurring and 4) an enhancement of pitch-black looking (dense black appearance) when the display is displayed in black.

Also, the growing in size of the display involves a requirement to increase the size of the antiglare laminate itself used as a surface element of the display, but in some cases, the visibility as a display body is somewhat decreased due to a physical change (e.g., unevenness) of the antiglare laminate caused by the increase in size.

The visibility reduction due to the increase in size of the antiglare laminate can be overcome by enhancing the antiglare performance of the antiglare laminate, but it is difficult to satisfy the requirement for improvements 1) to 4) above. That is, the enhancement of antiglare property is generally considered to be in a contradictory relationship with the requirement for improvements 1) to 4) above. An antiglare laminate satisfying both of these contradictory requirements is demanded to be developed.

For satisfying all of the improvements 1) to 4) above, there is proposed a method where fine particles are aggregated by fives or more in a layer having hardcoat property to create a desired irregularity shape on the outermost surface of the layer having hardcoat property and a surface adjusting layer is formed for adjusting the irregular surface of the layer having hardcoat property and where the fine irregularities present along the irregularity shape can be filled and smoothed by the surface adjusting layer on a scale of 1/10 or less of the irregularity scale (peak height and peak-to-peak distance of irregularities) in the surface roughness forming the irregularity shape to form smooth irregularities and thereby the peak-to-peak distance and peak height of irregularities and the frequency (number) of peaks can be adjusted (JP-A-2005-316450 (the term "JP-A" as used herein means an "unexamined published Japanese patent application")). However, this method is not sufficient in the effect of realizing dense black appearance or preventing reflection of outside light or external image, and improvements are demanded.

Furthermore, with the growing in size of the display, enhancement of display quality is recently demanded. The reflection on the outermost surface of a display is reduced with an attempt to realize denser black appearance or more successfully prevent the reflection of outside light or exterior image. However, the reduction in reflection makes it difficult to realize a homogeneous surface state (for example, no unevenness and no point defect). More specifically, the visibility of surface state is increased due to reduction in reflection and this requires higher coating precision and leads to difficulty in obtaining a homogeneous surface state. The visibility means that those less visible by virtue of high reflectance when the reflectance is high are clearly viewed as a result of reduction in the reflectance.

JP-A-2005-316450 discloses a technique of forming surface irregularities (irregularities having a large curvature; irregularities mainly affecting the reflecting property) by spherical particles, where irregularities having smooth undulation are formed, whereby reflection of outside light or exterior image is reduced and reduction in the refractive index becomes difficult.

SUMMARY OF THE INVENTION

In the present invention, surface irregularities (peaky irregularities; irregularities mainly affecting the reflecting property) are formed by a cohesive metal oxide particle, whereby reduction in the refractive index can be achieved with a small change in the irregularity shape, that is, without greatly changing the reflecting property. Also, filling (smoothing) designed as follows is applied to fine irregularities mainly affecting the dense black appearance:

at least one layer of the layer having hardcoat property and the overcoat layer comprises a metal oxide particle and an organic resin particle, and an average secondary particle diameter of the metal oxide particle is larger than an average particle diameter of the organic resin, the refractive index of the overcoat layer is from 1.48 to 1.65 and assuming that the ten-point average roughness of the layer having a hardcoat property is Rz(HC) and the film thickness of the overcoat layer is t(OC), the following formula (I) is satisfied:

$$0.1 Rz(HC) < t(OC) < 3 Rz(HC) \quad (I)$$

or the surface free energy of the overcoat layer is from 20 to 45 mJ/m$^2$, whereby the dense black appearance can be effectively improved.

The present invention provides an antireflection laminate improved in at least one of reduced reflection, scratch resistance, dense black appearance and less reflection of outside light or exterior image, and a polarizing plate and an image display device each using the laminate.

The present invention is as follows.

<1> An antireflection laminate comprising:
a support;
a layer having hardcoat property;
an overcoat layer; and
a low refractive index layer,
wherein
at least one layer of the layer having hardcoat property and the overcoat layer comprises a metal oxide particle, and
the antireflection laminate has a surface haze value of 0 to 12%, an internal haze value of 0 to 60%, and a Sm value of 40 to 200 μm.

<2> The antireflection laminate as described in <1>, wherein the metal oxide particle is a cohesive metal oxide particle and has an average secondary particle diameter of 1 to 10 μm.

<3> The antireflection laminate as described in <1> or <2>, which has an integrated reflectance of 2.0% or less.

<4> The antireflection laminate as described in any one of <1> to <3>, wherein
at least one layer of the layer having hardcoat property and the overcoat layer comprises a metal oxide particle and an organic resin particle, and
an average secondary particle diameter of the metal oxide particle is larger than an average particle diameter of the organic resin particle.

<5> The antireflection laminate as described in any one of <1> to <4>, wherein
the overcoat layer has a refractive index of 1.48 to 1.65 and satisfies a following formula (I):

$$0.1 Rz(HC) < t(OC) < 3 Rz(HC) \qquad (I)$$

wherein
Rz(HC) represents a ten-point average roughness of the layer having hardcoat property, and
t(OC) represents a film thickness of the overcoat layer.

<6> The antireflection laminate as described in any one of <1> to <5>, wherein
the overcoat layer satisfies a following formula (II):

$$0.1 Rz(HC) < Rz(OC) < 1 Rz(HC) \qquad (II)$$

wherein
Rz(HC) represents a ten-point average roughness of the layer having hardcoat property, and
Rz(OC) represents a ten-point average roughness of the overcoat layer.

<7> The antireflection laminate as described in any one of <1> to <6>, wherein
the overcoat layer has a surface free energy of 20 to 45 mJ/m².

<8> The antireflection laminate as described in any one of <1> to <7>, wherein
the low refractive index layer is formed by coating a low refractive index coating composition that comprises a heat-curable and/or ionizing radiation-curable resin component.

<9> The antireflection laminate as described in <8>, wherein
the low refractive index coating composition comprises a fluorine-containing resin component.

<10> The antireflection laminate as described in <8> or <9>, wherein
the low refractive index coating composition comprises a solvent having a boiling point of 120° C. or more in an amount of 3 to 50 mass % based on a total amount of the low refractive index coating composition.

<11> The antireflection laminate as described in any one of <1> to <10>, wherein
the low refractive index layer comprises an inorganic fine particle having an average particle diameter of 5 to 200 nm.

<12> The antireflection laminate as described in <1>, wherein
the inorganic fine particle has, in at least either an inside or a surface thereof, a pore having an average pore diameter of 0.01 to 90 nm.

<13> The antireflection laminate as described in any one of <1> to <12>, wherein
the overcoat layer comprises at least one kind of a fluorine-based leveling agent and/or at least one kind of a silicone-based leveling agent.

<14> The antireflection laminate as described in any one of <1> to <13>, wherein
the overcoat layer is a layer formed by coating a overcoat layer coating composition that comprises:
a silane coupling agent represented by a following formula (a); and/or
a hydrolysate of the silane coupling agent and a condensation reaction product of the hydolysate:

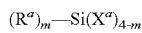

$$(R^a)_m—Si(X^a)_{4-m} \qquad \text{Formula (a)}$$

wherein
each of $X^a$('s) independently represents a substituent that is selected from the group consisting of an unsubstituted alkyl group, a hydroxyl group and a hydrolyzable group,
each of $R^a$('s) independently represents a substituent that is selected from the group consisting of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, an acylamino group and an isocyanate group, and that may be further substituted, and
m represents an integer of 1 to 3.

<15> A polarizing plate comprising:
a polarizing film; and
protective films provided on both sides of the polarizing film,
wherein at least one of the protective films is the antireflection laminate as described in any one of <1> to <14>.

<16> An image display device comprising:
the antireflection laminate as described in any one of <1> to <14> or the polarizing plate as described in <15> on a viewing side of a display screen of the image display device.

In the present invention, the following embodiments are also preferred.

<17> The antireflection laminate as described in <9>, wherein
the heat-curable and/or ionizing radiation-curable resin component is a resin component comprising a hydroxyl group.

<18> The antireflection laminate as described in <9>, wherein
the heat-curable and/or ionizing radiation-curable resin component is a resin composition comprising at least one of a fluorine-containing vinyl monomer polymerization unit, a hydroxyl group-containing vinyl monomer polymerization unit and a polysiloxane structure.

<19> The antireflection laminate as described in < > or <9>, wherein
the heat-curable and/or ionizing radiation-curable resin component comprises:
(A) at least either a hydrolysate of or a condensation reaction product of an organosilane having a mass average molecular weight of 300 to 10,000 in terms of ethylene glycol; and/or
(B) a fluorine-containing resin having a mass average molecular weight of 5,000 or more in terms of polystyrene and having a fluoroalkyl structure and a polysiloxane structure.

<20> The antireflection laminate as described in <8>, wherein
the heat-curable and/or ionizing radiation-curable resin component is an acrylate compound having two or more (meth)acryloyl groups per one molecule.

<21> The antireflection laminate as described in any one of <8> to <12>, wherein
the low refractive index coating composition comprises a compound capable of generating an acid and/or a radical by heat and/or ionizing radiation.
<22> The antireflection laminate as described in <17>, wherein
the low refractive index coating composition comprises a crosslinking agent reactable with a hydroxyl group.
<23> The antireflection laminate as described in any one of <8> to <12>, wherein
the low refractive index coating composition comprises:
a silane coupling agent represented by a following formula (a); and/or
a hydrolysate of the silane coupling agent and a condensation reaction product of the hydolysate:

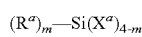    Formula (a)

wherein
each of $X^a$('s) independently represents a substituent that is selected from the group consisting of an unsubstituted alkyl group, a hydroxyl group and a hydrolyzable group,
each of $R^a$('s) independently represents a substituent that may be further substituted and that is selected from the group consisting of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, an acylamino group and an isocyanate group, and
m represents an integer of 1 to 3.
<24> The antireflection laminate as described in any one of <1> to <14> wherein
at least two layers of the layer having hardcoat property, the overcoat layer and the low refractive index layer are formed by sequential continuous coating between let-off of the support and take-up of the support
<25> The antireflection laminate as described in any one of <1> to <14>, wherein
at least two layers of the layer having hardcoat property, the overcoat layer and the low refractive index layer are simultaneously formed by multilayer coating in one coating apparatus.
<26> The antireflection laminate as described in any one of <1> to <14>, wherein
the support is a triacetyl cellulose film of 25 to 70 μm in thickness.
<27> The antireflection laminate as described in any one of <1> to <14>, wherein
the support is selected from the group consisting of a polyester-based resin film, a polyurethane-based resin film and a cycloolefin-based resin film.

DETAILED DESCRIPTION OF THE INVENTION

Figure 1:
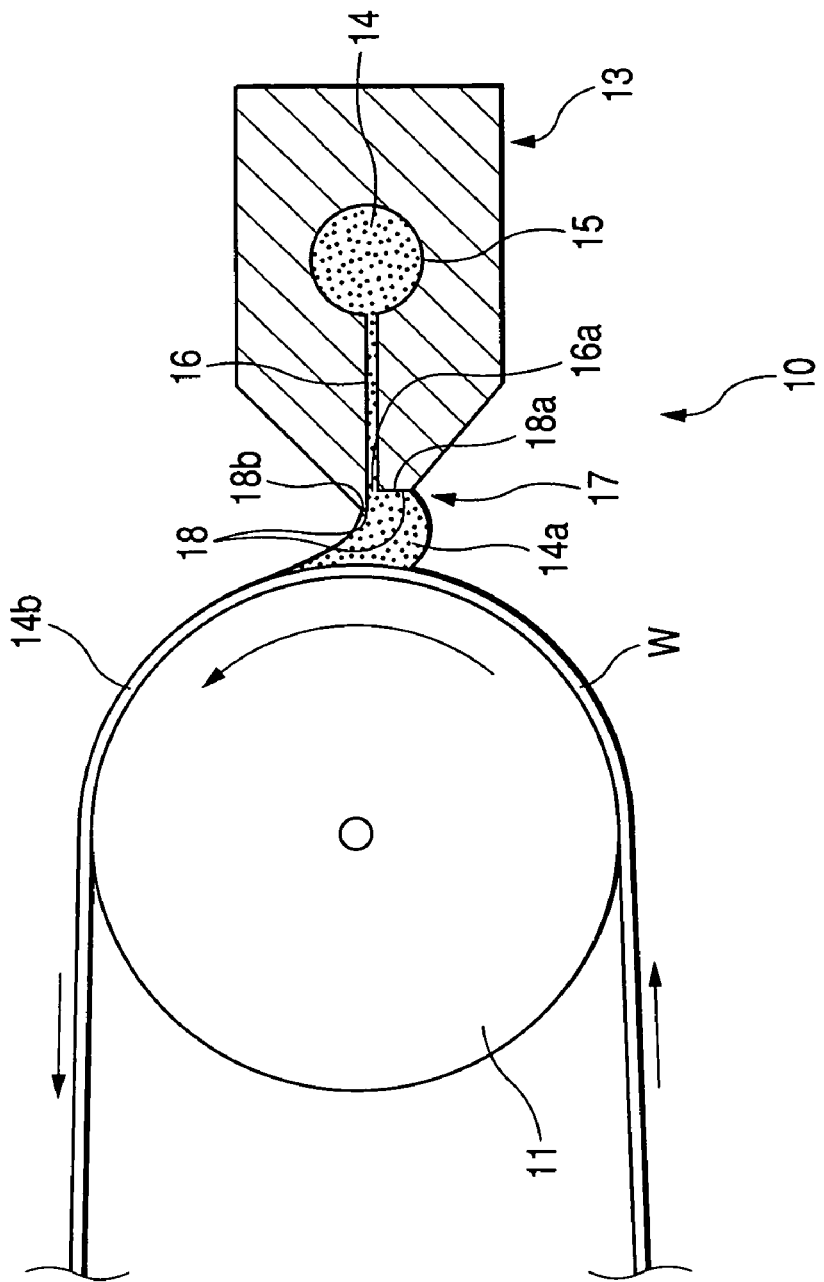
FIG. 1 illustrates one example of the cross-sectional view of a coater 10 using a slot die 13 for use in the present invention.

The present invention is described in detail below. Here, the terms used in the context of the present invention are described. The expression "from (numerical value 1) to (numerical value 2)" as used for indicating a physical value, a characteristic value or the like means "(numerical value 1) or more and (numerical value 2) or less". Also, the term "(meth)acrylate" means "at least either acrylate or methacrylate". The same applies to "(meth)acrylic acid" and the like. The term "the film of the present invention" is used in the same meaning as the antireflection laminate.
1. Constituent Materials in Antireflection Laminate of the Present Invention
Various compounds which can be used in the antireflection laminate of the present invention are described.
(Fluorine-Containing Vinyl Monomer Polymerization Unit)
The fluorine-containing vinyl monomer polymerization unit contained in the fluorine-containing resin component (fluorine-containing polymer) used for the formation of a low refractive index layer in the present invention is not particularly limited in its structure, and examples thereof include a polymerization unit based on a fluorine-containing olefin, a perfluoroalkyl vinyl ether, or a vinyl ether or (meth)acrylate having a fluorine-containing alkyl group. In view of suitability for production or properties required of the low refractive index layer, such as refractive index and film strength, the fluorine-containing polymer is preferably a copolymer of a fluorine-containing olefin and a vinyl ether, more preferably a copolymer of a perfluoroolefin and a vinyl ether. Also, for the purpose of decreasing the refractive index, a perfluoroalkyl vinyl ether, a vinyl ether or (meth)acrylate having a fluorine-containing alkyl group, or the like may be contained as a copolymerization component.
The perfluoroolefin is preferably a perfluoroolefin having a carbon number of 3 to 7. In view of polymerization reactivity, perfluoropropylene and perfluorobutylene are preferred, and in view of easy availability, perfluoropropylene is more preferred.
The perfluoroolefin content in the polymer is from 25 to 75 mol %. In order to decrease the refractive index of the material, the introduction rate of perfluoroolefin is preferably high, but in view of polymerization reactivity, introduction on the order of 50 to 70 mol % is a limit in the general solution-based radial polymerization reaction and introduction in a higher ratio is difficult. In the present invention, the perfluoroolefin content is preferably from 30 to 70 mol %, more preferably from 30 to 60 mol %, still more preferably from 35 to 60 mol %, yet still more preferably from 40 to 60 mol %.
In the present invention, a fluorine-containing vinyl ether represented by the following M1 may be copolymerized for reducing the refractive index. This copolymerization component may be introduced into the polymer in the range of 0 to 40 mol % but is preferably introduced in an amount of 0 to 30 mol %, more preferably from 0 to 20 mol %.

M1:

$$CH_2\!\!=\!\!CH$$
$$|$$
$$O\!-\!R_f^{111}$$

In M1, $R_f^{111}$ represents a fluorine-containing alkyl group having a carbon number of 1 to 30 and is preferably a fluorine-containing alkyl group having a carbon number of 1 to 20, more preferably from 1 to 15, which may be linear {for example, $-CF_2CF_3$, $-CH_2(CF_2)_aH$, $-CH_2CH_2(CF_2)_aF$ (a: an integer of 2 to 12)}, may have a branched structure {for example, $CH(CF_3)_2$, $CH_2CF(CF_3)_2$, $-CH(CH_3)CF_2CF_3$, $-CH(CH_3)(CF_2)_5CF_2H$}, may have an alicyclic structure (preferably a 5- or 6-membered ring, for example, a perfluorocyclohexyl group, a perfluorocyclopentyl group or an alkyl group substituted by such a group), or may have an ether bond (for example, $-CH_2OCH_2CF_2CF_3$, $-CH_2CH_2OCH_2(CF_2)_bH$, $-CH_2CH_2OCH_2(CF_2)_bF$ (b: an integer of 2 to 12), $CH_2CH_2OCF_2CF_2OCF_2CF_2H$). Incidentally, the substituent represented by $R_f^{111}$ is not limited to these substituents.

The monomer represented by M1 can be synthesized, for example, by a method of causing a fluorine-containing alcohol to act on leaving group-substituted alkyl vinyl ethers such as vinyloxy alkyl sulfonate and vinyloxy alkyl chloride in the presence of a base catalyst described in *Macromolecules*, Vol. 32 (21), page 7122 (1999) and JP-A-2-721; a method of mixing a fluorine-containing alcohol with vinyl ethers such as butyl vinyl ether in the presence of a palladium catalyst to exchange the vinyl group described in International Publication No. 92/05135; and a method of reacting a fluorine-containing ketone and a dibromoethane in the presence of a potassium fluoride catalyst and then performing an HBr-removing reaction with an alkali catalyst described in U.S. Pat. No. 3,420,793.

Preferred examples of the constituent component represented by M1 are set forth below, but the present invention is not limited thereto.

M1-(1): $CH_2\!=\!CH-O-CH_2CH_2OCH_2(CF_2)_4H$

M1-(2): $CH_2\!=\!CH-O-CH_2CH_2OCH_2(CF_2)_6H$

M1-(3): $CH_2\!=\!CH-O-CH_2CH_2OCH_2(CF_2)_8H$

M1-(4): $CH_2\!=\!CH-O-CH_2CH_2OCH_2(CF_2)_{10}H$

M1-(5): $CH_2\!=\!CH-O-CH_2CH_2OCH_2CH_2(CF_2)_4F$

M1-(6): $CH_2\!=\!CH-O-CH_2CH_2OCH_2CH_2(CF_2)_6F$

M1-(7): $CH_2\!=\!CH-O-CH_2CH_2OCH_2CH_2(CF_2)_{10}F(n)$

M1-(8): $CH_2\!=\!CH-O-CH_2CH_2OCH_2CH_2(CF_2)_{10}H(n)$

M1-(9): $CH_2\!=\!CH-O-CH_2CH_2OCH_2-$ (perfluorocyclohexyl F)

M1-(10): $CH_2\!=\!CH-O-CH_2CH_2OCH_2CF_3$

M1-(11): $CH_2\!=\!CH-O-CH_2CH_2OCH(CF_3)_2$

M1-(12): $CH_2\!=\!CH-O-(CH_2)_3OCH_2(CF_2)_7F$

M1-(13): $CH_2\!=\!CH-O-(CH_2)_4OCH_2(CF_2)_{10}F(n)$

M1-(14): $CH_2\!=\!CH-O-CH_2CH_2OCH_2CFO(CF_2)_3F(n)$ with $CF_3$ branch

M1-(15): $CH_2\!=\!CH-O-CH_2CH_2OCH_2CFOCF_2CFO(CF_2)_3F(n)$ with $CF_3$, $CF_3$ branches

M1-(16): $CH_2\!=\!CH-O-CH_2CH_2OCH_2CH_2(CF_2)_4CF(CF_3)_2$

M1-(17): $CH_2\!=\!CH-O-CH_2CH_2OCH_2CH_2(CF_2)_6CF(CF_3)_2$

M1-(18): $CH_2\!=\!CH-O-CH_2CH_2OCH_2CF_2CHFCF_3$

M1-(19): $CH_2\!=\!CH-O-CH_2CH_2OCH(CF_2)_6F(n)$ with $CH_3$ branch

M1-(20): $CH_2\!=\!CH-O-CH_2CH_2OCH_2-$ (perfluorotetrahydrofuran ring)

M1-(21): $CH_2\!=\!CH-O-CH_2CH_2OCH_2-$ (perfluorotetrahydropyran ring)

M1-(22): $CH_2\!=\!CH-O-CH_2CH_2OCF_2CF_3$

M1-(23): $CH_2\!=\!CH-O-CH_2CH_2O(CF_2)_4F(n)$

M1-(24) 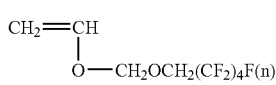

M1-(25) 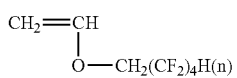

M1-(26) 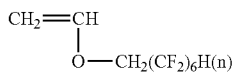

M1-(27) 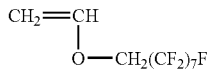

M1-(28) 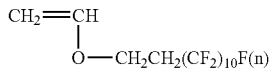

M1-(29) 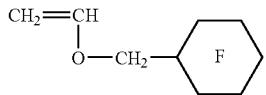

M1-(30) 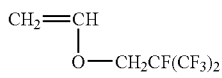

M1-(31) 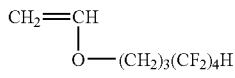

M1-(32) 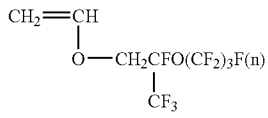

M1-(33) 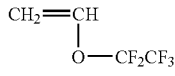

M1-(34) 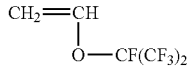

M1-(35) 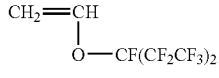

M1-(36) 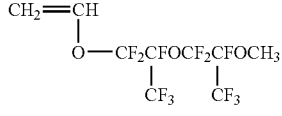

M1-(37) 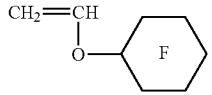

M1-(38) 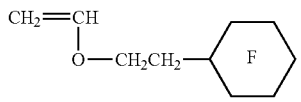

M1-(39) 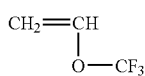

M1-(40) 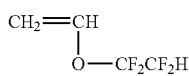

M1-(41) 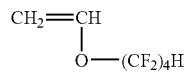

M1-(42) 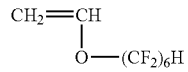

In the present invention, a perfluorovinyl ether represented by the following M2 may be copolymerized for reducing the refractive index. This copolymer may be introduced into the polymer in the range of 0 to 40 mol % but is preferably introduced in an amount of 0 to 30 mol %, more preferably from 0 to 20 mol %.

M2:

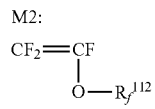

In M2, $R_f^{112}$ represents a fluorine-containing alkyl group having a carbon number of 1 to 30 and is preferably a fluorine-containing alkyl group having a carbon number of 1 to 20, more preferably from 1 to 10, still more preferably a perfluoroalkyl group having a carbon number of 1 to 10. The fluorine-containing alkyl group may have a substituent. Specific examples of $R_f^{112}$ include $—CF_3$ {M2-(1)}, $—CF_2CF_3$ {M2-(2)}, $—CF_2CF_2CF_3$ {M2-(3)} and $—CF_2CF(OCF_2CF_2CF_3)CF_3$ {M2-(4)}.

(Hydroxyl Group-Containing Vinyl Monomer Polymerization Unit)

The fluorine-containing polymer for use in the present invention contains a hydroxyl group-containing vinyl monomer polymerization unit, and the content thereof in the polymer is preferably more than 10 mol. The hydroxyl group has a function of effecting curing by reacting with a crosslinking agent and therefore, as the hydroxyl group content is higher, a harder film can be advantageously formed. The hydroxyl group content is preferably from more than 10 mol % to 70 mol %, more preferably from more than 10 mol % to 60 mol %, still more preferably from 15 to 55 mol %.

The hydroxyl group-containing vinyl monomer such as vinyl ethers, (meth)acrylates and styrenes may be used without any particular limitation as long as it is copolymerizable with the above-described fluorine-containing vinyl monomer polymerization unit. For example, when a perfluoroolefin (e.g., hexafluoropropylene) is used as the fluorine-containing vinyl monomer, a hydroxyl group-containing vinyl ether having good copolymerizability is preferably used. Specific examples thereof include, but are not limited to, 2-hydroxyethyl vinyl ether, 4-hydroxybutyl vinyl ether, 6-hydroxyhexyl vinyl ether, 8-hydroxyoctyl vinyl ether, diethylene glycol vinyl ether, triethylene glycol vinyl ether and 4-(hydroxymethyl)cyclohexylmethyl vinyl ether.

(Constituent Unit Having a Polysiloxane Structure)

It is also preferred for imparting antifouling property that the fluorine-containing polymer for use in the present invention contains a constituent unit having a polysiloxane structure. The fluorine-containing polymer having a polysiloxane structure effective in the present invention includes a fluorine-containing polymer which contains (a) at least one fluorine-containing vinyl monomer polymerization unit, (b) at least one hydroxyl group-containing vinyl monomer polymerization unit, and (c) at least one polymerization unit having in the side chain thereof a graft moiety containing a polysiloxane repeating unit represented by the following formula 1, and in which the main chain comprises only a carbon atom.

Formula 1:

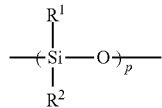

In formula 1, $R^1$ and $R^2$ may be the same or different and each represents an alkyl group or an aryl group. The alkyl group is preferably an alkyl group having a carbon number of 1 to 4, and examples thereof include a methyl group, a trifluoromethyl group and an ethyl group. The aryl group is preferably an aryl group having a carbon number of 6 to 20, and examples thereof include a phenyl group and a naphthyl group. Among these, a methyl group and a phenyl group are preferred, and a methyl group is more preferred. p represents an integer of 2 to 500 and is preferably an integer of 5 to 350, more preferably from 8 to 250.

The polymer having a polysiloxane structure represented by formula 1 in the side chain can be synthesized by a method of introducing a polysiloxane (such as SILAPLANE Series (produced by Chisso Corp.)) having a corresponding reactive group (for example, an epoxy group, an amino group for acid anhydride group, a mercapto group, a carboxyl group or a hydroxyl group) at one terminal into a polymer having a reactive group such as epoxy group, hydroxyl group, carboxyl group or acid anhydride group through a polymer reaction described, for example, in *J. Appl Polym. Sci.*, 2000, 78, 1955 and JP-A-56-28219; or a method of polymerizing a polysiloxane-containing silicon macromer. These methods both may be preferably used. In the present invention, the method of introducing a polysiloxane structure by the polymerization of a silicon macromer is more preferred.

The silicon macromer is sufficient if it has a polymerizable group copolymerizable with a fluorine-containing olefin, and is preferably a structure represented by any one of formulae 2 to 5.

Formula 2:

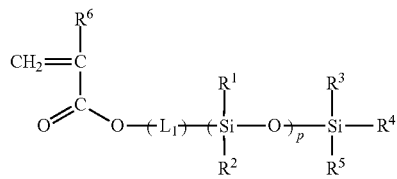

Formula 3:

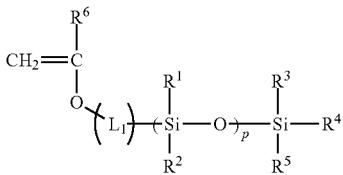

Formula 4:

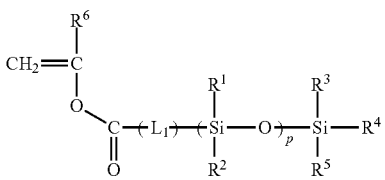

Formula 5:

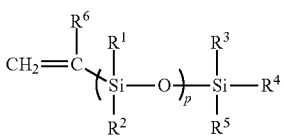

In formulae 2 to 5, $R^1$, $R^2$ and p have the same meanings as in formula 1 and the preferred ranges are also the same. $R^3$ to $R^5$ each independently represents a substituted or unsubstituted monovalent organic group or a hydrogen atom and is preferably an alkyl group having a carbon number of 1 to 10 (e.g., methyl, ethyl, octyl), an alkoxy group having a carbon number of 1 to 10 (e.g., methoxy, ethoxy, propyloxy) or an aryl group having a carbon number of 6 to 20 (e.g., phenyl, naphthyl), more preferably an alkyl group having a carbon number of 1 to 5. $R^6$ represents a hydrogen atom or a methyl group. $L_1$ represents an arbitrary linking group having a carbon number of 1 to 20 and includes a substituted or unsubstituted linear, branched or alicyclic alkylene group and a substituted or unsubstituted arylene group but is preferably an unsubstituted alkylene group having a carbon number of 1 to 20, more preferably an ethylene group or a propylene group. These compounds can be synthesized by a method described, for example, in JP-A-6-322053.

The compounds represented by formulae 2 to 5 all may be preferably used in the present invention, but among these, in view of copolymerizability with a fluorine-containing olefin, compounds having a structure represented by formula 2, 3 or 4 are preferred. The polysiloxane moiety preferably occupies from 0.01 to 20 mass %, more preferably from 0.05 to 15 mass %, still more preferably from 0.5 to 10%, in the graft copolymer.

Preferred examples of the polymer graft moiety polymerization unit containing a polysiloxane moiety in the side chain, which is useful in the present invention, are set forth below, but the present invention is not limited thereto.

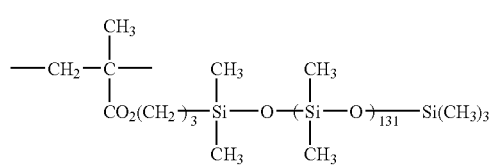 S-(1)
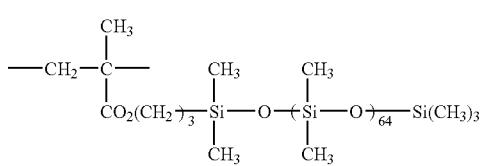 S-(2)
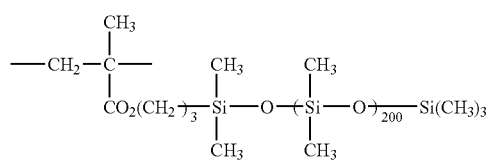 S-(3)
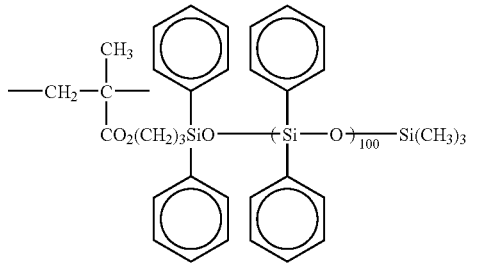 S-(4)
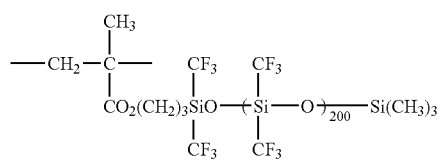 S-(5)
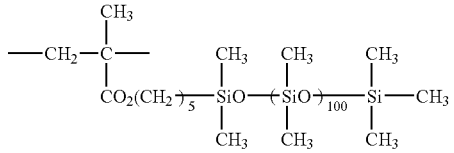 S-(6)
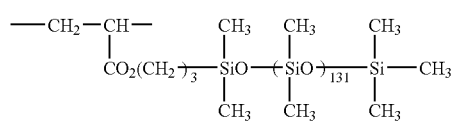 S-(7)
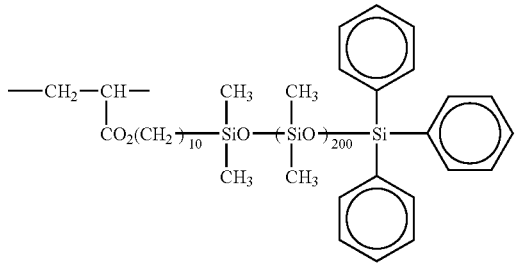 S-(8)
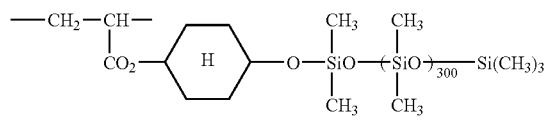 S-(9)
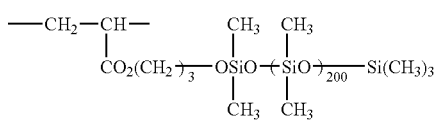 S-(10)
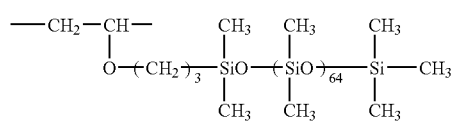 S-(11)
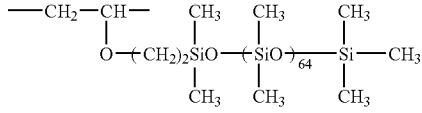 S-(12)
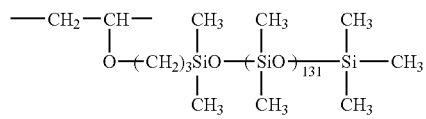 S-(13)
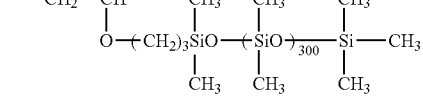 S-(14)
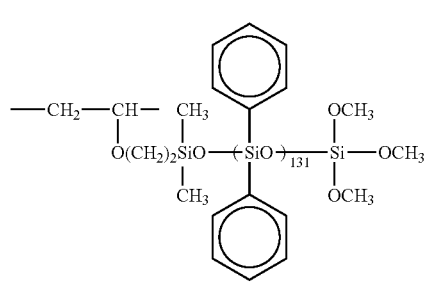 S-(15)
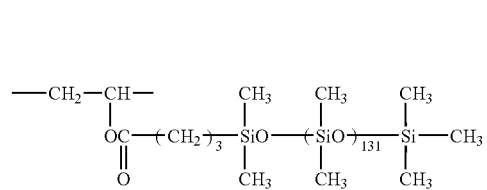 S-(16)

-continued
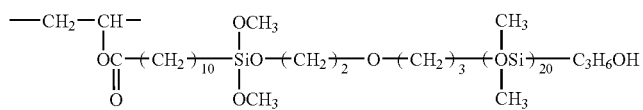
S-(17)
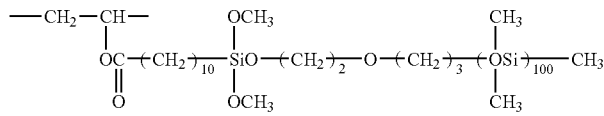
S-(18)
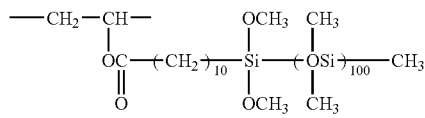
S-(19)
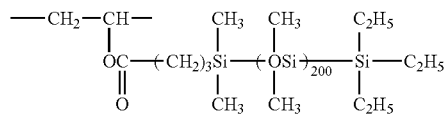
S-(20)
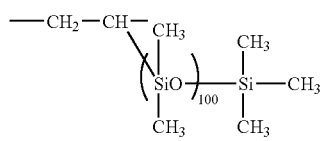
S-(21)
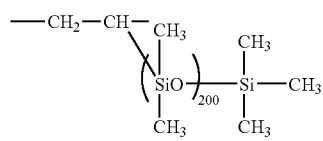
S-(22)
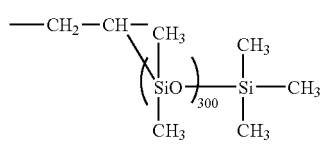
S-(23)
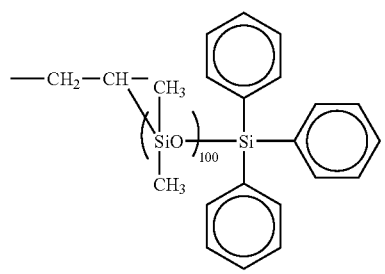
S-(24)
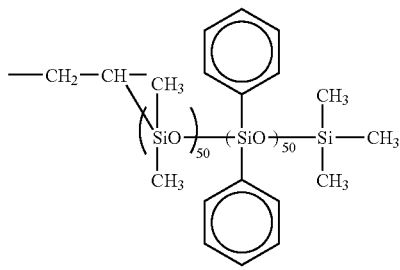
S-(25)
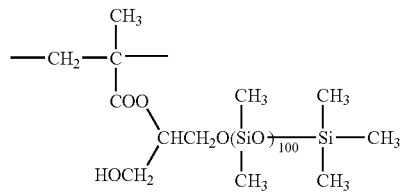
S-(26)
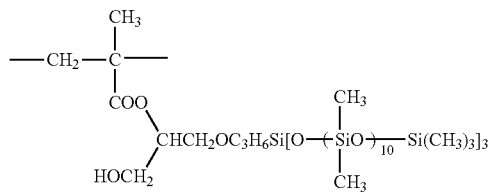
S-(27)
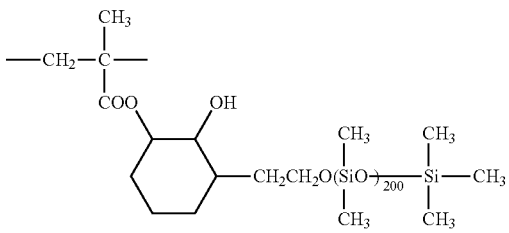
S-(28)
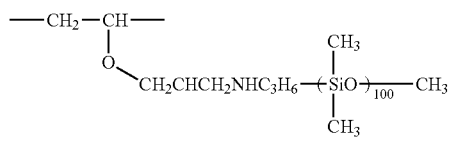
S-(29)
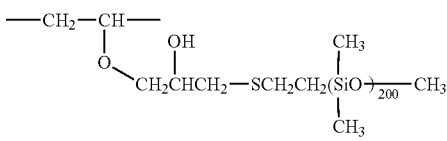
S-(30)

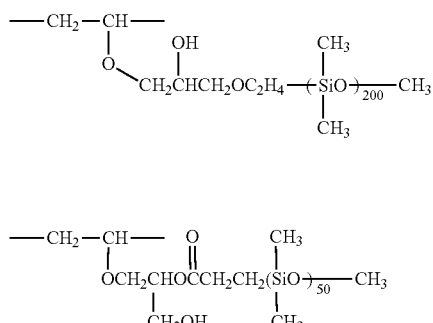

S-(31)

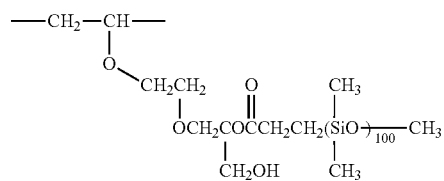

S-(32)

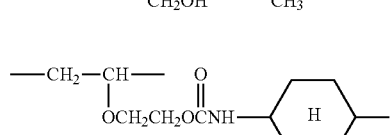

S-(33)

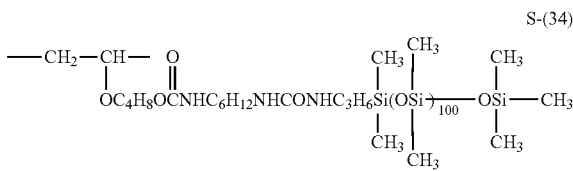

S-(34)

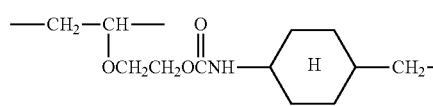

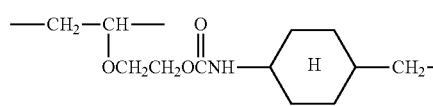

S-(35)

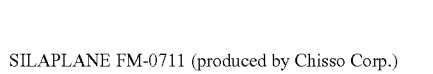

S-(36)

SILAPLANE FM-0711 (produced by Chisso Corp.)     SILAPLANE FM-0721 (produced by Chisso Corp.)

S-(37)

S-(38)

SILAPLANE FM-0725 (produced by Chisso Corp.)

By the introduction of the polysiloxane structure, not only antifouling property and dustproof property are imparted to the film but also slipperiness is imparted to the film surface and this is advantageous in view of scratch resistance.

(Other Polymerization Units)

The copolymerization components for forming a polymerization unit other than those described above may be appropriately selected from various standpoints such as hardness, adhesion to substrate, solubility in solvent and transparency, and examples thereof include vinyl ethers such as methyl vinyl ether, ethyl vinyl ether, tert-butyl vinyl ether, n-butyl vinyl ether, cyclohexyl vinyl ether and isopropyl vinyl ether, and vinyl esters such as vinyl acetate, vinyl propionate, vinyl butyrate and vinyl cyclohexanecarboxylate. The amount of such a copolymerization component introduced is from 0 to 40 mol %, preferably from 0 to 30 mol %, more preferably from 0 to 20 mol %.

(Preferred Form of Fluorine-Containing Polymer)

The polymer form particularly preferred in the present invention is a form represented by formula 6.

Formula 6:

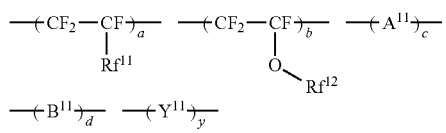

In formula 6, $Rf^{11}$ represents perfluoroalkyl group having a carbon number of 1 to 5. As for the monomer constituting the moiety represented by $—CF_2CF(Rf^{11})—$, those described above as examples of the perfluoroolefin can be applied. In formula 6, $Rf^{12}$ has the same meaning as defined above for the fluorine-containing vinyl ether ($Rf^{112}$ in the compound represented by formula M2), and the preferred range is also the same. $A^{11}$ and $B^{11}$ represent a hydroxyl group-containing vinyl monomer polymerization unit and an arbitrary constituent unit, respectively. $A^{11}$ has the same meaning as defined above for the hydroxyl group-containing vinyl monomer polymerization unit. $B^{11}$ is not particularly limited but in view of copolymerizability, vinyl ethers and vinyl esters are preferred. Specific examples thereof include monomers described above (Other Polymerization Units) and monomers represented by formula M1.

$Y^{11}$ represents a constituent unit having a polysiloxane structure and may be a polymerization unit in the form of having in the side chain thereof a graft moiety containing a polysiloxane repeating unit represented by formula 1. The definitions and preferred ranges thereof are the same as those described above (Constituent Unit Having Polysiloxane Structure).

$Y^{11}$ may be a polymerization unit representing a constituent component containing a polysiloxane partial structure in the main chain.

The method for introducing a polysiloxane partial moiety into the main chain is not particularly limited, and examples thereof include a method using a polymer-type initiator such as azo group-containing polysiloxane amide (as commercially available products, VPS-0501 and 1001 (trade names, produced by Wako Pure Chemical Industries, Ltd.)) described in JP-A-6-93100; a method of introducing a reactive group (for example, a mercapto group, a carboxyl group or a hydroxyl group) derived from a polymerization initiator or chain transfer agent into the polymer terminal, and reacting it with a polysiloxane containing a reactive group (for example, an epoxy group or an isocyanate group) at one terminal or both terminals; and a method of copolymerizing a cyclic siloxane oligomer such as hexamethylcyclotrisiloxane by the anion ring-opening polymerization. Above all, a method utilizing an initiator having a polysiloxane partial structure is easy and preferred.

a to d each represents the molar fraction (%) of each constituent component, and a+b+c+d=100. These molar fractions satisfy the relationships of $30 \leq a \leq 70$ (preferably $30 \leq a \leq 60$, more preferably $35 \leq a \leq 60$), $0 \leq b \leq 40$ (preferably $0 \leq b \leq 30$, more preferably $0 \leq b \leq 20$), $20 \leq c \leq 70$ (preferably $20 \leq c \leq 60$, more preferably $25 \leq c \leq 55$), and $0 \leq d \leq 40$ (preferably $0 \leq d \leq 30$).

y represents the mass fraction (%) of the polysiloxane-containing constituent unit based on the entire fluorine-containing polymer and satisfies the relationship of $0.01 \leq y \leq 20$ (preferably $0.05 \leq y \leq 15$, more preferably $0.5 \leq y \leq 10$).

The number average molecular weight of the fluorine-containing polymer used for the formation of a low refractive index layer in the present invention is preferably from 5,000 to 1,000,000, more preferably from 8,000 to 500,000, still more preferably from 10,000 to 100,000.

Here, the number average molecular weight is a molecular weight measured by the differential refractometer detection in a GPC analyzer using a column of TSKgel GMHxL, TSKgel G4000HxL or TSKgel G2000HxL (all trade names, produced by Tosoh Corp.) and a solvent of THF, and expressed in terms of polystyrene.

Specific examples of the polymer useful in the present invention are shown in the Table below, but the present invention is not limited thereto. In Tables 1 and 2, the polymer is shown by the combination of polymerization units.

TABLE 1

| Fluorine-containing polymer | | P1 | P2 | P3 | P4 | P5 | P6 | P7 | P8 | P9 | P10 | P11 | P12 |
|---|---|---|---|---|---|---|---|---|---|---|---|---|---|
| Fluorine-containing polymer constituent component (molar fraction (%)) | hexafluoropropylene | 50 | 50 | 50 | 50 | 50 | 50 | 50 | 50 | 50 | 50 | 50 | 50 |
| | M1-(2) | | | | | | | | | | | | |
| | M1-(6) | | | | | | | | | | | | |
| | M2-3 | | | | | | | | | | | | |
| | HEVE | 50 | 50 | 50 | 50 | 50 | 50 | 50 | 50 | 50 | 50 | 50 | 50 |
| | HBVE | | | | | | | | | | | | |
| | HHVE | | | | | | | | | | | | |
| | DEGVE | | | | | | | | | | | | |
| | HMcHVE | | | | | | | | | | | | |
| | EVE | | | | | | | | | | | | |
| | cHVE | | | | | | | | | | | | |
| | tBuVE | | | | | | | | | | | | |
| | VAc | | | | | | | | | | | | |
| Silicone-containing constituent component (mass %) | S-(1) | | 2 | | | | | | | | | | |
| | S-(2) | | | 2.1 | | | | | | | | | |
| | S-(11) | | | | 2 | | | | | | | | |
| | S-(13) | | | | | 2 | | | | | | | |
| | S-(16) | | | | | | 1.8 | | | | | | |
| | S-(21) | | | | | | | 2 | | | | | |
| | S-(29) | | | | | | | | 2 | | | | |
| | S-(30) | | | | | | | | | 1.7 | | | |
| | S-(36) | | | | | | | | | | 2.1 | | |
| | S-(37) | | | | | | | | | | | 2.5 | |
| | S-(38) | | | | | | | | | | | | 1.7 |
| Molecular weight (×10000) | | 1.5 | 1.7 | 2.2 | 2.6 | 1.9 | 2.4 | 2.9 | 3.5 | 4.1 | 2.5 | 2.2 | 1.7 |

TABLE 2

| Fluorine-containing polymer | | P13 | P14 | P15 | P16 | P17 | P18 | P19 | P20 | P21 | P22 | P23 | P24 |
|---|---|---|---|---|---|---|---|---|---|---|---|---|---|
| Fluorine-containing polymer constituent component (molar fraction (%)) | hexafluoropropylene | 50 | 50 | 50 | 50 | 50 | 50 | 50 | 50 | 45 | 50 | 50 | 40 |
| | M1-(2) | | | | | | | 10 | | | | | |
| | M1-(6) | | | | | | | | 10 | | | | |
| | M2-3 | | | | | | | | | 5 | | | 10 |
| | HEVE | 40 | 40 | 40 | 40 | 40 | 40 | 40 | 40 | 40 | 30 | 20 | 25 |
| | HBVE | | | | | | | | | | | | |
| | HHVE | | | | | | | | | | | | |
| | DEGVE | | | | | | | | | | | | |
| | HMcHVE | | | | | | | | | | | | |
| | EVE | 10 | 10 | 10 | 10 | 10 | 10 | | | | | 30 | 25 |
| | cHVE | | | | | | | | | 10 | | | |
| | tBuVE | | | | | | | | | | 20 | | |
| | VAc | | | | | | | | | | | | |
| Silicone-containing constituent component (mass %) | S-(1) | | 2.5 | | | | | | | | | 1.8 | |
| | S-(2) | | | | | | | | | | | | |
| | S-(11) | | | 2.3 | | | | | | | 1.9 | | |
| | S-(13) | | | | | | | | | | | | |
| | S-(30) | | | | 2.5 | | | | | | | | |
| | S-(36) | | | | | | | | | | | | |
| | S-(37) | | | | | 6.6 | | | | | 4.2 | | 1.7 |
| | S-(38) | | | | | | 3.8 | | 3.6 | | | | |
| Molecular weight (×10000) | | 1.5 | 1.7 | 2.1 | 4.5 | 2.8 | 2.5 | 1.6 | 3.1 | 2.5 | 3.1 | 1.9 | 4.1 |

TABLE 3

| Fluorine-containing polymer | | P25 | P26 | P27 | P28 | P29 | P30 | P31 | P32 | P33 | P34 | P35 | P36 |
|---|---|---|---|---|---|---|---|---|---|---|---|---|---|
| Fluorine-containing polymer constituent component | hexafluoropropylene | 50 | 50 | 50 | 50 | 40 | 50 | 50 | 45 | 50 | 50 | 50 | 50 |
| | M1-(2) | | | 10 | | | | | | | | | 5 |
| | M1-(6) | | | | 5 | | | | | | 10 | | |

TABLE 3-continued

| Fluorine-containing polymer | | P25 | P26 | P27 | P28 | P29 | P30 | P31 | P32 | P33 | P34 | P35 | P36 |
|---|---|---|---|---|---|---|---|---|---|---|---|---|---|
| (molar fraction (%)) | M2-3 | | | | | 10 | | | 5 | | | | |
| | HEVE | | | | | | | | | | | | |
| | HBVE | 40 | 30 | 40 | 20 | 50 | | | | | | | |
| | HHVE | | | | | | 40 | 25 | 50 | | | | |
| | DEGVE | | | | | | | | | 40 | 40 | | |
| | HMcHVE | | | | | | | | | | | 15 | 40 |
| | EVE | 10 | 20 | | | | | 25 | | 10 | 35 | | |
| | cHVE | | | | | | 10 | | | | | | |
| | tBuVE | | | | | | | | | | | | |
| | VAc | | | | 25 | | | | | | | | 5 |
| Silicone-containing constituent component (mass %) | S-(1) | | | | | | | | 2.9 | | | | |
| | S-(2) | 3.1 | | | | | | | | | 1.3 | | |
| | S-(11) | | | 1.9 | | | | | | | | | |
| | S-(13) | | | | | | | 1.9 | | | | | |
| | S-(30) | | | | | 3.1 | | | | | | | |
| | S-(36) | | | | | | | | 3.2 | | | | |
| | S-(37) | | | | | | 3.1 | | | | | 3.1 | |
| | S-(38) | | 2.8 | | | | | | | 1.9 | | | 3.4 |
| Molecular weight (×10000) | | 3.1 | 2.9 | 1.9 | 2.6 | 4.2 | 2.3 | 3.1 | 3.4 | 2.4 | 2.7 | 2.4 | 3.1 |

TABLE 4

| Fluorine-containing polymer | | P37 | P38 | P39 | P40 | P41 | P42 | P43 | P44 | P45 | P46 | P47 | P48 |
|---|---|---|---|---|---|---|---|---|---|---|---|---|---|
| Fluorine-containing polymer constituent component (molar fraction (%)) | hexafluoropropylene | 50 | 50 | 50 | 45 | 45 | 45 | 50 | 45 | 50 | 45 | 45 | 45 |
| | M1-(2) | | | | | | | | | | | | |
| | M1-(6) | | | | | | | | | | | | |
| | M2-3 | | | | 5 | 5 | 5 | | | | 5 | 5 | 5 |
| | HEVE | 30 | 30 | 30 | 30 | 30 | 30 | 25 | 25 | 25 | 25 | 25 | 25 |
| | HBVE | | | | | | | | | | | | |
| | HHVE | | | | | | | | | | | | |
| | DEGVE | | | | | | | | | | | | |
| | HMcHVE | | | | | | | | | | | | |
| | EVE | 20 | 20 | 20 | 20 | 20 | 20 | 25 | 25 | 25 | 25 | 25 | 25 |
| | cHVE | | | | | | | | | | | | |
| | tBuVE | | | | | | | | | | | | |
| | VAc | | | | | | | | | | | | |
| Silicone-containing constituent component (mass %) | S-(1) | | | | | | | | | | | | |
| | S-(2) | | | | | | | | | | | | |
| | S-(11) | | | | | | | | | | | | |
| | S-(13) | | | | | | | | | | | | |
| | S-(30) | | | | | | | | | | | | |
| | S-(36) | | | | | | | | | | | | |
| | S-(37) | | 3.8 | | 3.8 | | 3.8 | | 3.8 | | 3.8 | | |
| | S-(38) | | | 3.8 | | 3.8 | | 3.8 | | 3.8 | | 3.8 | |
| Molecular weight (×10000) | | 2.4 | 2.6 | 2.6 | 2.8 | 2.9 | 2.9 | 2.6 | 2.6 | 2.7 | 2.6 | 2.7 | 2.7 |

In the Tables, with respect to the fluorine-containing polymer constituent component, the molar ratio of respective components is shown. Abbreviations are as follows.

| | |
|---|---|
| HFP: | hexafluoropropylene |
| HEVE: | 2-hydroxyethyl vinyl ether |
| HBVE: | 4-hydroxybutyl vinyl ether |
| HHVE: | 6-hydroxyhexyl vinyl ether |
| HOVE: | 8-hydroxyoctyl vinyl ether |
| DEGVE: | diethylene glycol vinyl ether |
| HMcHVE: | 4-(hydroxymethyl)cyclohexylmethyl vinyl ether |
| EVE: | ethyl vinyl ether |
| cHVE: | cyclohexyl vinyl ether |
| tBuVE: | tert-butyl vinyl ether |
| VAc: | vinyl acetate |

The fluorine-containing polymer for use in the present invention can be synthesized by various polymerization methods such as solution polymerization, sedimentation polymerization, suspension polymerization, precipitation polymerization, bulk polymerization and emulsion polymerization. Also, the synthesis can be performed by a known operation such as batch system, semi-continuous system and continuous system.

Examples of the method for initiating the polymerization include a method using a radical initiator and a method of irradiating light or radiation. These polymerization methods and polymerization-initiating methods are described, for example, in Teiji Tsuruta, *Kobunshi Gosei Hoho* (*Polymer Synthesis Method*), revised edition, Nikkan Kogyo Shinbun Sha (1971), and Takayuki Ohtsu and Masayoshi Kinoshita, *Kobunshi Gosei no Jikken Ho* (*Test Method of Polymer Synthesis*), pp. 124-154, Kagaku Dojin (1972).

Among these polymerization methods, a solution polymerization method using a radical initiator is preferred. Examples of the solvent for use in the solution polymerization include various organic solvents such as ethyl acetate, butyl acetate, acetone, methyl ethyl ketone, methyl isobutyl ketone, cyclohexanone, tetrahydrofuran, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol, and one of these solvents may be used alone, or a mixture of two or more thereof may be used. A mixed solvent with water may also be used.

The polymerization temperature needs to be set according to the molecular weight of polymer produced, the kind of initiator, and the like, and a polymerization temperature from 0° C. or less to 100° C. or more may be used, but the polymerization is preferably performed in the range from 40 to 100° C.

The reaction pressure may be appropriately selected but is usually from 0.01 to 10 MPa, preferably on the order of 0.05 to 5 MPa, more preferably on the order of 0.1 to 2 MPa. The reaction time is approximately from 5 to 30 hours.

The polymer obtained as a reaction solution may be used directly in the usage of the present invention or may be used after purifying it by reprecipitation or liquid separation.

The ionizing radiation-curable resin component and/or the heat-curable resin component are preferably (A) at least either a hydrolysate of an organosilane having a mass average molecular weight of 300 to 10,000 in terms of ethylene glycol or a condensation reaction product thereof (constituent component (A)). The constituent component (A) for use in the present invention indicates at least either a hydrolysate of an organosilane having a mass average molecular weight of 300 to 10,000 in terms of ethylene glycol or a condensation reaction product thereof and may be a hydrolysate, a condensation reaction product or a mixture thereof. Also, the constituent component (A) may contain the raw material organosilane compound as an unreacted residue. The amount of the unreacted residue is preferably 1% or less. The organosilane compound as a raw material of the constituent component (A), the hydrolysis reaction, the condensation reaction, the molecular weight of the product, and the like are described below.

[Organosilane Compound]

The organosilane compound for use in the present invention is described in detail below.

   Formula (b):

In formula (b), $R^{10}$ represents a substituted or unsubstituted alkyl group or a substituted or unsubstituted aryl group. Examples of the alkyl group include a methyl group, an ethyl group, a propyl group, an isopropyl group, a hexyl group, a tert-butyl group, an sec-butyl group, a hexyl group, a decyl group and a hexadecyl group. The alkyl group is preferably an alkyl group having a carbon number of 1 to 30, more preferably from 1 to 16, still more preferably from 1 to 6. Examples of the aryl group include a phenyl group and a naphthyl group, with a phenyl group being preferred.

X represents a hydroxyl group or a hydrolyzable group. Examples of the hydrolyzable group include an alkoxy group (preferably an alkoxy group having a carbon number of 1 to 5, such as methoxy group and ethoxy group), a halogen atom (e.g., Cl, Br, I) and a $R^2COO$ group (wherein $R^2$ is preferably a hydrogen atom or an alkyl group having a carbon number of 1 to 5, such as $CH_3COO$ and $C_2H_5COO$). Among these, an alkoxy group is preferred, and a methoxy group and an ethoxy group are more preferred.

m represents an integer of 0 to 3. When a plurality of $R^{10}$'s or X's are present, the plurality of $R^{11}$'s or X's may be the same or different. m is preferably 0, 1 or 2.

The substituent contained in $R^{10}$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl) and an acylamino group (e.g., acetylamino, benzoylamino, acrylamino, methacrylamino). These substituents each may be further substituted. Incidentally, in the present invention, even when a single atom is substituted to the hydrogen atom, for the sake of convenience, this is referred to as a substituent.

When a plurality of $R^{10}$'s are present, at least one is preferably a substituted alkyl group or a substituted aryl group. In particular, the substituted alkyl group or substituted aryl group preferably further has a vinyl polymerizable group. In this case, the compound represented by formula (b) may be expressed by the following formula (a-1).

Formula (a-1):

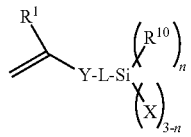

In formula (a-1), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, an ester group, an amido group, an ether group or a urea group and is preferably a single bond, an ester group or an amido group, more preferably a single bond or an ester group, still more preferably an ester group.

L represents a divalent linking chain and is specifically a substituted or unsubstituted alkylene group, a substituted or unsubstituted arylene group, a substituted or unsubstituted alkylene group having in the inside thereof a linking group (e.g., ether, ester, amido), or a substituted or unsubstituted arylene group having in the inside thereof a linking group, preferably a substituted or unsubstituted alkylene group having a carbon number of 2 to 10, a substituted or unsubstituted arylene group having a carbon number of 6 to 20, or an alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of X's are present, the plurality of X's may be the same or different. n is preferably 0.

$R^{10}$ has the same meaning as $R^{10}$ in formula (b) and is preferably a substituted or unsubstituted alkyl group or an unsubstituted aryl group, more preferably an unsubstituted alkyl group or an unsubstituted aryl group.

X has the same meaning as X in formula (b) and is preferably a halogen, a hydroxyl group or an unsubstituted alkoxy group, more preferably chlorine, a hydroxyl group or an unsubstituted alkoxy group having a carbon number of 1 to 6, still more preferably a hydroxyl group or an alkoxy having a carbon number of 1 to 3, yet still more preferably a methoxy group.

Examples of the organosilane compound preferred in the present invention include a tetraalkoxysilane such s tetramethoxysilane, tetraethoxysilane, tetrapropoxysilane and tetrabutoxysilane; a trialkoxysilane such as methyltrimethoxysilane, methyltriethoxysilane, ethyltrimethoxysilane, ethyltriethoxysilane, propyltrimethoxysilane, propyltriethoxysilane, butyltrimethoxysilane, butyltriethoxysilane, pentyltrimethoxysilane, pentyltriethoxysilane, heptyltrimethoxysilane, heptyltriethoxysilane, octyltrimethoxysilane, octyltriethoxysilane, dodecyltrimethoxysilane, dodecyltriethoxysilane, hexadecyltrimethoxysilane, hexadecyltriethoxysilane, octadecyltrimethoxysilane, octadecyltriethoxysilane, phenyltrimethoxysilane, phenyltriethoxysilane, vinyltrimethoxysilane, γ-aminopropyltrimethoxysilane, γ-aminopropyltriethoxysilane, γ-glycidoxypropyltrimethoxysilane, γ-glycidoxypropyltriethoxysilane, γ-methacryloxypropyltrimethoxysilane, γ-methacryloxypropyltriethoxysilane, γ-acryloxypropyltrimethoxysilane, γ-acryloxypropyltriethoxysilane; and a dialkoxysilane such as dimethyldimethoxysilane and dimethyldiethoxysilane. Among these, tetramethoxysilane, tetraethoxysilane and γ-acryloxypropyltrimethoxysilane are preferred in view of dispersion stability of an inorganic particle in the curable composition and scratch resistance.

(Hydrolysis and Condensation Reaction of Organosilane)

At least either the hydrolysis of organosilane or the condensation reaction thereof is preferably performed in the presence of a catalyst. Examples of the catalyst include inorganic acids such as hydrochloric acid, sulfuric acid and nitric acid; organic acids such as oxalic acid, acetic acid, formic acid, methanesulfonic acid and toluenesulfonic acid; inorganic bases such as sodium hydroxide, potassium hydroxide and ammonia; organic bases such as triethylamine and pyridine; and metal alkoxides such as triisopropoxyaluminum and tetrabutoxyzirconium. In view of production stability or storage stability of the inorganic oxide fine particle solution, at least either an acid catalyst (inorganic acids, organic acids) or a metal chelate compound is used in the present invention. As for the inorganic acid, a hydrochloric acid and a sulfuric acid are preferred, and as for the organic acid, an organic acid having an acid dissociation constant (pKa value (25° C.)) of 4.5 or less in water is preferred. In particular, a hydrochloric acid, a sulfuric acid and an organic acid having an acid dissociation constant of 3.0 or less in water are preferred, a hydrochloric acid, a sulfuric acid and an organic acid having an acid dissociation constant of 2.5 or less in water are more preferred, an organic acid having an acid dissociation constant of 2.5 or less in water is still more preferred, a methanesulfonic acid, an oxalic acid, a phthalic acid and a malonic acid are yet still more preferred, and an oxalic acid is even yet still more preferred.

In the present invention, the metal chelate compound used for the production and condensation reaction of a hydrolysate of organosilane is preferably at least one metal chelate compound where an alcohol represented by the formula: $R^3OH$ (wherein $R^3$ represents an alkyl group having a carbon number of 1 to 10) and a compound represented by the formula: $R^4COCH_2COR^5$ (wherein $R^4$ represents an alkyl group having a carbon number of 1 to 10 and $R^5$ represents an alkyl group having a carbon number of 1 to 10 or an alkoxy group having a carbon number of 1 to 10) are present as ligands and the center metal is a metal selected from Zr, Ti and Al.

As long as the center metal is a metal selected from Zr, Ti and Al, the metal chelate compound can be suitably used without any particular limitation. Within this category, two or more kinds of metal chelate compounds may be used in combination. Specific examples of the metal chelate compound for use in the present invention include a zirconium chelate compound such as tri-n-butoxyethylacetoacetate zirconium, di-n-butoxybis(ethylacetoacetate)zirconium, n-butoxytris(ethylacetoacetate)zirconium, tetrakis(n-propylacetoacetate)zirconium, tetrakis(acetylacetoacetate)zirconium and tetrakis(ethylacetoacetate)zirconium; a titanium chelate compound such as diisopropoxy.bis(ethylacetoacetate)titanium, diisopropoxy.bis(acetylacetate)titanium and diisopropoxy.bis(acetylacetone)titanium; and an aluminum chelate compound such as diisopropoxyethylacetoacetate aluminum, diisopropoxyacetylacetonate aluminum, isopropoxybis(ethylacetoacetate)aluminum, isopropoxybis(acetylacetonate)aluminum, tris(ethylacetoacetate)aluminum, tris(acetylacetonate)aluminum and monoacetylacetonato.bis(ethylacetoacetate)aluminum.

Among these metal chelate compounds, preferred are tri-n-butoxyethylacetoacetate zirconium, diisopropoxy.bis(acetylacetonate)titanium, diisopropoxyethylacetoacetate aluminum and tris(ethylacetoaccetate)aluminum. One of these metal chelate compounds may be used alone, or two or more species thereof may be mixed and used. Furthermore, a partial hydrolysate of such a metal chelate compound may also be used.

The hydrolysis of organosilane and the condensation reaction thereof may be performed without a solvent or in a solvent. In the case of using a solvent, the concentration of the hydrolysate of organosilane and the partial condensate thereof can be appropriately set. In order to uniformly mix the components, an organic solvent is preferably used as the solvent. Suitable examples thereof include alcohols, aromatic hydrocarbons, ethers, ketones and esters. The solvent is preferably a solvent capable of dissolving an organosilane and a catalyst. In view of the process, the organic solvent is preferably used as a coating solution or a part of a coating solution, and an organic solvent not impairing the solubility or dispersibility when mixed with other materials such as fluorine-containing polymer is preferred.

Examples of the alcohols include a monohydric alcohol and a dihydric alcohol. The monohydric alcohol is preferably a saturated aliphatic alcohol having a carbon number of 1 to 8. Specific examples of the alcohols include methanol, ethanol, n-propyl alcohol, i-propyl alcohol, n-butyl alcohol, sec-butyl alcohol, tert-butyl alcohol, ethylene glycol, diethylene glycol, triethylene glycol, ethylene glycol monobutyl ether and ethylene glycol acetate monoethyl ether.

Specific examples of the aromatic hydrocarbons include benzene, toluene and xylene. Specific examples of the ethers include tetrahydrofuran and dioxane. Specific examples of the ketones include acetone, methyl ethyl ketone, methyl isobutyl ketone and diisobutyl ketone. Specific examples of the esters include ethyl acetate, propyl acetate, butyl acetate and propylene carbonate. One of these organic solvents may be used alone, or two or more kinds thereof may be mixed and used. In the reaction, the concentration of solid contents based on the solvent is not particularly limited but is usually from 1 to 90 mass %, preferably from 20 to 70 mass %.

The hydrolysis and condensation reaction are usually performed by adding water in an amount of 0.3 to 2 mol, preferably from 0.5 to 1 mol, per mol of the hydrolyzable group of organosilane, and stirring the solution with or without the above-described solvent at 25 to 100° C. in the presence of an acid catalyst. In the case where the hydrolyzable group is an alkoxy group and the acid catalyst is an organic acid, since the carboxyl group or sulfo group of the organic acid supplies a proton, the amount of water added can be reduced. The amount of water added is from 0 to 2 mol, preferably from 0 to 1.5 mol, more preferably from 0 to 1 mol, and still more preferably from 0 to 0.5 mol, per mol of the hydrolyzable group (e.g., alkoxy group) of the organosilane. In the case of using an alcohol as the solvent, substantially no addition of water is also suitable.

In the case where the acid catalyst is an inorganic acid, the amount of the acid catalyst used is from 0.01 to 10 mol %, preferably from 0.1 to 5 mol %, based on the hydrolyzable group. In the case where the acid catalyst is an organic acid, the optimum amount of the catalyst used varies depending on the amount of water added, but when water is added, the amount of the catalyst used is from 0.01 to 10 mol %, preferably from 0.1 to 5 mol %, based on the hydrolyzable group, and when water is not substantially added, the amount of the catalyst used is from 1 to 500 mol %, preferably from 10 to 200 mol %, more preferably from 20 to 200 mol %, still more preferably from 50 to 150 mol %, yet still more preferably from 50 to 120 mol %, based on the hydrolyzable group. The reaction is performed with stirring at 25 to 100° C., but this is preferably adjusted according to the reactivity of the organosilane.

(Shape and Molecular Weight of the Hydrolysate of Organosilane and the Condensation Reaction Product Thereof)

The hydrolysate of organosilane and the condensation reaction product thereof for use in the present invention may have a chain-like shape or a three-dimensional network structure. The mass average molecular weight of these compounds is preferably from 300 to 10,000 in terms of ethylene glycol. When the mass average molecular weight is in this range, not only good coating and good storage stability of the composition are obtained but also the cured film can be assured of sufficiently high scratch resistance and this is preferred. The mass average molecular weight in terms of ethylene glycol is more preferably from 300 to 9,000, still more preferably from 300 to 8,000.

The mass average molecular weight above is a molecular weight measured by the differential refractometer detection in a GPC analyzer using a column of TSKgel GMHXL, TSKgel G4000HxL or TSKgel G2000HxL (all trade names, produced by Tosoh Corp.) and DMF, and expressed in terms of ethylene glycol.

The ionizing radiation-curable resin component and/or the heat-curable resin component are preferably (B) a fluorine-containing resin having a mass average molecular weight of 5,000 or more in terms of polystyrene and having a fluoroalkyl structure and a polysiloxane structure (constituent component (B)).

The constituent component (B) for use in the present invention is described below.

(Fluorine-Containing Compound Having a Fluoroalkyl Structure and a Polysiloxane Structure)

This fluorine-containing compound is obtained by at least either the hydrolysis of an organosilane compound of formula (b) and a compound of the following formula (a-2) having a fluoroalkyl structure or the condensation reaction thereof.

$(Rf-L_1)_n-Si(X_1)_{4-n}$   Formula (a-2):

In formula (a-2), Rf represents a linear, branched or cyclic fluorine-containing alkyl group having a carbon number of 1 to 20 or a fluorine-containing aromatic group having a carbon number of 6 to 14. Rf is preferably a linear, branched or cyclic fluoroalkyl group having a carbon number of 3 to 10, more preferably a linear fluoroalkyl group having a carbon number of 4 to 8. $L_1$ represents a divalent linking group having a carbon number of 10 or less, preferably an alkylene group having a carbon number of 1 to 10, more preferably an alkylene group having a carbon number of 1 to 5. The alkylene group is a linear, branched, substituted or unsubstituted alkylene group which may have a linking group (e.g., ether, ester, amide) in the inside. The alkylene group may have a substituent and in this case, preferred examples of the substituent include a halogen atom, a hydroxyl group, a mercapto group, a carboxyl group, an epoxy group, an alkyl group and an aryl group. $X_1$ has the same meaning as X in formula (b) and is preferably a halogen, a hydroxyl group or an unsubstituted alkoxy group, more preferably chlorine, a hydroxyl group or an alkoxy group having a carbon number of 1 to 6, more preferably a hydroxyl group or an alkoxy group having a carbon number of 1 to 3, still more preferably a methoxy group.

n represents an integer of 0 to 3. When a plurality of $(Rf-L_1)$'s or $X_1$'s are present, the plurality of $(Rf-L_1)$'s or $X_1$'s may be the same or different. n is preferably 0, 1 or 2.

Among the fluorine-containing silane coupling agents represented by formula (a-2), preferred is a fluorine-containing silane coupling agent represented by the following formula (a-3):

$C_nF_{2n+1}-(CH_2)_m-Si(X_2)_3$   Formula (a-3):

In formula (a-3), n represents an integer of 1 to 10, and m represents an integer of 1 to 5. n is preferably an integer of 4 to 10, and m is preferably an integer of 1 to 3. $X_2$ represents a methoxy group, an ethoxy group or a chlorine atom.

Examples of the compound represented by formula (a-3) include trifluoropropyltrimethoxysilane, trifluoropropyltriethoxysilane, tridecafluorooctyltrimethoxysilane, tridecafluorooctyltriethoxysilane, heptadecafluorodecyltrimethoxysilane and heptadecafluorodecyltriethoxysilane.

In the present invention, at the preparation of the constituent component (B), that is, the compound having a fluoroalkyl structure and a polysiloxane structure, tetramethoxysilane and tetraethoxysilane are preferred out of the organosilane compounds represented by formula (b) used for the fluorine-containing compound.

The solvent, catalyst and reaction conditions used at the hydrolysis and condensation reaction for obtaining the fluorine-containing compound may be appropriately selected from those described above in "Hydrolysate of Organosilane and Condensation Reaction Product Thereof".

In the fluorine-containing compound, the reaction ratio between formula (b) and formula (a-2) is not particularly limited but formula (b): formula (a-2) is preferably from 1 to 10:1, more preferably from 2 to 10:1 (by mol).

The fluorine-containing compound (B) preferably contains at least either a hydroxyl group or an epoxy group. At least either a hydroxyl group or an epoxy group in the fluorine-containing compound (B) reacts with (A) at least either a hydrolysate of organosilane or a condensation reaction product thereof or with a polysiloxane structure of the fluorine-containing compound (B), whereby the cured film can have high film strength and the scratch resistance can be more enhanced. At least either a hydroxyl group or an epoxy group may be introduced into the fluoroalkyl structure or into the polysiloxane structure. At least either a hydroxyl group or an epoxy group can be introduced by copolymerizing a compound having such a functional group.

(Shape and Molecular Weight of the Fluorine-Containing Compound Having a Fluoroalkyl Structure and a Polysiloxane Structure)

As regards the fluorine-containing compound obtained by the hydrolysis and condensation reaction for use in the present invention, at least any one fluorine-containing compound may have a chain-like shape or a three-dimensional network structure. The mass average molecular weight of the fluorine-containing compound is, as a mass average molecular weight in terms of polystyrene, preferably 5,000 or more, more preferably from 5,000 to 100,000, still more preferably from 5,000 to 50,000. When the mass average molecular weight is 5,000 or more, the cured film can be assured of sufficiently high scratch resistance and this is preferred, and when the mass average molecular weight is 100,000 or less, the coatability and storage stability of the composition can be advantageously maintained.

The mass average molecular weight is a molecular weight measured by the differential refractometer detection in a GPC analyzer using a column of TSKgel GMHxL, TSKgel G4000HxL or TSKgel G2000HxL (all trade names, produced by Tosoh Corp.) and a solvent of THF, and expressed in terms of polystyrene.

Specific examples of the fluorine-containing compound (B) for use in the present invention include the compounds described in JP-A-2000-191977, JP-A-2000-204319 and JP-A-2000-328001.

(Acrylate Compound Having Two or More (Meth)acryloyl Groups within One Molecule)

The heat-curable and/or ionizing radiation-curable resin component for use in the present invention is preferably an acrylate compound having two or more (meth)acryloyl groups within one molecule.

Specific examples thereof include:

(meth)acrylic acid diesters of alkylene glycol, such as neopentyl glycol acrylate, 1,6-hexanediol(meth)acrylate and propylene glycol di(meth)acrylate;

(meth)acrylic acid diesters of polyoxyalkylene glycol, such as triethylene glycol di(meth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis{4-(acryloxy.diethoxy)phenyl}propane and 2-2-bis{4-(acryloxy.polypropoxy)phenyl}propane.

Furthermore, epoxy(meth)acrylates, urethane(meth)acrylates and polyester(meth)acrylates may also be preferably used as a photopolymerizable polyfunctional monomer.

Among these, esters of a polyhydric alcohol and a (meth)acrylic acid are preferred, and a polyfinctional monomer having three or more (meth)acryloyl groups within one molecule is more preferred. Specific examples thereof include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate and tripentaerythritol hexatriacrylate. The terms "(meth)acrylate", "(meth)acrylic acid" and "(meth)acryloyl" as used in the context of the present invention indicate "acrylate or methacrylate", "acrylic acid or methacrylic acid", and "acryloyl or methacryloyl", respectively.

Furthermore, dendrimers described, for example, in JP-A-2005-76005 and JP-A-2005-36105, and norbornene ring-containing monomers described, for example, in JP-A-2005-60425 may also be used.

Two or more kinds of polyfunctional monomers may be used in combination. The polymerization of the polyfunctional monomer having three or more (meth)acryloyl groups within one molecular may be performed by the irradiation of ionizing radiation or heating in the presence of a photoradical initiator or a thermal radical initiator.

In the polymerization reaction of the photopolymerizable polyfunctional monomer, a photopolymerization initiator is preferably used, and the photopolymerization initiator is preferably a photoradical polymerization initiator or a photocationic polymerization initiator, more preferably a photoradical polymerization initiator.

(Compound Capable of Generating an Acid and/or a Radical by the Effect of Heat and/or Ionizing Radiation)

In the present invention, at least one species of a compound capable of generating an acid by the effect of heat and/or ionizing radiation (heat-sensitive or photo-sensitive acid generator) and a compound capable of generating a radical by the effect of heat and/or ionizing radiation (heat-radical or photo-radical initiator) may be used in combination in the coating composition for forming at least one layer out of the layer having hardcoat property, the overcoat layer and the low refractive index layer.

(Compound Capable of Generating a Radical by the Effect of Heat and/or Ionizing Radiation (Initiator))

In preparing the film of the present invention, a photoradical initiator or a thermal radical initiator may be used in combination. The polymerization of various ethylenically unsaturated group-containing monomers may be performed by the irradiation of ionizing radiation or heating in the presence of a photoradical initiator or a thermal radical initiator The wavelength to which the compound capable of generating a radical by the effect of heat and/or ionizing radiation is sensitized is preferably 1,200 nm or less in view of compound and equipment. The wavelength is more preferably from 200 to 800 nm, still more preferably from 250 to 600 nm.

<Photoradical Initiator>

Examples of the photoradical polymerization initiator include acetophenones, benzoins, benzophenones, phosphine oxides, ketals, anthraquinones, thioxanthones, azo compounds, peroxides (described, for example, in JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins.

Examples of the acetophenones include 2,2-dimethoxyacetophenone, 2,2-diethoxyacetophenone, p-dimethylacetophenone, 1-hydroxy-dimethyl phenyl ketone, 1-hydroxy-dimethyl-p-isopropyl phenyl ketone, 1-hydroxycyclohexyl phenyl ketone, 2-methyl-4-methylthio-2-morpholinopropiophenone, 2-benzyl-2-dimethylamino-1-(4-morpholinophenyl)butanone, 4-phenoxydichloroacetophenone and 4-tert-butyl-dichloroacetophenone.

Examples of the benzoins include benzoin, benzoin methyl ether, benzoin ethyl ether, benzoin isopropyl ether, benzyl dimethyl ketal, benzoin benzenesulfonic acid ester, benzoin toluenesulfonic acid ester, benzoin methyl ether, benzoin ethyl ether and benzoin isopropyl ether. Examples of the benzophenones include benzophenone, hydroxybenzophenone, 4-benzoyl-4'-methyldiphenyl sulfide, 2,4-dichlorobenzophenone, 4,4-dichlorobenzophenone, p-chlorobenzophenone, 4,4'-dimethylaminobenzophenone Michler's ketone) and 3,3',4,4'-tetra(tert-butylperoxycarbonyl)benzophenone.

Examples of the borate salts include organoborate salt compounds described in Japanese Patent 2764769, JP-A-2002-116539 and Kunz, Martin, *Rad Tech '98, Proceeding* April, pp. 19-22, 1998 Chicago. More specifically, examples thereof include compounds described in paragraphs [0022] to [0027] of JP-A-2002-116539, supra. Other examples of the organoboron compound include organoboron transition metal coordination complexes described in JP-A-6-348011, JP-A-7-128785, JP-A-7-140589, JP-A-7-306527 and JP-A-7-292014, and specific examples thereof include ion complexes with a cationic coloring matter.

Examples of the phosphine oxides include 2,4,6-trimethylbenzoyldiphenylphosphine oxide.

Examples of the active esters include 1,2-octanedione, 1-[4-(phenylthio)-2-(O-benzoyloxime)], sulfonic acid esters and cyclic active ester compounds.

Specifically, Compounds 1 to 21 described in Examples of JP-A-2000-80068 are preferred.

Examples of the onium salts include an aromatic diazonium salt, an aromatic iodonium salt and an aromatic sulfonium salt.

Specific examples of the active halogens include the compounds described in Wakabayashi et al., *Bull Chem. Soc. Japan*, Vol. 42, page 2924 (1969), U.S. Pat. No. 3,905,815, JP-A-5-27830, and M. P. Hutt, *Journal of Heterocyclic Chemistry*, Vol. 1 (No. 3) (1970), particularly a trihalomethyl group-substituted oxazole compound and an s-triazine compound. Among these, preferred is an s-triazine derivative where at least one mono-, di- or tri-halogen-substituted methyl group is bonded to the s-triazine ring. Specifically, S-triazine and oxathiazole compounds are known, and examples thereof include 2-(p-methoxyphenyl)-4,6-bis(trichloromethyl)-s-triazine, 2-(p-styrylphenyl)-4,6-bis(trichloromethyl)-s-triazine, 2-(3-Br-4-di(ethyl acetate)amino)phenyl)-4,6-bis(trichloromethyl)-s-triazine and 2-trihalomethyl-5-(p-methoxyphenyl)-1,3,4-oxadiazole. Specific preferred examples thereof include the compounds described at pp. 14-30 of JP-A-58-15503 and pp. 6-10 of JP-A-55-77742, Compound Nos. 1 to 8 described at page 287 of JP-B-60-27673 (the term "JP-B" as used herein means an "examined Japanese patent publication"), Compound Nos. 1 to 17 described at pp. 443-444 of JP-A-60-239736, and Compound Nos. 1 to 19 described in U.S. Pat. No. 4,701,399.

Examples of the inorganic complexes include bis-($\eta^5$-2,4-cyclopentadien-1-yl)-bis(2,6-difluoro-3-(1H-pyrrol-1-yl)-phenyl)titanium.

Examples of the coumarins include 3-ketocoumarin.

These initiators may be used individually or as a mixture. Various examples are also described in *Saishin UV Koka Giiutsu (Latest UV Curing Technologies)*, page 159, Technical Information Institute Co., Ltd. (1991), and Kiyomi Kato, *Shigaisen Koka System (Ultraviolet Curing System)*, pp. 65-148, Sogo Gijutsu Center (1989), and these are useful in the present invention.

Preferred examples of the commercially available photoradical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd.; Irgacure (e.g., 651, 184, 500, 819, 907, 369, 1173, 1870, 2959, 4265, 4263) produced by Ciba Specialty Chemicals Corp.; Esacure (KIP100F, KB1, EB3, BP, X33, KT046, KT37, KIP150, TZT) produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

<Photosensitizer>

In addition to the photopolymerization initiator, a photosensitizer may be used. Specific examples of the photosensitizer include n-butylamine, triethylamine, tri-n-butylphosphine, Michler's ketone and thioxanthone.

Furthermore, one or more auxiliary agents such as azide compound, thiourea compound and mercapto compound may be used in combination.

Examples of the commercially available photosensitizer include KAYACURE (DMBI, EPA) produced by Nippon Kayaku Co., Ltd.

<Thermal Radical Initiator>

As for the thermal radical initiator, an organic or inorganic peroxide, an organic azo or diazo compound, and the like may be used.

More specifically, examples of the organic peroxide include benzoyl peroxide, halogen benzoyl peroxide, lauroyl peroxide, acetyl peroxide, dibutyl peroxide, cumene hydroperoxide and butyl hydroperoxide; examples of the inorganic peroxide include hydrogen peroxide, ammonium persulfate and potassium persulfate; examples of the azo compound include 2,2'-azobis(isobutyronitrile), 2,2'-azobis(propionitrile) and 1,1'-azobis(cyclohexanecarbonitrile); and examples of the diazo compound include diazoaminobenzene and p-nitrobenzenediazonium.

(SP Value)

The SP value of a compound is a solubility parameter expressing by a numerical value how easily soluble in a solvent or the like and has the same meaning as the polarity often used for an organic compound. A larger SP value indicates that the polarity is larger. The binder polymer of the low refractive index layer for use in the present invention is a heat-curable and/or ionizing radiation-curable fluorine-containing polymer and the SP value thereof as calculated by the Fedors method is, for example, 20 or less. The SP value of each of the polymerization initiator and the ethylenically unsaturated group-containing curable compound for use in the present invention is preferably larger than that of the binder polymer using these together. By virtue of this difference in the SP value, at least one polymerization initiator and an ethylenically unsaturated group-containing curable compound are considered to localize in the lower part of the low refractive index layer.

The structure and SP value (calculated by the Fedors method) of initiators and ethylenically unsaturated group-containing curable compounds which can be preferably used in the present invention are set forth below, but the present invention is not limited thereto.

Initiator:

Compound 1

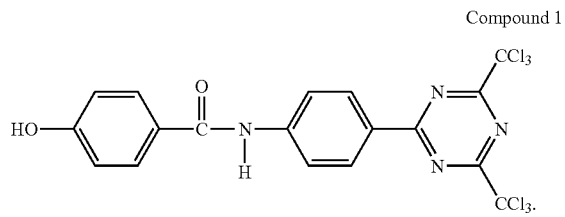

SP Value=29.1

SP Value=24.7

Compound 2

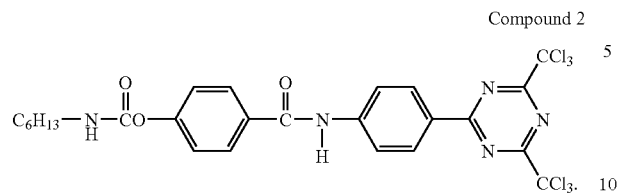

SP Value=25.4

SP Value=24.3

Compound 4

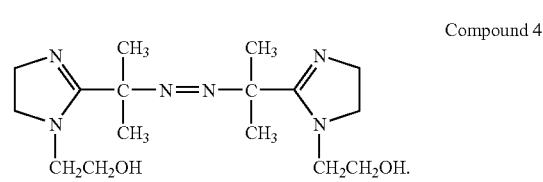

Compound 3

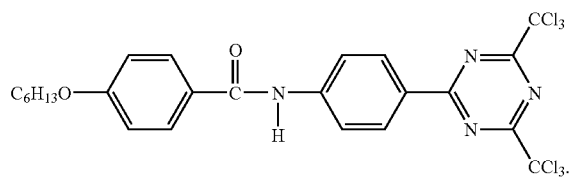

Compound 5

SP Value=27.8

Organosilane Compound Coupled with Initiator:

Compound 6

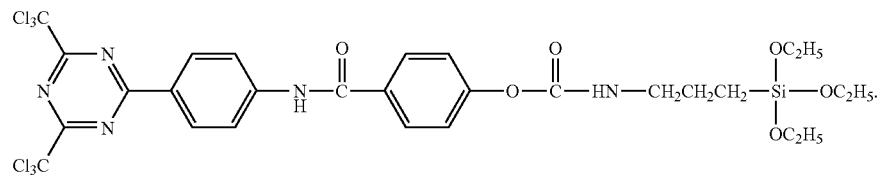

SP Value=24

Water-Soluble Initiator:

Compound 7

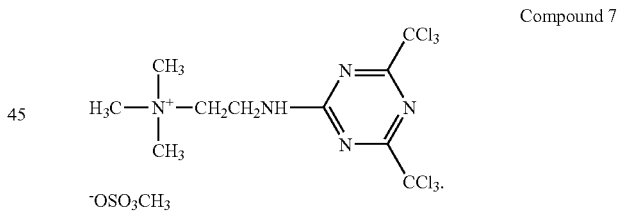

SP Value=immeasurable (no parameter)

Compound where an Ethylenically Unsaturated Group-Containing Compound and a Polymerization Initiating Moiety are Coupled Together within the Molecule:-

Compound 8

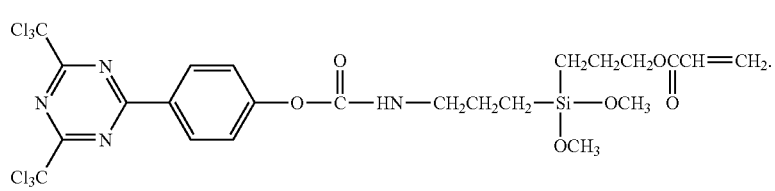

SP Value=25.7

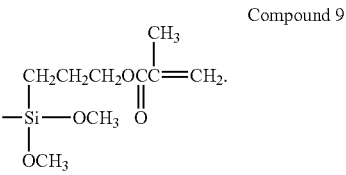

Compound 9

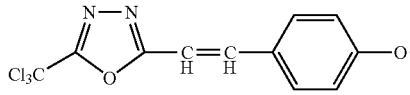

SP Value=21.7

Crosslinking Compound:

In the case where the monomer or polymer binder constituting the present invention lacks satisfactory curability by itself, the necessary curability can be imparted by blending a crosslinking compound.

For example, when the polymer body contains a hydroxyl group, various amino compounds are preferably used as the curing agent. The amino compound used as the crosslinking compound is, for example, a compound having two or more groups in total of either one or both of a hydroxyalkylamino group and an alkoxyalkylamino group, and specific examples thereof include a melamine-based compound, a urea-based compound, a benzoguanamine-based compound and a glycoluril-based compound.

The melamine-based compound is generally known as a compound having a skeleton of a nitrogen atom being bonded to the triazine ring, and specific examples thereof include melamine, alkylated melamine, methylol melamine and alkoxylated methyl melamine. A compound having two or more groups in total of either one or both of a methylol group and an alkoxylated methyl group within one molecule is preferred. Specifically, a methylolated melamine obtained by reacting melamine and formaldehyde under basic conditions, an alkoxylated methyl melamine, and a derivative thereof are preferred, and an alkoxylated methyl melamine is more preferred because good storage stability of the curable resin composition and good reactivity are obtained. The methylolated melamine and alkoxylated methyl melamine used as the crosslinking compound are not particularly limited, and various resinous materials obtained by the method described, for example, in *Plastic Zairvo Koza* (*Plastic Material Course*) [8] *Urea-Melamine Jushi* (*Urea-Melamine Resin*), Nikkan Kogyo Shinbun-Sha, can also be used.

Examples of the urea-based compound include, in addition to urea, a polymethylolated urea and its derivative such as alkoxylated methylurea and urone ring-containing methylolated urone or alkoxylated methylurone. Also as for the compound such as urea derivative, various resinous materials described in the publication above can be used.

(Curing Catalyst (Thermal Acid Generator))

In the film of the present invention, an acid generated upon irradiation with ionizing radiation or heat can be used as the curing catalyst for accelerating the curing.

The thermal acid generator is preferably a salt comprising an acid and an organic base. Examples of the acid include an organic acid such as sulfonic acid, phosphonic acid and carboxylic acid, and an inorganic acid such as sulfuric acid and phosphoric acid. In view of compatibility with the polymer, an organic acid is more preferred, a sulfonic acid and a phosphonic acid are still more preferred, and a sulfonic acid is most preferred. Preferred examples of the sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH) and nonafluorobutane-1-sulfonic acid (NFBS), and these all can be preferably used (abbreviations are shown in parentheses).

The thermal acid generator greatly changes depending on the basicity and boiling point of the organic base combined with the acid. The thermal acid generators preferably used in the present invention from respective standpoints are described below.

As the basicity of the organic base is lower, the acid generation efficiency at the heating is higher, and this is preferred in view of curing activity, but if the basicity is too low, the storage stability becomes insufficient. Accordingly, an organic base having appropriate basicity is preferably used. When pKa of the conjugated acid is used as an index indicative of basicity, the pKa of the organic base for use in the present invention needs to be from 5.0 to 10.5 and is preferably from 6.0 to 10.0, more preferably from 6.5 to 10.0. As for the pKa value of the organic base, the values in an aqueous solution are described in *Kagaku Binran* (*Chemical Handbook*) *Kiso-Hen* (*Basic Edition*), 5th rev., Vol. 2, pp. II-334 to 340, compiled by The Chemical Society of Japan, Maruzene (2004), and an organic base having an appropriate pKa can be selected therefrom. Even when not described in this publication, a compound estimated to have an appropriate pKa from its structure can also be preferably used. Compounds having an appropriate pKa described in the publication above are shown in the Table below, but the compounds which can be preferably used in the present invention are not limited thereto.

TABLE 5

|  |  | pKa |
|---|---|---|
| b-1 | N,N-dimethylaniline | 5.1 |
| b-2 | benzimidazole | 5.5 |
| b-3 | pyridine | 5.7 |
| b-4 | 3-methylpyridine | 5.8 |
| b-5 | 2,9-dimethyl-1,10-phenanthroline | 5.9 |
| b-6 | 4,7-dimethyl-1,10-phenanthroline | 5.9 |
| b-7 | 2-methylpyridine | 6.1 |
| b-8 | 4-methylpyridine | 6.1 |
| b-9 | 3-(N,N-dimethylamino)pyridine | 6.5 |
| b-10 | 2,6-dimethylpyridine | 7.0 |
| b-11 | imidazole | 7.0 |
| b-12 | 2-methylimidazole | 7.6 |
| b-13 | N-ethylmorpholine | 7.7 |
| b-14 | N-methylmorpholine | 7.8 |
| b-15 | bis(2-methoxyethyl)amine | 8.9 |
| b-16 | 2,2'-iminodiethanol | 9.1 |
| b-17 | N,N-dimethyl-2-aminoethanol | 9.5 |
| b-18 | trimethylamine | 9.9 |
| b-19 | triethylamine | 10.7 |

As the boiling point of the organic base is lower, the acid generation efficiency at the heating is higher, and this is preferred in view of curing activity. Accordingly, an organic base having an appropriate boiling point is preferably used.

The boiling point of the base is preferably 120° C. or less, more preferably 80° C. or less, still more preferably 70° C. or less.

Examples of the organic base which can be preferably used in the present invention include, but are not limited to, the following compounds. The boiling points are shown in parentheses.

b-3: pyridine (115° C.), b-14: 4-methylmorpholine (115° C.), b-20: diallylmethylamine (111° C.), b-19: triethylamine (88.8° C.), b-21: tert-butylmethylamine (67 to 69° C.), b-22: dimethylisopropylamine (66° C.), b-23: diethyhnethylamine (63 to 65° C.), b-24: dimethylethylamine (36 to 38° C.), and b-18: trimethylamine (3 to 5° C.).

The boiling point of the organic base for use in the present invention is from 35 to 85° C. If the boiling point is higher than this range, scratch resistance may be worsened, whereas if it is less than 35° C., the coating solution becomes unstable. The boiling point is preferably from 45 to 80° C. and most preferably from 55 to 75° C.

In use as the thermal acid generator of the present invention, a salt comprising the acid and the organic base may be isolated and used or after mixing the acid and the organic base to form a salt in a solution, the solution may be used. For both the acid and the organic base, one species may be used alone or a plurality of species may be mixed and used. In mixing the acid and the organic base, these are preferably mixed such that the equivalent ratio of the acid and the organic base becomes 1:from 0.9 to 1.5, more preferably 1:from 0.95 to 1.3, still more preferably 1:from 1.0 to 1.1.

The ratio of the thermal acid generator used is preferably from 0.01 to 10 parts by mass, more preferably from 0.1 to 5 parts by mass, still more preferably from 0.2 to 3 parts by mass, per 100 parts by mass of the fluorine-containing polymer in the curable resin composition.

In the present invention, in addition to the thermal acid generator, a compound capable of generating an acid upon irradiation with light, that is, a photosensitive acid generator, may be further added. The photosensitive acid generator is a substance which imparts photosensitivity to the film coating of the curable resin composition and enables to photocure the film coating, for example, by irradiating radiation such as light. Examples of the photosensitive acid generator include (1) various onium salts such as iodonium salt, sulfonium salt, phosphonium salt, diazonium salt, ammonium salt and pyridinium salt; (2) sulfone compounds such as β-ketoester, β-sulfonylsulfone and their α-diazo compound; (3) sulfonic acid esters such as alkylsulfonic acid ester, haloalkylsulfonic acid ester, arylsulfonic acid ester and imino sulfonate; (4) sulfonimide compounds; (5) diazomethane compounds; (6) trihalomethyltriazines; and others, and these may be appropriately used.

One of these photosensitive acid generators may be used alone or two or more species thereof may be used in combination, and the photosensitive acid generator may also be used in combination with the above-described thermal acid generator. The proportion of the photosensitive acid generator used is preferably from 0 to 20 parts by mass, more preferably from 0.1 to 10 parts by mass, per 100 parts by mass of the fluorine-containing polymer in the curable resin composition. When the proportion of the photosensitive acid generator is not more than the upper limit above, the cured film obtained has excellent strength and good transparency and this is preferred.

<Photosensitive Acid Generator (Photoacid Generator)>

In the present invention, a photosensitive acid generator may also be used. Examples of the photoacid generator include known compounds such as photo-initiator for photo-cationic polymerization, photo-decoloring agent for coloring matters, photo-discoloring agent and known acid generator used for microresist or the like, and a mixture thereof. Examples of the acid generator include an organic halogenated compound, a disulfone compound and an onium compound. Of these, specific examples of the organohalogen compound and the disulfone compound are the same as those described above for the radical-generating compound.

Examples of the photosensitive acid generator include (1) various onium salts such as iodonium salt, sulfonium salt, phosphonium salt, diazonium salt, ammonium salt and pyridinium salt; (2) sulfone compounds such as β-ketoester, β-sulfonylsulfone and their α-diazo compound; (3) sulfonic acid esters such as alkylsulfonic acid ester, haloalkylsulfonic acid ester, arylsulfonic acid ester and imino sulfonate; (4) sulfonimide compounds; and (5) diazomethane compounds.

Examples of the onium compound include a diazonium salt, an ammonium salt, an iminium salt, a phosphonium salt, an iodonium salt, a sulfonium salt, an arsonium salt and a selenonium salt. Among these, a diazonium salt, an iodonium salt, a sulfonium salt and an iminium salt are preferred in view of photosensitivity for the initiation of photopolymerization, material stability of the compound, and the like. Examples thereof include the compounds described in paragraphs [0058] and [0059] of JP-A-2002-29162.

Also, the wavelength at which the photosensitive acid generator exhibits maximum absorption is preferably 450 nm, more preferably from 250 to 450 nm, still more preferably from 310 to 450 nm.

The proportion of the photosensitive acid generator used is preferably from 0.01 to 10 parts by mass, more preferably from 0.1 to 5 parts by weight, per 100 parts by mass of the curable resin composition.

As for other specific compounds and use methods, those described, for example, in JP-A-2005-43876 can be used.

(Silane Coupling Agent Represented by Formula (a) or its Hydrolysate/Condensation Reaction Product)

In the present invention, the overcoat layer and/or the low refractive index layer preferably contains a silane coupling agent represented by the following formula (a) or at least either a hydrolysate of the silane coupling agent or a condensation reaction product of the hydrolysate. By virtue of using a compound represented by formula (a) as the silane coupling agent, an antireflection film excellent in adhesion, particularly, interface adhesion, is obtained.

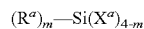   Formula (a):

In formula (a), the substituent contained in $R^a$ is not particularly limited, but examples thereof include a halogen atom (e.g., fluorine, chlorine, bromine), a hydroxyl group, a mercapto group, a carboxyl group, an epoxy group, an alkyl group (e.g., methyl, ethyl, i-propyl, propyl, tert-butyl), an aryl group (e.g., phenyl, naphthyl), an aromatic heterocyclic group (e.g., furyl, pyrazolyl, pyridyl), an alkoxy group (e.g., methoxy, ethoxy, i-propoxy, hexyloxy), an aryloxy group (e.g., phenoxy), an alkylthio group (e.g., methylthio, ethylthio), an arylthio group (e.g., phenylthio), an alkenyl group (e.g., vinyl, 1-propenyl), an acyloxy group (e.g., acetoxy, acryloyloxy, methacryloyloxy), an alkoxycarbonyl group (e.g., methoxycarbonyl, ethoxycarbonyl), an aryloxycarbonyl group (e.g., phenoxycarbonyl), a carbamoyl group (e.g., carbamoyl, N-methylcarbamoyl, N,N-dimethylcarbamoyl, N-methyl-N-octylcarbamoyl), an acylamino group (e.g., acetylamino, benzoylamino, acrylamino, methacrylamino) and an isocyanate group. These substituents each may be further substituted. Incidentally, in the context of the present invention, even when a single atom is substituted to the hydrogen atom, for the sake of convenience, this is referred to as a substituent.

$R^a$ is preferably a substituent having any one group out of a halogen atom, a hydroxyl group, a mercapto group, a carboxyl group, an epoxy group, an aryl group, an alkoxy group, an aryloxy group, an alkenyl group, an acyloxy group, an alkoxycarbonyl group, an aryloxycarbonyl group, a carbamoyl group, an acylamino group and an isocyanate group, more preferably a substituent having any one group out of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, an acylamino group and an isocyanate group, still more preferably a substituent having any one group out of an epoxy group, an acyloxy group and an acylamino group, yet still more preferably an acryloyloxy group.

When a plurality of $R^a$'s are present, at least one is preferably a substituted alkyl group or a substituted aryl group. In particular, the substituted alkyl group or substituted aryl group preferably further has a vinyl polymerizable group. In this case, the compound represented by formula (a) may be expressed as a vinyl polymerizable substituent-containing silane coupling agent represented by the following formula (4).

$X^a$ represents an unsubstituted alkyl group, a hydroxyl group or a hydrolyzable group. Examples of the hydrolyzable group include an alkoxy group (preferably an alkoxy group having a carbon number of 1 to 5, such as methoxy group and ethoxy group), a halogen atom (e.g., Cl, Br, I) and an $R^2COO$ group (wherein $R^2$ is preferably a hydrogen atom or an alkyl group having a carbon number of 1 to 5, such as $CH_3COO$ and $C_2H_5COO$). Among these, an alkoxy group is preferred, and a methoxy group and an ethoxy group are more preferred.

m represents an integer satisfying $1 \leq m \leq 3$. When a plurality of $R^a$'s or $X^a$'s are present the plurality of $R^a$'s or $X^a$'s may be the same or different. m is preferably an integer of 0 to 2.

The silane coupling agent represented by formula (a) is preferably a compound represented by the following formula (4). By virtue of using a compound represented by formula (4) as the silane coupling agent, an antireflection film having more excellent interface adhesion is obtained.

Formula (4):

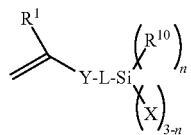

In formula (4), $R^1$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R^1$ is preferably a hydrogen atom, a methyl group, a methoxy group, a methoxycarbonyl group, a cyano group, a fluorine atom or a chlorine atom, more preferably a hydrogen atom, a methyl group, a methoxycarbonyl group, a fluorine atom or a chlorine atom, still more preferably a hydrogen atom or a methyl group.

Y represents a single bond, an ester group, an amido group, an ether group or a urea group and is preferably a single bond, an ester group or an amido group, more preferably a single bond or an ester group, still more preferably an ester group.

L represents a divalent linking chain and is specifically a substituted or unsubstituted alkylene group, a substituted or unsubstituted arylene group, a substituted or unsubstituted alkylene group having in the inside thereof a linking group (e.g., ether, ester, amido), or a substituted or unsubstituted arylene group having in the inside thereof a linking group, preferably a substituted or unsubstituted alkylene group having a carbon number of 2 to 10, a substituted or unsubstituted arylene group having a carbon number of 6 to 20, or an alkylene group having in the inside thereof a linking group and having a carbon number of 3 to 10, more preferably an unsubstituted alkylene group, an unsubstituted arylene group or an alkylene group having in the inside thereof an ether or ester linking group, still more preferably an unsubstituted alkylene group or an alkylene group having in the inside thereof an ether or ester linking group. Examples of the substituent include a halogen, a hydroxyl group, a mercapto group, a carboxyl group, an epoxy group, an alkyl group and an aryl group. These substituents each may be further substituted.

n represents 0 or 1. When a plurality of X's are present, the plurality of X's may be the same or different. n is preferably 0.

$R^{10}$ has the same meaning as $R^{10}$ in formula (b) and is preferably a substituted or unsubstituted alkyl group or an unsubstituted aryl group, more preferably an unsubstituted alkyl group or an unsubstituted aryl group.

As for the solvent, catalyst and reaction conditions used at the hydrolysis and condensation reaction for obtaining a hydrolysate of the silane coupling agent and a condensation reaction product of the hydrolysate, the solvents, catalysts and reaction conditions described above for the (A) hydrolysate of organosilane and a condensation reaction product of the hydrolysate can be applied.

The silane coupling agent represented by formula (a), a hydrolysate of the silane coupling agent and a condensation reaction product of the hydrolysate may have a chain structure or a three-dimensional network structure. The mass average molecular weight of this component is preferably from 500 to 10,000, more preferably from 800 to 9,000, still more preferably from 1,000 to 8,000, in terms of polystyrene. When the mass average molecular weight is in this range, the low refractive index layer can be assured of sufficiently high scratch resistance.

The mass average molecular weight is a molecular weight measured by the differential refractometer detection in a GPC analyzer using a column of TSKgel GMHxL, TSKgel G4000HxL or TSKgel G2000HxL (all trade names, produced by Tosoh Corp.) and a solvent of THF, and expressed in terms of polystyrene.

[Inorganic Fine Particle]

The average particle diameter of the inorganic fine particle is preferably from 5 to 200 nm, more preferably from 10 to 100 nm, still more preferably from 15 to 85 nm. Also the content of the inorganic fine particle in the cured film is preferably from 5 to 80 mass %, more preferably from 10 to 70 mass %, still more preferably from 15 to 65 mass %. When the inorganic fine particle content is not less than this lower limit, the scratch resistance can be effectively improved and when it is not more than the upper limit above, a trouble such as generation of fine irregularities on the cured film surface or worsening of appearance (e.g., dense black appearance) or integrated reflectance does not occur. Therefore, the content of the inorganic fine particle is preferably in the above-described range.

The inorganic fine particle contained in the cured film preferably has a low refractive index. Examples of such an inorganic fine particle include fine particles of magnesium fluoride and silica. Particularly, in view of refractive index, dispersion stability and cost, a silica fine particle is preferred. The silica fine particle may be crystalline or amorphous and may be a monodisperse particle or may be even an aggregate particle as long as the predetermined particle diameter is satisfied. The shape is most preferably spherical but even if infinite form, there arises no problem. Here, the average particle diameter of the inorganic fine particle is measured by a Coulter counter.

In order to more reduce the increase in the refractive index of the cured film, an inorganic fine particle having pores at least in either the inside or surface, particularly, a silica fine particle, is preferably used as the inorganic fine particle. Above all, a hollow silica fine particle is preferred. The refractive index of the hollow silica fine particle is preferably from 1.17 to 1.40, more preferably from 1.17 to 1.35, still more preferably from 1.17 to 1.30. The refractive index used here indicates the refractive index of the particle as a whole and does not indicate the refractive index of only the silica component as an outer shell forming the hollow silica particle. In view of strength of the particle and scratch resistance of the low refractive index layer containing the hollow particle, the refractive index of the hollow silica fine particle is preferably 1.17 or more.

Incidentally, the refractive index of the hollow silica particle can be measured by an Abbe's refractometer [manufactured by ATAGO K.K.] and is a value at 25° C. with D-line.

If the average pore diameter of pores contained in the inorganic fine particle such as hollow particle is too small, the effect of decreasing the refractive index is small, whereas if it is excessively large, the strength of the particle decreases and there tends to arise a problem that the scratch resistance lowers. Accordingly, the average pore diameter of pores possessed (present) at least in either the inside or the surface is preferably from 0.01 to 90 nm, more preferably from 4 to 90 nm, still more preferably from 4 to 80 nm. In view of refractive index and strength of the inorganic fine particle, the average pore diameter is preferably in the above-described range.

[Preparation Method of Hollow Fine Particle (Void-Containing Fine Particle]

A preferred production method of the hollow fine particle is described below. The first stage is the formation of a core particle which can be removed by an after-treatment, the second stage is the formation of a shell layer, the third stage is the dissolution of the core particle, and if desired, the fourth stage is the formation of an additional shell phase. Specifically, the hollow particle can be produced according to the production method of a hollow silica fine particle described, for example, in JP-A-2001-233611.

A preferred production method of the porous particle is a method where in the first stage, a porous core particle is produced by controlling the degree of hydrolysis or condensation of an alkoxide or the kind or amount of the coexisting substance, and in the second stage, a shell layer is formed on the surface of the core particle. Specifically, the porous particle can be produced by the method described, for example, in JP-A-2003-327424, JP-A-2003-335515, JP-A-2003-226516 and JP-A-2003-238140.

In the present invention, the adsorbed water amount of the inorganic fine particle, which is described later, is preferably decreased. The adsorbed water amount can be controlled by changing the particle size or shell thickness or selecting the hydrothermal treatment conditions or the like and may also be decreased by firing the particle. By virtue of decreasing the adsorbed water amount, the water droplet adhesion trace on the antireflection film, which is described later, can be reduced.

The adsorbed water amount can be decreased by increasing the shell thickness and thereby decreasing the adsorption site on the particle surface, but when the shell is formed of an electrically conductive component, electrical conductivity can be imparted and this is preferred. In particular, a combination using a silica-based porous or hollow particle as the core particle and using $ZnO_2$, $Y_2O_3$, $Sb_2O_5$, ATO, ITO or $SnO_2$ as the shell is preferred. An antimony oxide-coated silica-based fine particle which is particularly preferred is described below.

In the antimony oxide-coated silica-based fine particle for use in the present invention, a porous silica-based fine particle or a silica-based fine particle having a cavity in the inside is coated with an antimony oxide coat layer.

The porous silica-based fine particle includes a porous silica fine particle and a composite oxide fine particle mainly comprising silica, and a low-refractive-index nanometer-size composite oxide fine particle obtained by coating the surface of a porous inorganic oxide fine particle with silica or the like described in JP-A-7-133105 can be suitably used.

As for the silica-based fine particle having a cavity in the inside, a low-refractive-index nanometer-size silica-based fine particle comprising silica and an inorganic oxide other than silica and having a cavity in the inside described in JP-A-2001-233611 can also be suitably used.

The porous silica-based fine particle or the silica-based fine particle having a cavity in the inside preferably has an average particle diameter of 4 to 100 nm, more preferably from 8 to 90 nm. A silica-based fine particle having an average particle of 4 nm or more is preferred in that this fine particle is easily obtained and stable and a monodisperse antimony oxide-coated silica-based fine particle is obtained. It is preferred that the average particle diameter of the obtained antimony oxide-coated silica-based fine particle does not exceed 100 nm, and in view of transparency or haze of the transparent film, the average particle diameter is preferably 90 nm or less.

The refractive index of the porous silica-based fine particle or the silica-based fine particle having a cavity in the inside is preferably 1.45 or less which is the refractive index of silica, more preferably 1.40 or less. Incidentally, a non-porous silica fine particle having a refractive index of 1.45 to 1.46 may be used alone, but the antireflection performance sometimes becomes insufficient.

The silica-based fine particle is coated with antimony oxide to form a coat layer having an average thickness of 0.5 to 30 nm, preferably from 1 to 10 nm. The average thickness of the coat layer is preferably 0.5 nm or more in that the obtained antimony oxide-coated silica-based fine particle can have sufficiently high electrical conductivity, and the thickness of the coat layer is preferably 30 nm or less in that the effect of enhancing the electrical conductivity is high and the refractive index is satisfied even when the average particle diameter of the antimony oxide-coated silica-based fine particle is small.

The antimony oxide-coated silica-based fine particle for use in the present invention preferably has an average particle diameter of 5 to 100 nm, more preferably from 10 to 100 nm. The average particle diameter of the antimony oxide-coated silica-based fine particle is preferably 5 nm or more in that the fine particle is easily obtained with less aggregated particles and satisfactory dispersibility and when used for a transparent film, good results are obtained in terms of transparency, haze, film strength, adhesion to substrate, and the like. The average particle diameter of the antimony oxide-coated silica-based fine particle is preferably 100 nm or less in view of transparency or haze of the transparent film and adhesion to the substrate.

The refractive index of the antimony oxide-coated silica-based fine particle is preferably from 1.35 to 1.60, more preferably from 1.35 to 1.50. The refractive index is preferably 1.35 or more in that the particle is easily obtained and the particle strength is sufficiently high, and the refractive index is preferably 1.60 or less in view of antireflection performance of the transparent film, though this may vary depending on the refractive index of the substrate.

The volume resistance value of the antimony oxide-coated silica-based fine particle is preferably from 10 to 5,000 Ω/cm, more preferably from 10 to 2,000 Ω/cm. The volume resistance value is preferably 10 Ω/cm or more in that the particle is easily obtained, the refractive index less exceeds 1.6 and the transparent film exhibits satisfactory antireflection performance. On the other hand, the volume resistance value is preferably 5,000 Ω/cm or less in that the transparent film exhibits satisfactory antistatic performance.

(Measurement of Adsorbed Water Amount of Inorganic Fine Particle)

In the present invention, the adsorbed water amount of the inorganic fine particle can be determined by the following measuring method. The particle as a powder is dried for 1 hour by using a rotary pump under the conditions of 20° C. and about 1 hPa and then stored for 1 hour at 20° C. and 55% RH. Using "DTG-50" manufactured by Shimadzu Corp., about 10 mg of the sample after drying is weighed in a platinum cell and the temperature is elevated to 950° C. from 20° C. at a heating rate of 20° C./min. The adsorbed water amount is calculated as the mass decrement percentage when the temperature is elevated to 200° C., according to the following mathematical formula.

$$\text{Adsorbed water amount (\%)} = 100 \times (W_{20} - W_{200})/W_{200}$$

(wherein $W_{20}$: the initial mass when the temperature starts rising, and $W_{200}$: the mass when the temperature is elevated to 200° C.).

In the case where the particle is in the state of a liquid dispersion, the solvent is distilled off by an evaporator (25° C., pressure-reduced to 10 hPa) and after grinding the residue into a powder in an agate mortar, the adsorbed water amount can be measured by the above-described procedure.

In the present invention, the adsorbed water amount is preferably 6.1 mass % or less, more preferably 5.5 mass % or less, and most preferably 5.0 mass % or less.

In the case where a plurality of kinds of particles differing in the particle size or preparation conditions are contained in the layer, it is sufficient if at least one species of those particles has an adsorbed water amount of 6.1 mass % or less. However, the proportion of the particle having an adsorbed water amount of 6.1 mass % or less occupying in all particles is preferably 30 mass % or more, more preferably 50 mass % or more, still more preferably 70 mass % or more. When the adsorbed water amount is in the above-described range, the water droplet adhesion trace is improved.

For the purpose of stabilizing the dispersion in a liquid dispersion or a coating solution or for enhancing the affinity or bindability with the binder component, the inorganic fine particle may be subjected to a physical surface treatment such as plasma discharge treatment and corona discharge treatment, or a chemical surface treatment with a surfactant, a coupling agent or the like. The inorganic fine particle is suitably used in the low refractive index layer.

(Antifouling Agent)

In the film of the present invention, particularly, in the uppermost layer of the film, an appropriate known silicone-based or fluorine-based antifouling agent, slipping agent or the like is preferably added for the purpose of imparting properties such as antifouling property, water resistance, chemical resistance and slipperiness. In the case of adding such an additive, the additive is preferably added in an amount of 0.01 to 20 mass %, more preferably from 0.05 to 10 mass %, still more preferably from 0.1 to 5 mass %, based on the entire solid content of the low refractive index layer.

<High Refractive Index Particle>

For the purpose of elevating the refractive index of the layer constituting the present invention, a cured product of a composition comprising a monomer, an initiator and an organic substituted silicon compound and having dispersed therein a high refractive index inorganic particle is preferably used. In view of the refractive index, the inorganic particle used here is preferably $ZrO_2$ or $TiO_2$. A $ZrO_2$ fine particle is most preferred for elevating the refractive index of the layer having hardcoat property (hardcoat layer), and a $TiO_2$ fine particle is most preferred as a particle for the high refractive index layer and the medium refractive index layer.

The $TiO_2$ particle is preferably an inorganic particle comprising $TiO_2$ as a main component and containing at least one element selected from cobalt, aluminum and zirconium. The "main component" means a component of which content (mass %) is largest among the components constituting the particle.

The particle comprising $TiO_2$ as a main component for use in the present invention preferably has a refractive index of 1.90 to 2.80, more preferably from 2.10 to 2.80, and most preferably from 2.20 to 2.80. The weight average primary particle diameter of the particle comprising $TiO_2$ as a main component is preferably from 1 to 200 nm, more preferably from 1 to 150 nm, still more preferably from 1 to 100 nm, yet still more preferably from 1 to 80 nm.

As for the crystal structure of the particle comprising $TiO_2$ as a main component, the main component is preferably a rutile, rutile/anatase mixed crystal, anatase or amorphous structure, more preferably a rutile structure. The "main component" means a component of which content (mass %) is largest among the components constituting the particle.

By virtue of incorporating at least one element selected from Co (cobalt), Al (aluminum) and Zr (zirconium) into the particle comprising $TiO_2$ as a main component, the photocatalytic activity of $TiO_2$ can be suppressed and the weather resistance of the film of the present invention can be improved.

The element is preferably Co (cobalt). It is also preferred to use two or more kinds of elements in combination. The inorganic particle comprising $TiO_2$ as a main component for use in the present invention may be surface-treated to have a core/shell structure as described in JP-A-2001-166104.

The amount of the monomer or inorganic particle added in the layer is preferably from 10 to 90 mass %, more preferably from 20 to 80 mass %, based on the entire mass of the binder. Two or more kinds of inorganic particles may be used in the layer.

<Antistatic Agent (Electrically Conductive Agent)>

The optical laminate can be effectively prevented from dust adhesion on the surface by containing an antistatic agent. Specific examples of the antistatic agent include a quaternary ammonium salt, a pyridinium salt, various cationic compounds having a cationic group such as primary to tertiary amino group, an anionic compound having an anionic group such as sulfonic acid base, sulfuric ester base, phosphoric ester base and phosphonic acid base, an amphoteric compound such as amino acid-based or aminosulfuric acid ester-based compound, a nonionic compound such as amino alcohol-based, glycerin-based or polyethylene glycol-based compound, a metal chelate compound such as organometallic compound (e.g., alkoxide of tin or titanium) and acetylacetonate salt thereof, an electrically conductive fine particle, an electrically conducting fine particle, and a compound resulting from increasing the molecular weight of the compound described above. Furthermore, a monomer or oligomer having a tertiary amino group, a quaternary ammonium group or a metal chelate part and being polymerizable by ionizing radiation, or a polymerizable compound such as organometallic compound (e.g., coupling agent having a functional group) may also be used as the antistatic agent.

Specific examples of the electrically conductive fine particles include those comprising a metal oxide. Examples of the metal oxide include ZnO (refractive index: 1.90; hereinafter, the numerical value in the parenthesis indicates the refractive index), $CeO_2$ (1.95), $Sb_2O_2$ (1.71), $SnO_2$ (1.997), indium tin oxide often simply referred to as ITO (1.95), $In_2O_3$ (2.00), $Al_2O_3$ (1.63), antimony-doped tin oxide (simply ATO, 2.0) and aluminum-doped zinc oxide (simply AZO, 2.0). As for the electrically conductive fine particle, those having an average particle diameter of 0.1 nm to 0.1 μm are preferred.

The electrically conducting fine particle is a metal-plated resin particle. Specific examples of the metal include Au, Ag, Cu, Pt, Cr, Ni and Zn. The plating may use one of these metals alone or may use two or more kinds thereof. As for the electrically conducting fine particle, those of 0.1 to 10 μm are preferred.

According to a preferred embodiment of the present invention, the resin and the antistatic agent are added at a ratio of the antistatic agent being from 5 to 25 parts by mass per 100 parts by mass of the resin, preferably with an upper limit of 20 parts by mass or less and a lower limit of 5 parts by mass or more.

(Leveling Agent)

For the purpose of improving the surface state (preventing unevenness), various leveling agents are preferably used in the hardcoat layer and the overcoat layer of the present invention. Similarly, for the purpose of preventing unevenness, various leveling agents are preferably used in the low refractive index layer of the present invention. Specifically, the leveling agent is preferably a fluorine-based leveling agent or a silicone-based leveling agent. Above all, a combination use of both a fluorine-based leveling agent and a silicone-based leveling agent is more preferred, because high ability of preventing unevenness is obtained. It is still more preferred to use a leveling agent in all layers.

Also, the leveling agent is preferably an oligomer or a polymer rather than a low molecular compound. When a leveling agent is added, the leveling agent swiftly undergoes uneven distribution to the surface of the coated liquid film and the leveling agent remains unevenly distributed to the surface after drying, as a result, the surface energy of the hardcoat layer, overcoat layer or low refractive index layer to which the leveling agent is added, decreases by the effect of the leveling agent.

From the standpoint of preventing unevenness of the hardcoat layer, the surface energy of the hardcoat layer is preferably low. The surface energy ($\gamma s^v$, unit: $mJ/m^2$) of the hardcoat layer is an energy-reduced surface tension value (a value obtained by converting the mN/m unit into the $mJ/m^2$ unit) of the antiglare hardcoat layer, and the surface tension is defined as a value $\gamma s^v$ ($=\gamma s^d+\gamma s^h$) which is the sum of $\gamma s^d$ and $\gamma s^h$ obtained according to the following simultaneous equations (1) and (2) from respective contact angles $\theta_{H2O}$ and $\theta_{CH2I2}$ for pure water $H_2O$ and methylene iodide $CH_2I_2$ experimentally determined on the antiglare hardcoat layer by referring to D. K. Owens, *J. Appl. Polym. Sci.*, 13, 1741 (1969). Before the measurement, the sample needs to be subjected to humidity conditioning under predetermined temperature and humidity conditions for not less than a fixed time. At this time, the temperature is preferably from 20 to 27° C., the humidity is preferably from 50 to 65 RH %, and the humidity conditioning time is preferably 2 hours or more.

$$1+\cos \theta_{H2O}=2\sqrt{\gamma s^d}(\sqrt{\gamma_{H2O}{}^d}/\gamma_{H2O}{}^v)+2\sqrt{\gamma s^h}(\sqrt{\gamma_{H2O}{}^h}/\gamma_{H2O}{}^v) \quad (1)$$

$$1+\cos \theta_{CH2I2}=2\sqrt{\gamma s^d}(\sqrt{\gamma_{CH2I2}{}^d}/\gamma_{CH2I2}{}^v)+2\sqrt{\gamma s^h}(\sqrt{\gamma_{CH2I2}{}^h}/\gamma_{CH2I2}{}^v) \quad (2)$$

wherein $\gamma_{H2O}{}^d=21.8°$, $\gamma_{H2O}{}^h=51.0°$, $\gamma_{H2O}{}^v=72.8°$, $\gamma_{CH2I2}{}^d=49.5°$, $\gamma_{CH2I2}{}^h=1.3°$ and $\gamma_{CH2I2}{}^v=50.8°$.

The surface energy of the hardcoat layer is preferably 45 $mJ/m^2$ or less, more preferably from 20 to 45 $mJ/m^2$, still more preferably from 20 to 40 $mJ/m^2$. By setting the surface energy of the hardcoat layer to 45 $mJ/m^2$ or less, an effect of hardly causing unevenness of the hardcoat layer can be obtained.

However, in the case of further coating an upper layer such as low refractive index layer on the hardcoat layer, the leveling agent is preferably dissolved out into the upper layer. The surface energy of the hardcoat layer after immersing the hardcoat layer with the solvent (e.g., methyl ethyl ketone, methyl isobutyl ketone, toluene, cyclohexanone) of the coating solution for the upper layer on the hardcoat layer and washing it out is preferably rather high. The surface energy here is preferably from 35 to 70 $mJ/m^2$.

The fluorine-based leveling agent preferred as the leveling agent for the hardcoat layer or overcoat layer is described below. The silicone-based leveling agent is described later.

The fluorine-based leveling agent is preferably a polymer having a fluoroaliphatic group. Furthermore, a polymer containing a repeating unit (polymerization unit) corresponding to the monomer of the following formula A, and a copolymer of an acrylic or methacrylic resin containing a repeating unit (polymerization unit) corresponding to the monomer of the following formula A and a repeating unit (polymerization unit) corresponding to the monomer of the following formula B, with a vinyl-based monomer copolymerizable therewith, are useful. As for such a monomer, those described in J. Brandrup, *Polymer Handbook*, 2nd ed., Chapter 2, pp. 1-483, Wiley Interscience (1975) may be used.

Examples thereof include a compound having one addition-polymerizable unsaturated bond selected from an acrylic acid, a methacryic acid, acrylic acid esters, methacrylic acid esters, acrylamides, methacrylamides, allyl compounds, vinyl ethers and vinyl esters.

(i) Fluoroaliphatic Group-Containing Monomer Represented by the Following Formula A Formula A:

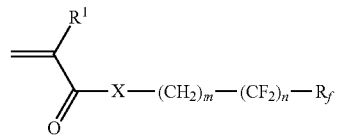

In formula A, $R^1$ represents a hydrogen atom, a halogen atom or a methyl group and is preferably a hydrogen atom or a methyl group. X represents an oxygen atom, a sulfur atom or —N($R^{12}$)— and is preferably an oxygen atom or —N($R^{12}$)—, more preferably an oxygen atom. $R^{12}$ represents a hydrogen atom or an alkyl group having a carbon number of 1 to 8 which may have a substituent, and is preferably a hydrogen atom or an alkyl group having a carbon number of 1 to 4, more preferably a hydrogen atom or a methyl group. $R_f$ represents —$CF_3$ or —$CF_2H$.

In formula A, m represents an integer of 1 to 6 and is preferably an integer of 1 to 3, more preferably 1.

In formula A, n represents an integer of 1 to 11 and is preferably an integer of 1 to 9, more preferably from 1 to 6. $R_f$ is preferably —$CF_2H$.

Also, two or more kinds of polymerization units derived from the fluoroaliphatic group-containing monomer represented by formula A may be contained as constituent components in the fluorine-based polymer.

(ii) Monomer Represented by the Following Formula B, which is Copolymerizable with (i)

Formula B:

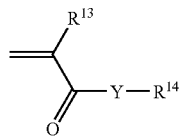

In formula B, $R^{13}$ represents a hydrogen atom, a halogen atom or a methyl group and is preferably a hydrogen atom or a methyl group. Y represents an oxygen atom, a sulfur atom or —N($R^{15}$)— and is preferably an oxygen atom or —N($R^{15}$)—, more preferably an oxygen atom. $R^{15}$ represents a hydrogen atom or an alkyl group having a carbon number of 1 to 8 and is preferably a hydrogen atom or an alkyl group having a carbon number of 1 to 4, more preferably a hydrogen atom or a methyl group.

$R^{14}$ represents a linear, branched or cyclic alkyl group having a carbon number of 1 to 60 which may have a substituent, or an aromatic group (for example, a phenyl group or a naphthyl group) which may have a substituent. The alkyl group may contain a poly(alkyleneoxy) group. $R^{14}$ is preferably a linear, branched or cyclic alkyl group having a carbon number of 1 to 20, more preferably a linear or branched alyl group having a carbon number of 1 to 10. The amount of the fluoroaliphatic group-containing monomer of formula A used for the production of the preferred fluorine-based polymer is 10 mass % or more, preferably 50 mass % or more, more preferably from 70 to 100 mass %, still more preferably from 80 to 100 mass %, based on the entire monomer amount of the fluorine-based polymer.

Specific structure examples of the preferred fluorine-based polymer are set forth below, but the present invention is not limited thereto. In the formulae, the numeral indicates the mole fraction of each monomer component, and Mw indicates the mass average molecular weight.

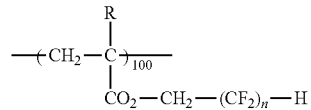

| | R | n | Mw |
|---|---|---|---|
| FP-1 | H | 4 | 8000 |
| FP-2 | H | 4 | 16000 |
| FP-3 | H | 4 | 33000 |
| FP-4 | $CH_3$ | 4 | 12000 |
| FP-5 | $CH_3$ | 4 | 28000 |
| FP-6 | H | 6 | 8000 |
| FP-7 | H | 5 | 14000 |
| FP-8 | H | 6 | 29000 |
| FP-9 | $CH_3$ | 6 | 10000 |
| FP-10 | $CH_3$ | 6 | 21000 |
| FP-11 | H | 8 | 4000 |
| FP-12 | H | 8 | 16000 |
| FP-13 | H | 8 | 31000 |
| FP-14 | $CH_3$ | 8 | 3000 |
| FP-15 | $CH_3$ | 8 | 10000 |
| FP-16 | $CH_3$ | 8 | 27000 |
| FP-17 | H | 10 | 5000 |
| FP-18 | H | 10 | 11000 |
| FP-19 | $CH_3$ | 10 | 4500 |
| FP-20 | $CH_3$ | 10 | 12000 |
| FP-21 | H | 12 | 5000 |
| FP-22 | H | 12 | 10000 |
| FP-23 | $CH_3$ | 12 | 5500 |
| FP-24 | $CH_3$ | 12 | 12000 |

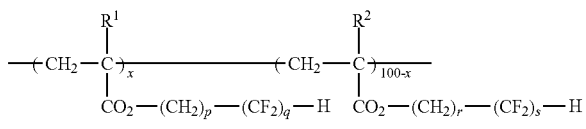

| | x | $R^1$ | p | q | $R^2$ | r | s | Mw |
|---|---|---|---|---|---|---|---|---|
| FP-25 | 50 | H | 1 | 4 | $CH_3$ | 1 | 4 | 10000 |
| FP-26 | 40 | H | 1 | 4 | H | 1 | 6 | 14000 |
| FP-27 | 60 | H | 1 | 4 | $CH_3$ | 1 | 6 | 21000 |
| FP-28 | 10 | H | 1 | 4 | H | 1 | 8 | 11000 |
| FP-29 | 40 | H | 1 | 4 | H | 1 | 8 | 16000 |
| FP-30 | 20 | H | 1 | 4 | $CH_3$ | 1 | 8 | 8000 |
| FP-31 | 10 | $CH_3$ | 1 | 4 | $CH_3$ | 1 | 8 | 7000 |
| FP-32 | 50 | H | 1 | 6 | $CH_3$ | 1 | 6 | 12000 |
| FP-33 | 50 | H | 1 | 6 | $CH_3$ | 1 | 6 | 22000 |
| FP-34 | 30 | H | 1 | 6 | $CH_3$ | 1 | 6 | 5000 |
| FP-35 | 40 | $CH_3$ | 1 | 6 | H | 3 | 6 | 3000 |
| FP-36 | 10 | H | 1 | 6 | H | 1 | 8 | 7000 |
| FP-37 | 30 | H | 1 | 6 | H | 1 | 8 | 17000 |
| FP-38 | 50 | H | 1 | 6 | H | 1 | 8 | 16000 |
| FP-39 | 50 | $CH_3$ | 1 | 6 | H | 3 | 8 | 19000 |
| FP-40 | 50 | H | 1 | 8 | $CH_3$ | 1 | 8 | 5000 |
| FP-41 | 80 | H | 1 | 8 | $CH_3$ | 1 | 8 | 10000 |
| FP-42 | 50 | $CH_3$ | 1 | 8 | H | 3 | 8 | 14000 |
| FP-43 | 90 | H | 1 | 8 | $CH_3$ | 3 | 8 | 9000 |
| FP-44 | 70 | H | 1 | 8 | H | 1 | 10 | 7000 |
| FP-45 | 90 | H | 1 | 8 | H | 3 | 10 | 12000 |
| FP-46 | 50 | H | 1 | 8 | H | 1 | 12 | 10000 |
| FP-47 | 70 | H | 1 | 8 | $CH_3$ | 3 | 12 | 8000 |

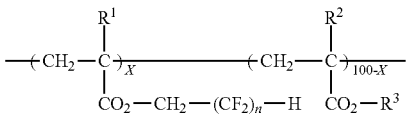

| | x | R¹ | n | R² | R³ | Mw |
|---|---|---|---|---|---|---|
| FP-48 | 90 | H | 6 | H | $C_2H_5$ | 9000 |
| FP-49 | 80 | H | 6 | H | $C_2H_5$ | 24000 |
| FP-50 | 60 | H | 6 | H | $C_2H_5$ | 36000 |
| FP-51 | 90 | H | 6 | H | $C_4H_9$ (n) | 15000 |
| FP-52 | 80 | H | 6 | H | $C_4H_9$ (n) | 17000 |
| FP-53 | 60 | H | 6 | H | $C_4H_9$ (n) | 10000 |
| FP-54 | 90 | H | 6 | H | $C_4H_9$ (iso) | 16000 |
| FP-55 | 80 | H | 6 | H | $C_4H_9$ (iso) | 18000 |
| FP-56 | 60 | H | 6 | H | $C_4H_9$ (iso) | 21000 |
| FP-57 | 90 | H | 6 | H | $C_4H_9$ (t) | 14000 |
| FP-58 | 80 | H | 6 | H | $C_4H_9$ (t) | 12000 |
| FP-59 | 60 | H | 6 | H | $C_4H_9$ (t) | 13000 |
| FP-60 | 90 | H | 6 | H | $C_6H_{13}$ (n) | 10000 |
| FP-61 | 80 | H | 6 | H | $C_6H_{13}$ (n) | 8000 |
| FP-62 | 60 | H | 6 | H | $C_6H_{13}$ (n) | 12000 |
| FP-63 | 80 | H | 4 | H | $C_2H_5$ | 25000 |
| FP-64 | 80 | H | 4 | H | $C_4H_9$ (n) | 32000 |
| FP-65 | 80 | H | 4 | H | $C_4H_9$ (iso) | 28000 |
| FP-66 | 80 | H | 4 | H | $C_4H_9$ (t) | 25000 |
| FP-67 | 80 | H | 4 | H | $C_6H_{13}$ (n) | 20000 |
| FP-68 | 80 | H | 8 | H | $C_2H_5$ | 5000 |
| FP-69 | 80 | H | 8 | H | $C_4H_9$ (n) | 6000 |
| FP-70 | 80 | H | 8 | H | $C_4H_9$ (iso) | 5000 |
| FP-71 | 80 | H | 8 | H | $C_4H_9$ (t) | 7000 |
| FP-72 | 80 | H | 8 | H | $C_6H_{13}$ (n) | 5000 |
| FP-78 | 80 | H | 4 | $CH_3$ | $C_2H_5$ | 12000 |
| FP-79 | 80 | H | 4 | $CH_3$ | $C_4H_9$ (n) | 14000 |
| FP-80 | 80 | H | 4 | $CH_3$ | $C_4H_9$ (iso) | 20000 |
| FP-81 | 80 | H | 4 | $CH_3$ | $C_4H_9$ (t) | 22000 |
| FP-82 | 80 | H | 4 | $CH_3$ | $C_6H_{15}$ (n) | 18000 |
| FP-83 | 80 | $CH_3$ | 4 | $CH_3$ | $C_2H_5$ | 6000 |
| FP-84 | 80 | $CH_3$ | 4 | $CH_3$ | $C_4H_9$ (n) | 8000 |
| FP-85 | 80 | $CH_3$ | 4 | $CH_3$ | $C_4H_9$ (iso) | 7000 |
| FP-86 | 80 | $CH_3$ | 4 | $CH_3$ | $C_4H_9$ (t) | 12000 |
| FP-87 | 80 | $CH_3$ | 4 | $CH_3$ | C6H13 (n) | 5000 |

The amount of the polymerization unit of fluoroaliphatic group-containing monomer constituting the fluorine-based polymer is preferably in excess of 10 mass %, more preferably from 50 to 100 mass %, and most preferably from 75 to 100 mass % when it is important to prevent unevenness of the hardcoat layer, or most preferably from 50 to 75 mass % when a low refractive index layer is coated on the hardcoat layer (the amount is based on all polymerization units constituting the fluorine-based polymer).

The silicone-based leveling agent is described below.

Preferred examples of the silicone-based compound include those having a substituent at the terminal and/or in the side chain of a compound chain containing a plurality of dimethylsilyloxy unites as the repeating unit. The compound chain containing dimethylsilyloxy as the repeating unit may contain a structure unit other than dimethylsilyloxy. A plurality of substituents which may be the same or different are preferably present Preferred examples of the substituent include groups containing a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group or an amino group. The molecular weight is not particularly limited but is preferably 100,000 or less, more preferably 50,000 or less, still more preferably from 1,000 to 30,000, and most preferably from 1,000 to 20,000. The silicon atom content of the silicone-based compound is not particularly limited but is preferably 18.0 mass % or more, more preferably from 25.0 to 37.8 mass %, and most preferably from 30.0 to 37.0 mass %. Preferred examples of the silicone-based compound include, but are not limited to, X-22-174DX, X-22-2426, X-22-164B, X22-164C, X-22-170DX, X-22-176D and X-22-1821 (all trade names) produced by Shin-Etsu Chemical Co., Ltd.; FM-0725, FM-7725, FM-4421, FM-5521, FM6621 and FM-1121 produced by Chisso Corp.; DMS-U22, RMS-033, RMS-083, UMS-182, DMS-H21, DMS-H31, HMS-301, FMS121, FMS123, FMS131, FMS141 and FMS221 (all trade names) produced by Gelest; SH200, DC11PA, SH28PA, ST80PA, ST86PA, ST97PA, SH550, SH710, L7604, FZ-2105, FZ2123, FZ2162, FZ-2191, FZ2203, FZ-2207, FZ-3704, FZ-3736, FZ-3501, FZ-3789, L-77, L-720, L-7001, L-7002, L-7604, Y-7006, SS-2801, SS-2802, SS-2803, SS-2804 and SS-2805 (all trade names) produced by Dow Corning Toray Co., Ltd.; and TSF400, TSF401, TSF410, TSF433, TSF4450 and TSF4460 (all trade names) produced by GE Toshiba Silicones.

The amount of the fluorine-based leveling agent or silicone-based leveling agent added is preferably from 0.001 to 1.0 mass %, more preferably from 0.01 to 0.2 mass %, based on the coating solution.

(Coating Solvent)

As for the solvent used in the coating composition for forming each layer of the present invention, various solvents selected from the standpoint, for example, whether the solvent can dissolve or disperse each component, readily provides a uniform surface state in the coating step and drying step, can ensure liquid storability or has an appropriate saturated vapor pressure, may be used.

Two or more kinds of solvents may be mixed and used. In view of the drying load, it is preferred that a solvent having a boiling point of 120° C. or less at room temperature under atmospheric pressure is used as the main component and a small amount of a solvent having a boiling point of 120° C. or more is contained for adjusting the drying speed.

Out of the solvents contained in the low refractive index coating solution, the solvent having a boiling point of 120° C. or more is contained in an amount of 3 to 50 mass %, preferably from 3 to 40 mass %, more preferably from 5 to 30 mass % based on a total amount of the low refractive index coating composition.

Examples of the solvent having a boiling point of 120° C. or less include hydrocarbons such as hexane (boiling point: 68.7° C.), heptane (98.4° C.), cyclohexane (80.7° C.), benzene (80.1° C.) and toluene (110.6° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.) and tetrahydrofuran (66° C.); esters such as ethyl formate (54.2° C.), methyl acetate (57.8° C.), ethyl acetate (77.1° C.) and isopropyl acetate (89° C.); ketones such as acetone (56.1° C.), 2-butanone (same as methyl ethyl ketone, 79.6° C.), isobutyl acetate (118° C.) and 2-methyl-4-pentanone (same as MIBK, 115.9° C.); alcohols such as methanol (64.5° C.), ethanol (78.3° C.), 2-propanol (82.4° C.) and 1-propanol (97.2° C.); cyano compounds such as acetonitrile (81.6° C.) and propionitrile (97.4° C.); carbon disulfide (46.2° C.); and dioxane (101.3° C.). Among these, ketones, esters and hydrocarbons are preferred, and ketones are more preferred. Out of ketones, 2-butanone and 2-methyl-4-pentanone are preferred.

Examples of the solvent having a boiling point of 120° C. or more include octane (125.7° C.), xylene (138° C.), tetrachloroethylene (121.2° C.), chlorohenzene (131.7° C.), dibutyl ether (142.4° C.), cyclohexanone (155.7° C.), 1-butanol (117.7° C.), N,N-dimethylformamide (153° C.), N,N-dimethylacetamide (166° C.), dimethyl sulfoxide (189° C.) and propylene glycol monomethyl ether acetate. Among these, cyclohexanone, 2-methyl-4-pentanone and propylene glycol monomethyl ether acetate are preferred.

(Others)

In the film of the present invention, a resin, a coupling agent, a coloration inhibitor, a coloring agent (e.g., pigment, dye), a defoaming agent, a leveling agent a flame retardant, an ultraviolet absorbent, an infrared absorbent, an adhesion-imparting agent, a polymerization inhibitor, an antioxidant, a surface modifier and the like may be added in addition to the components described above.

The layer having hardcoat property for use in the present invention can be formed of a (curable) resin. The curable resin is preferably transparent, and specific examples thereof include three types: that is, an ionizing radiation-curable resin which is a resin cured by the effect of ultraviolet light or electron beam; a mixture of an ionizing radiation-curable resin and a solvent drying-type resin; and a heat-curable resin. An ionizing radiation-curable resin is preferred.

Examples of the ionizing radiation-curable resin include an acrylate-based functional group-containing resin such as relatively low-molecular weight polyester resin, polyether resin, acrylic resin, epoxy resin, urethane resin, alkyd resin, spiroacetal resin, polybutadiene resin, polythiolpolyene resin, oligomer or prepolymer of (meth)acrylate or the like of polyfunctional compound (e.g., polyhydric alcohol), and reactive diluent. Specific examples thereof include a mono-functional or polyfunctional monomer of ethyl(meth)acrylate, ethylhexyl(meth)acrylate, styrene, methylstyrene and N-vinylpyrrolidone, such as polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerytbritol hexa(meth)acrylate, 1,6-hexanediol di(meth)acrylate and neopentyl glycol di(meth)acrylate.

In order to elevate the refractive index of the layer having hardcoat property, the resin in the layer having hardcoat property for use in the present invention is preferably a resin comprising an oxide of at least one metal selected from titanium, zirconium, aluminum, indium, zinc, tin and antimony. In this case, an inorganic filler having an average particle diameter of 0.2 µm or less, preferably 0.1 µm or less, more preferably 0.06 µm or less, may be incorporated.

The amount of the inorganic filler added is preferably from 10 to 90 mass %, more preferably from 20 to 80%, still more preferably from 30 to 75%, based on the entire mass of solid contents in the layer having hardcoat property. This filler has a particle diameter sufficiently smaller than the wavelength of light and therefore, causes no scattering, and the dispersion element obtained by dispersing the filler in a binder polymer acts as an optically uniform substance.

The bulk refractive index of the mixture of the light-transparent resin binder and the inorganic filler in the layer having hardcoat property for use in the present invention, that is, the refractive index of (the matrix of) the antiglare hardcoat layer, is from 1.48 to 1.65, more preferably from 1.49 to 1.63, still more preferably from 1.50 to 1.59. The refractive index in this range can be obtained by appropriately selecting the kinds of the binder and the inorganic filler and the ratio between their amounts.

In the case of using the ionizing radiation-curable resin as an ultraviolet-curable resin, a photopolymerization initiator is preferably used. Specific examples of the photopolymerization initiator include acetophenones, benzophenones, Michler's benzoyl benzoate, α-amyloxime ester, tetramethylthiuram monosulfide and thioxanthones. Also, a photosensitizer is preferably mixed and used, and specific examples thereof include n-butylamine, triethylamine and poly-n-butylphosphine.

As for the photopolymerization initiator, a commercially available product may be used. A preferred example of, for example, the photocleaving photoradical polymerization initiator is Irgacure (127, 184, 907) produced by Ciba-Geigy Limited, Japan. The photopolymerization initiator is preferably used in the range from 0.1 to 10 parts by mass, more preferably from 3 to 7 parts by mass, per 100 parts by mass of the polyfunctional monomer.

As for the solvent drying-type resin mixed with the ionizing radiation-curable resin, a thermoplastic resin is mainly used. Thermoplastic resins generally exemplified can be utilized. By virtue of adding the solvent drying-type resin, coating defects on the coated surface can be effectively prevented. According to a preferred embodiment of the present invention, when the material for the transparent substrate is a cellulose-based resin such as TAC, specific preferred examples of the thermoplastic resin include a cellulose-based resin such as nitrocellulose, acetylcellulose, cellulose acetate propionate and ethylhydroxyethyl cellulose. By virtue of using the cellulose-based resin, adhesion between the transparent substrate and the antistatic layer (as needed) and transparency can be enhanced.

Specific examples of the heat-curable resin include phenol resin, urea resin, diallyl phthalate resin, melamine resin, guanamine resin, unsaturated polyester resin, polyurethane resin, epoxy resin, aminoalkyd resin, melamine-urea co-condensed resin, silicon resin and polysiloxane resin. In the case of using the heat-curable resin, a crosslinking agent, a curing agent such as polymerization initiator, a polymerization accelerator, a solvent, a viscosity adjusting agent and the like may be further added, if desired.

(Light-Transparent Fine Particle)

In the present invention, at least one layer out of the layer having hardcoat property and the overcoat layer contains at least one kind of a metal oxide particle as a light-transparent fine particle. The metal oxide particle is used in the hardcoat layer for the purpose of, for example, [1] adjusting the refractive index, [2] increasing the hardness, [3] improving brittleness and curling, and [4] imparting surface haze, and is preferably a cohesive metal oxide particle. In the present invention, a cohesive silica particle and a cohesive alumina particle are suitable for imparting surface haze, because these are transparent and inexpensive. Above all, a cohesive silica resulting from formation of an aggregate of particles having a primary particle diameter of several tens of nm is preferred in that this particle can stably impart appropriate surface haze. The cohesive silica can be obtained by a so-called wet process of synthesizing it through a neutralization reaction of sodium silicate and sulfuric acid, but the present invention is not limited thereto. The wet process is roughly classified into a precipitation process and a gelling process, and either process may be used in the present invention. The secondary particle diameter of the cohesive silica is preferably from 1 to 10 µm but is selected in combination with the thickness of the hardcoat layer containing the particle. The secondary particle diameter is adjusted by the dispersity of particles (which is controlled by mechanical dispersion using a sand mill or the like or by chemical dispersion using a dispersant or the like). The value obtained by dividing the secondary particle diameter of the cohesive silica particle by the film thickness of the hardcoat layer containing the particle is preferably from 0.1 to 2.0, more preferably from 0.3 to 1.0.

The secondary particle diameter of the cohesive silica particle is measured by a Coulter counter method.

In the hardcoat layer or overcoat layer, the cohesive silica particle is preferably contained in an amount of 0.1 to 50 mass %, more preferably from 1 to 50 mass %, still more preferably from 1 to 30 mass %.

In the case of using a cohesive metal oxide particle and an organic resin particle in combination, the average secondary particle diameter of the metal oxide particle is preferably larger than the average particle diameter of the organic resin particle so as to reduce the change in the surface irregularity shape at the formation of surface irregularities (peaky irregularities; irregularities mainly affecting the reflecting property) by the cohesive metal oxide particle. The difference in the average (secondary) particle diameter is more preferably from 0.1 to 5 μm, still more preferably from 0.5 to 4 μm.

The light-transparent resin particle which can be used as a light-transparent fine particle in combination with the cohesive metal oxide particle, preferably cohesive silica particle, is described below. The light-transparent resin particle is contained in the hardcoat layer or overcoat layer and is used for the purpose of, for example, [1] adjusting the surface haze and internal haze, [2] increasing the surface hardness, and [3] improving brittleness and curling. At least one kind of a light-transparent resin particle is used in at least one layer out of the hardcoat layer and the overcoat layer, and a plurality of kinds of light-transparent resin particles may be used or the light-transparent resin particle may be used in all layers. Furthermore, the light-transparent resin particle may be used in the same layer as or in a layer different from the hardcoat layer or overcoat layer containing the cohesive metal oxide particle.

Specific preferred examples of the light-transparent resin particle which can be used in combination include a resin particle such as poly((meth)acrylate) particle, crosslinked poly((meth)acrylate) particle, polystyrene particle, crosslinked polystyrene particle, crosslinked poly(acryl-styrene) particle, melamine resin particle and benzoguanamine resin particle. Among these, a crosslinked polystyrene particle, a crosslinked poly((meth)acrylate) particle and a crosslinked poly(acryl-styrene) particle are preferred, and a crosslinked poly((meth)acrylate) particle and a crosslinked poly(acryl-styrene) particle are most preferred. The refractive index and amount added of the light-transparent resin are adjusted according to the refractive index of the light-transparent fine particle selected from these particles, whereby an internal haze within the desired range can be obtained. The average particle diameter of the light-transparent resin particle usable in combination is preferably from 0.5 to 10 μm, more preferably from 1 to 8 μm.

The average particle diameter of the light-transparent resin particle usable in combination is measured by a Coulter counter method.

In the hardcoat layer, the light-transparent resin particle is preferably contained in an amount of 0.1 to 50 mass %, more preferably from 1 to 50 mass %, still more preferably from 1 to 30 mass %.

As for the light-transparent resin particle usable in combination, in order to enhance the surface hardness (press hardness), the compressive strength of the resin particle is preferably from 2.0 to 10.0 kgf/mm$^2$, more preferably from 2.5 to 10.0 kgf/mm$^2$, still more preferably from 3.0 to 10.0 kgf/mm$^2$. For elevating the compressive strength of the resin particle, selection of the crosslinking agent or elevation of the crosslinking degree is effective. If the compressive strength exceeds 10.0 kgf/mm$^2$, this is preferred from the standpoint of imparting film surface hardness, but the particle itself becomes brittle and may fracture at the dispersion or the like. Therefore, the upper limit is preferably 10.0 kgf/mm$^2$.

The compressive strength as used in the present invention means a compressive strength when the particle diameter is 10% deformed. The compressive strength when the particle diameter is 10% deformed is a particle compressive strength (S10 strength), and this is a value obtained by performing a compression test of a resin particle alone up to a load of 1 gf at 25° C. and 65% RH with use of a micro-compression tester, MCT W201, manufactured by Shimadzu Corp., and introducing the load when causing 10% deformation of the particle diameter and the particle diameter before compression into the following formula:

$$S10 \text{ strength (kgf/mm}^2\text{)}=2.8\times\text{load (kgf)}/\{(\pi\times\text{particle diameter (mm)}\times\text{particle diameter (mm)})\}$$

Incidentally, the compressive strength is determined according to the formula above from the test force for 10% displacement in a test performed on a particle alone under the conditions of test indenter: FLAT20, test load: 19.6 (mN), load speed: 0.710982 (mN/sec), and displacement full scale: 5 (μm).

(Support)

The support of the film of the present invention may be a transparent resin film, a transparent resin plate, a transparent resin sheet, a transparent glass or the like and is not particularly limited. Examples of the transparent resin film which can be used include a cellulose acylate film (e.g., cellulose triacetate film (refractive index: 1.48), cellulose diacetate film, cellulose acetate butyrate film, cellulose acetate propionate film), a polyethylene terephthalate film, a polyethersulfone film, a polyacrylic resin film, a polyurethane-based resin film, a polyester film, a polycarbonate film, a polysulfone film, a polyether film, a polymethylpentene film, a polyether ketone film, a (meth)acrylonitrile film, and a cycloolefin-based resin film (ARTON (produced by JSR Corp.); ZEONEX and ZEONOR (both produced by ZEON Corp.)).

The thickness of the support is preferably from 25 to 250 μm, more preferably from 25 to 90 μm, still more preferably from 25 to 70 μm.

The support may have an arbitrary width but in view of handling, yield ratio and productivity, the width is usually from 100 to 5,000 mm, preferably from 800 to 3,000 mm, more preferably from 1,000 to 2,000 mm.

The surface of the support is preferably smooth, and the average roughness Ra value is preferably 1 μm or less, more preferably from 0.0001 to 0.5 μm, still more preferably from 0.001 to 0.1 μm.

<Cellulose Acylate Film>

Among those various films, a cellulose acylate film assured of high transparency, less optical birefringence and easy production and generally used as a polarizing plate protective film is preferred.

As regards the cellulose acylate film, various techniques for improving mechanical property, transparency, flatness and the like are known, and the technique described in *JIII Journal of Technical Disclosure*, No. 2001-1745 can be used in the present invention as a known art.

In the present invention, among cellulose acylate films, a cellulose triacetate film is preferred, and a cellulose acetate having an acetylation degree of 59.0 to 61.5% is preferably used for the cellulose acylate film. The acetylation degree means the amount of acetic acid bonded per unit mass of cellulose. The acetylation degree is determined according to the measurement and calculation of acetylation degree in ASTM:D-817-91 (Test Method of Cellulose Acetate, etc.).

The viscosity average polymerization degree (DP) of the cellulose acylate is preferably 250 or more, more preferably 290 or more.

Also, in the cellulose acylate for use in the present invention, the Mw/Mn (Mw is the mass average molecular weight and Mn is the number average molecular weight) value by gel permeation chromatography is preferably close to 1.0, in other words, the molecular weight distribution is preferably narrow. Specifically, the Mw/Mn value is preferably from 1.0 to 1.7, more preferably from 1.3 to 1.65, and most preferably from 1.4 to 1.6.

In general, the hydroxyl groups at the 2-, 3- and 6-positions of the cellulose acylate are not evenly distributed in ⅓ portions of the entire substitution degree, but the substitution degree of the hydroxyl group at the 6-position tends to be small. In the present invention, the substitution degree of the hydroxyl group at the 6-position of the cellulose acylate is preferably larger than those at the 2-position and 3-position.

The hydroxyl group at the 6-position, which is substituted by an acyl group, preferably accounts for 32% or more, more preferably 33% or more, still more preferably 34% or more, based on the entire substitution degree. Furthermore, the substitution degree of the acyl group at the 6-position of the cellulose acylate is preferably 0.88 or more. The hydroxyl group at the 6-position may be substituted by an acyl group having a carbon number of 3 or more, such as propionyl group, butyroyl group, valeroyl group, benzoyl group or acryloyl group, other than an acetyl group. The substitution degree at each position can be determined by NMR.

As regards the cellulose acylate for use in the present invention, cellulose acetates obtained by the methods described in JP-A-11-5851, "Example" and "Synthesis Example 1" of paragraphs [0043] and [0044], "Synthesis Example 2" of paragraphs [0048] and [0049], and "Synthesis Example 3" of paragraphs [0051] and [0052], can be used.

<Polyethylene Terephthalate Film>

In the present invention, a polyethylene terephthalate film may also be preferably used, because this film is excellent in all of transparency, mechanical strength, flatness, chemical resistance and moisture resistance and is inexpensive.

The transparent plastic film is more preferably subjected to an easy adhesion treatment so as to further enhance the adhesion strength between the transparent plastic film and the hardcoat layer provided thereon.

Examples of the commercially available optical PET film with an easy adhesion layer include COSMOSHINE A4100 and A4300 produced by Toyobo Co., Ltd.

2. Layers Constituting Film

The film of the present invention is obtained by mixing various compounds described above and coating the mixture, and the layers constituting the film of the present invention are described below.

<Layer Having Hardcoat Property>

Although not particularly limited, the layer having hardcoat property is provided to impart physical strength. The layer having hardcoat property has a modulus higher than that of the support, and the pencil hardness of a laminate obtained by providing the layer having hardcoat property on the support, as determined by the method described in JIS K 5400, is preferably 2H or more.

The layer having hardcoat property is preferably formed by a crosslinking or polymerization reaction of a heat-curable and/or ionizing radiation-curable compound. For example, the layer having hardcoat property can be formed by coating a coating composition containing an ionizing radiation-curable polyfunctional monomer or polyfunctional oligomer on the transparent support and causing a crosslinking reaction or polymerization reaction of the polyfunctional monomer or polyfunctional oligomer.

The functional group in the ionizing radiation-curable polyfunctional monomer or polyfunctional oligomer is preferably a photo-, electron beam- or radiation-polymerizable functional group, more preferably a photopolymerizable functional group.

Examples of the photopolymerizable functional group include an unsaturated polymerizable functional group such as (meth)acryloyl group, vinyl group, styryl group and allyl group, with a (meth)acryloyl group being preferred.

The thickness of the layer having hardcoat property is from 0.5 to 12 μm, preferably from 1 to 9 μm, more preferably from 2 to 9 μm.

<Overcoat Layer>

In the present invention, an overcoat layer may be formed for adjusting the irregular surface of the layer having hardcoat property. The overcoat layer can form smooth irregularities by filling and smoothing the fine irregularities present along the irregularity shape on a scale of 1/10 or less of the irregularity scale (peak height and peak-to-peak distance of irregularities) in the surface roughness forming the irregularity shape of the layer having hardcoat property or can adjust the peak-to-peak distance and peak height of irregularities and the frequency (number) of peaks. For filling fine irregularities and at the same time, adjusting the peak-to-peak distance or peak height of irregularities and the frequency (number) of peaks, the thickness of the overcoat layer (when cured) is preferably in the range of $0.1Rz(HC)<t(OC)<3Rz(HC)$, more preferably $0.1Rz(HC)<t(OC)<2.5Rz(HC)$, still more preferably $0.15Rz(HC)<t(OC)<2Rz(HC)$. Also, the refractive index of the overcoat layer is preferably from 1.48 to 1.65, more preferably from 1.50 to 1.61, because if the refractive index is less than 1.48, the reflectance of the antireflection laminate increases, whereas if it exceeds 1.65, the difference in the refractive index from the layer having hardcoat property is increased to allow generation of interference fringe.

Also, if $Rz(OC)$ is $0.1Rz(HC)$ or less, the reflection of outside light or image cannot be sufficiently prevented, whereas if it is $1Rz(HC)$ or more, the dense black appearance deteriorates (black tint is tinged with gray). For these reasons, $Rz(OC)$ is preferably in the range of $0.1Rz(HC)<Rz(OC)<1Rz(HC)$, more preferably $0.2Rz(HC)<Rz(OC)<0.9Rz(HC)$, still more preferably $0.3Rz(HC)<Rz(OC)<0.8Rz(HC)$.

The surface free energy of the overcoat layer is preferably from 20 to 45 $mJ/m^2$, more preferably from 25 to 40 $mJ/m^2$, still more preferably from 30 to 40 $mJ/m^2$. When the surface free energy of the overcoat layer is in this range, the irregular surface of the overcoat layer can be formed without greatly changing the irregular surface of the layer having hardcoat property.

The following materials can be appropriately introduced into the overcoat layer. One species or a mixture of two or more species selected from an antistatic agent, a refractive index adjusting agent, an antifouling agent, a water repellant, an oil repellant, a fingerprint adhesion inhibitor, a high curing agent and a hardness adjusting agent (shock-absorbing agent) may be introduced.

(High Refractive Index Layer, Medium Refractive Index Layer)

In the film of the present invention, antireflection property can be enhanced by providing a high refractive index layer and a medium refractive index layer.

In the following context of the present invention, these high refractive index layer and medium refractive index layer are sometimes collectively referred to as a high refractive index layer. Incidentally, in the present invention, the "high", "medium" and "low" in the high refractive index layer, medium refractive index layer and low refractive index indicate the relative size of refractive index among layers. In terms of the relationship with the transparent support, the refractive index preferably satisfies the relationships of transparent support>low refractive index layer, and high refractive index layer>transparent support.

Also, in the context of the present invention, the high refractive layer, medium refractive layer and low refractive index layer are sometimes collectively referred to as an antireflection layer.

For producing an antireflection film by forming a low refractive index layer on a high refractive index layer, the refractive index of the high refractive index layer is preferably from 1.55 to 2.40, more preferably from 1.60 to 2.20, still more preferably from 1.65 to 2.10, and most preferably from 1.80 to 2.00.

In the case of producing an antireflection film by providing a medium refractive index layer, a high refractive index layer and a low refractive index layer in the order of becoming remoter from the support side, the refractive index of the high refractive index layer is preferably from 1.65 to 2.40, more preferably from 1.70 to 2.20. The refractive index of the medium refractive index layer is adjusted to a value between the refractive index of the low refractive index layer and the refractive index of the high refractive index layer. The refractive index of the medium refractive index layer is preferably from 1.55 to 1.80.

The inorganic particle comprising $TiO_2$ as a main component, for use in the high refractive index layer and the medium refractive index layer, is used in a dispersion state for the formation of the high refractive index layer and the medium refractive index layer.

In dispersing, the inorganic particle is dispersed in a dispersion medium in the presence of a dispersant.

The high refractive index layer and the medium refractive index layer for use in the present invention each is preferably formed as follows. A coating composition for the formation of the high or medium refractive index layer is prepared by dispersing the inorganic particle in a dispersion medium and preferably further adding a binder precursor (for example, an ionizing radiation-curable polyfunctional monomer or polyfunctional oligomer described later) necessary for the matrix formation, a photopolymerization initiator and the like to the resulting liquid dispersion, and the obtained coating composition for the formation of the high or medium refractive index layer is coated on the transparent support and cured through a crosslinking or polymerization reaction of the ionizing radiation-curable compound (for example, a polyfunctional monomer or polyfunctional oligomer).

Simultaneously with or after the coating of the high or medium refractive index layer, the binder of the layer is preferably crosslinked or polymerized with the dispersant.

The binder of the thus-produced high or medium refractive index layer takes, for example, a form such that the anionic group of the dispersant is taken into the binder as a result of crosslinking or polymerization reaction between the above-described preferred dispersant and the ionizing radiation-curable polyfunctional monomer or polyfunctional oligomer. The anionic group taken into the binder of the high or medium refractive index layer has a function of maintaining the dispersed state of the inorganic particle, and the crosslinked or polymerized structure imparts a film-forming ability to the binder, whereby the high or medium refractive index layer containing the inorganic fine particle is improved in the physical strength, chemical resistance and weather resistance.

The binder of the high refractive index layer is added in an amount of 5 to 80 mass % based on the solid content of the coating composition for the layer The content of the inorganic particle in the high refractive index layer is preferably from 10 to 90 mass %, more preferably from 15 to 80 mass %, still more preferably from 15 to 75 mass %, based on the mass of the high refractive index layer. Two or more kinds of inorganic particles may be used in combination in the high refractive index layer.

In the case of having a low refractive index layer on the high refractive index layer, the refractive index of the high refractive index layer is preferably higher than the refractive index of the transparent support.

In the high refractive index layer, a binder obtained by a crosslinking or polymerization reaction of, for example, an aromatic ring-containing ionizing radiation-curable compound, an ionizing radiation-curable compound containing a halogen element (e.g., Br, I, Cl) except for fluorine, or an ionizing radiation-curable compound containing an atom such as S, N and P, may also be preferably used.

The film thickness of the high refractive index layer may be appropriately designed according to the usage. In the case of using the high refractive index layer as an optical interference layer described later, the film thickness is preferably from 30 to 200 nm, more preferably from 50 to 170 nm, still more preferably from 60 to 150 nm.

In the case of not containing an antiglare function-imparting particle, the haze of the high refractive index layer is preferably lower. The haze is preferably 5% or less, more preferably 3% or less, still more preferably 1% or less. The high refractive index layer is preferably formed on the transparent layer directly or through another layer.

(Low Refractive Index Layer)

A low refractive index layer needs to be used for reducing the reflectance of the film of the present invention.

The refractive index of the low refractive index layer is preferably from 1.20 to 1.46, more preferably from 1.25 to 1.46, still more preferably from 1.25 to 1.40.

The thickness of the low refractive index layer is preferably from 50 to 200 nm, more preferably from 70 to 100 nm. The haze of the low refractive index layer is preferably 3% or less, more preferably 2% or less, and most preferably 1% or less. The strength of the low refractive index layer is specifically, in the pencil hardness test with a load of 500 g, preferably H or more, more preferably 2H or more, and most preferably 3H or more.

Also, in order to improve the antifouling performance of the optical film, the contact angle for water on the surface is preferably 90° or more, more preferably 95° or more, still more preferably 100° or more.

In the low refractive index layer, a binder is used for dispersing and fixing the fine particle of the present invention. As for the binder, a binder described above for the hardcoat layer may be used, but a fluorine-containing polymer or fluorine-containing sol/gel material ensuring the low refractive index of the binder itself is preferably used. The fluorine-containing polymer or fluorine-containing sol/gel material is preferably a material which is crosslinked by the effect of heat or ionizing radiation and ensures that the surface of the low refractive index layer formed can have a dynamic friction coefficient of 0.03 to 0.30 and a contact angle for water of 85 to 120°.

<Antireflection Laminate>

According to a preferred embodiment of the present invention, there is provided an antireflection laminate satisfying all conditions that the internal haze value is from 0 to 60%, preferably from 0.7 to 50%, more preferably from 0.7 to 45%, still more preferably from 0.7 to 15%, the surface haze value is from 0 to 12%, preferably from 0.3 to 10.0%, more preferably from 0.5 to 8.0%, still more preferably from 3.8 to 4.8%, and the Sm value is from 40 to 200 μm, preferably from 50 to 200 μm, more preferably from 70 to 180 μm, still more preferably from 110 to 170 μm.

If the internal haze value exceeds 60%, unallowable reduction in the dark-room contrast occurs.

If the surface haze value exceeds 12%, the antiglare property (prevention of reflection of outside light or image) may be satisfied, but a light-brownish appearance tends to be intensified.

If the Sm value is less than 40 μm, the protrusion frequency for surface scattering is high and the light-brownish appearance tends to be intensified, whereas if it exceeds 200 μm, protrusion and roughness in the flat part are recognized to be conspicuous (bad-looking impression) and this is not preferred.

From the standpoint of realizing dense black appearance and preventing reflection of outside light or image, the integrated reflectance of the antireflection laminate is preferably from 1.3 to 2.0%, more preferably from 1.3 to 1.8%.

According to another preferred embodiment, an antiglare laminate where the surface resistance value on the outermost surface of the antireflection laminate is from $1.0 \times 10^{13}$ Ω/sq, preferably $5.0 \times 10^{12}$ Ω/sq or less, more preferably $5.0 \times 10^{11}$ Ω/sq or less, is provided.

In obtaining the laminate, it is demanded to increase the adhesion between adjacent layers. Also, for achieving high adhesion or scratch resistance in a thin film of around 100 nm in thickness, a matter of importance is to increase the adhesion to the adjacent lower layer in addition to the strength of the low refractive index layer itself.

In the method by wet coating, sequential coating and curing of various curable resins such as photocurable resin are performed. In this case, in order to enhance the interlayer adhesion, a method of coating a curable resin for the formation of a lower layer, coating a curable resin for the formation of an upper layer in the state of the lower layer being half-cured, and then curing the upper and lower layers is proposed (see, for example, JP-A-2003-311911).

However, this method still has a problem that the adhesion between the upper layer and the lower layer sometimes becomes insufficient. Furthermore, there may also arise a problem that the upper layer and the lower layer are mixed at the interface when overcoating the upper layer and the surface state is worsened, failing in obtaining desired optical properties.

For these reasons, in order to enhance the interlayer adhesion and prevent mixing at the interface within the range not affecting the optical properties, half-curing is preferably performed in the following range of the ratio between the surface double bond amount A before curing and residual surface double bond amount B after curing.

(Ratio Between Surface Double Bond Amount A Before Curing and Residual Surface Double Bond Amount B After Curing)

In the present invention, although the layer is not particularly specified, the ratio between the surface double bond amount A before curing and residual surface double bond amount B after curing in the layer to be half-cured is preferably $0.3 \leq B/A \leq 0.9$. The residual ratio B/A is the double bond residual ratio in the layer to be half-cured, and a B/A value closer to 0 indicates that the curing is closer to complete curing. The adhesion can be enhanced by causing an unreacted bonding group in the lower layer to remain in a specific range. Incidentally, the surface double bond amount can be quantitatively determined by modifying the unsaturated bond with bromine and measuring the peak intensity by means of ESCA.

The residual ratio B/A is more preferably $0.3 \leq B/A \leq 0.7$. If the double bond residual ratio B/A is less than 0.3, the bonding site with the low refractive index layer runs short and therefore, the scratch resistance becomes insufficient, whereas if B/A exceeds 0.9, interfacial mixing occurs at the interface and a bad surface state results. Furthermore, B/A is preferably 0.7 or less. When B/A is 0.7 or less, this is advantageous in that desired optical properties can be obtained, reduction in the film thickness due to interfacial mixing needs not be previously taken into consideration at the design making, and reduction in the production robust property can also be suppressed.

The ratio between the surface double bond amount A before curing and residual surface double bond amount B after curing can be controlled by the oxygen concentration and irradiation dose at curing. The oxygen concentration for allowing this ratio to fall in the above-described range is preferably 1% or less, more preferably 0.5% or less, still more preferably 0.1% or less, and most preferably 0.05% or less. The irradiation dose at curing is preferably 200 mJ/cm² or less, more preferably 150 mJ/cm² or less, still more preferably 80 mJ/cm² or less. The oxygen concentration can be controlled by changing the flow rate of nitrogen or the mixing ratio of nitrogen and air.

The surface double bond residual ratio can be specifically determined as follows.

In determining the double bond residual ratio, the double bond is modified with Br and quantitatively determined by an X-ray photoelectron spectroscopy (ESCA). This method is also described, for example, in the surface analysis technology selection, *X-Sen Hikari-Denshi Bunko Ho* (*X-Ray Photoelectron Spectroscopy*), page 63, compiled by The Surface Science Society of Japan, Maruzen.

More specifically, the sample is left standing in the vapor phase of a closed vessel containing 2 mass % of bromine water for 1 hour, thereby adding Br to the double bond part. The signal area intensities of ESCA Br2p and C1s on the sample surface are measured and the ratio Br/C therebetween is determined and used as the index for surface double bond amount. The Br/C value after curing based on Br/C before curing is taken as the residual ratio of surface double bond.

(Preparation of Coating Solution)
<Preparation>

First, a coating solution containing the components for forming each layer is prepared. At this time, elevation of the water content in the coating solution can be suppressed by minimizing the volatilization volume of the solvent. The water content in the coating solution is preferably 5% or less, more preferably 2% or less. The suppression of the volatilization volume of the solvent can be achieved, for example, by enhancing the closed state during stirring after charging respective materials into the tank, or by minimizing the air contact area of the coating solution during the liquid transfer operation. Also, means for decreasing the water content in the coating solution may be provided before, during or after the coating.

<Physical Properties of Coating Solution>

With respect to the coating solution for forming the low refractive index layer, medium refractive index layer, high refractive index layer, antifouling layer or the like to a dry film thickness of 200 nm or less, the liquid physical properties greatly affect the upper limit of a speed allowing for coating and therefore, it is necessary to control the liquid physical properties at the moment of coating, particularly, the viscosity and surface tension.

The viscosity is preferably 2.0 [mPa·sec] or less, more preferably 1.5 [mPa·sec] or less, and most preferably 1.0 [mPa·sec] or less. The viscosity is changed by the shear rate depending on the coating solution and in this meaning, the values above each indicates the viscosity at a shear rate at the moment that the coating solution is coated. When a thixotropy agent is added to the coating solution to have a low viscosity at the coating subject to high shearing and a high viscosity at the drying scarcely subject to shearing, unevenness is less generated at the drying and this is preferred.

Furthermore, although not a liquid physical property, the amount of the coating solution applied to the transparent support also effects the upper limit of a speed allowing for coating. The amount of the coating solution applied to the transparent support is preferably from 2.0 to 5.0 [ml/m$^2$]. When the amount of the coating solution applied to the transparent support is increased, the maximum speed allowing for coating is advantageously elevated, but if the amount of the coating solution applied to the transparent support is excessively increased, the drying requires a high load. Therefore, an optimal amount of the coating solution applied to the transparent support is preferably determined according to the liquid treatment and process conditions.

The surface tension is preferably from 15 to 36 [mN/m]. When the surface tension is decreased, for example, by adding a leveling agent, unevenness at the drying can be advantageously suppressed. However, if the surface tension is excessively decreased, this causes reduction in the maximum speed allowing for coating. Therefore, the surface tension is more preferably from 17 to 32 [mN/m], still more preferably from 19 to 26 [mN/m].

In the layer having hardcoat property and containing a light-transparent particle, from the standpoint of preventing precipitation of the particle, the viscosity is preferably adjusted to 4 cp or more, more preferably 6 cp or more.

In the overcoat layer, the maximum speed allowing for coating is greatly affected by the liquid physical properties and therefore, the viscosity is preferably adjusted to 2 cp or more, more preferably 4 cp or more.

<Filtration>

The coating solution used for the coating is preferably filtered before the coating. As regards the filter for filtration, a filter having a pore size as small as possible within the range not incurring removal of the components in the coating solution is preferably used. For the filtration, a filter having an absolute filtration precision of 0.1 to 50 µm is preferred, and a filter having an absolute filtration precision of 0.1 to 40 µm is more preferred. The thickness of the filter is preferably from 0.1 to 10 mm, more preferably from 0.2 to 2 mm. In this case, the filtration pressure is preferably 1.5 MPa or less, more preferably 1.0 MPa or less, still more preferably 0.2 MPa or less.

The filter member for filtration is not particularly limited as long as it does not affect the coating solution. Specific examples thereof are the same as those of the filtering member described above for the wet dispersion of an inorganic compound.

It is also preferred to ultrasonically disperse the filtered coating solution immediately before coating and assist in removing bubbles or keeping the dispersed state of the dispersion.

(Treatment Before Coating)

The support for use in the present invention is preferably subjected to a surface treatment before coating. The specific method therefor includes a corona discharge treatment, a glow discharge treatment, a flame treatment, an acid treatment, an alkali treatment and an ultraviolet irradiation treatment. It is also preferred to provide an undercoat layer as described in JP-A-7-333433.

Examples of the dedusting method for use in the dedusting step as a pre-step before coating include a dry dedusting method such as a method of pressing a nonwoven fabric, a blade or the like against the film surface described in JP-A-59-150571; a method of blowing air having high cleanliness at a high speed to separate attached matters from the film surface, and sucking these matters through a proximate suction port described in JP-A-10-309553; and a method of blowing compressed air under ultrasonic vibration to separate attached matters, and sucking these matters described in JP-A-7-333613 (for example, NEW ULTRA-CLEANER manufactured by Shinko Co., Ltd.).

Also, a wet dedusting method may be used, such as a method of introducing the film into a washing tank, and separating attached matters by using an ultrasonic vibrator; a method of supplying a cleaning solution to the film, and blowing air at a high speed, followed by sucking described in JP-B-49-13020; and a method of continuously rubbing the web with a liquid-moistened roll, and jetting a liquid onto the rubbed face, thereby cleaning the web described in JP-A-2001-38306. Among these dedusting methods, an ultrasonic dedusting method and a wet dedusting method are preferred in view of the dedusting effect.

Before performing such a dedusting step, the static electricity on the film support is preferably destaticized so as to elevate the dedusting efficiency and prevent attachment of dusts. As for the destaticizing method, an ionizer of corona discharge type, an ionizer of light irradiation type (e.g., UV, soft X-ray), and the like may be used. The voltage charged on the film support before and after dedusting and coating is preferably 1,000 V or less, more preferably 300 V or less, still more preferably 100 V or less.

From the standpoint of maintaining the flatness of the film, in these treatments, the temperature of the cellulose acylate film is preferably kept to be not more than Tg, specifically 150° C. or less.

In the case where the cellulose acylate film is adhered to a polarizing film as in the case of using the film of the present invention as a polarizing plate protective film, in view of adhesive property to the polarizing film, an acid or alkali treatment, that is, a saponification treatment for cellulose acylate, is preferably performed.

In view of adhesive property, the surface energy of the cellulose acylate film is preferably 55 mN/m or more, more preferably from 60 to 75 mN/m. The surface energy can be adjusted by the above-described surface treatment.

(Coating)

Each layer of the film of the present invention can be formed by the following coating methods, but the present invention is not limited thereto.

A known method such as dip coating method, air knife coating method, curtain coating method, roller coating method, wire bar coating method, gravure coating method, extrusion coating method (die coating method) (see, U.S. Pat. No. 2,681,294) and microgravure coating method, is used. Among these, a microgravure coating method and a die coating method are preferred.

Figure 5:
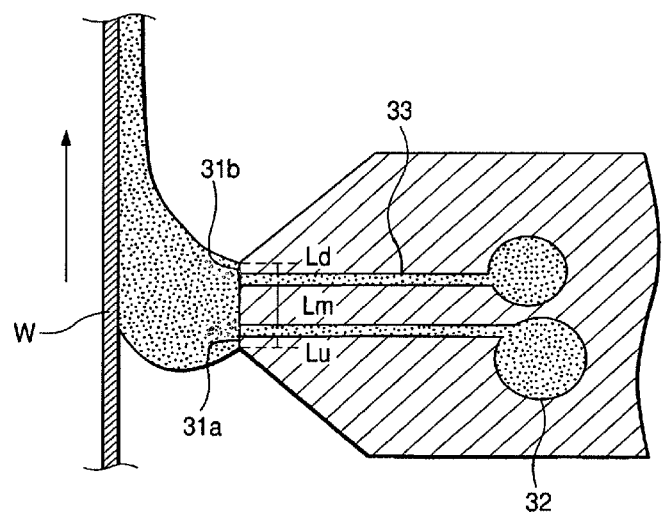
FIG. 5 illustrates one example of the cross-sectional view of a coater enabling simultaneous coating of two or more layers for use in the present invention,
wherein
$L_u$ denotes Land length of upstream lip land,
$L_m$ denotes Land length of midstream lip land, and
$L_d$ denotes Land length of downstream lip land.

Particularly, in the case of coating two or more layers such as overcoat layer and low refractive index layer on the hardcoat layer, a method of simultaneously coating two or more layers by one coating apparatus shown in FIG. 5 (multilayer coating) (see, JP-A-2002-86050, JP-A-2003-260400 and JP-A-7-108213), and a method of arraying coating, drying and curing devices in multiple stages and coating two or more layers in one take-up operation (sequential and continuous coating) (see, JP-A-2003-205264) are preferred.

The microgravure coating method for use in the present invention is a coating method such that a gravure roll having a diameter of about 10 to 100 mm, preferably from about 20 to 50 mm, and having a gravure pattern engraved on the entire circumference is rotated below the support in the direction reverse to the support-transporting direction and at the same time, a surplus coating solution is scraped off from the surface of the gravure roll by a doctor blade, thereby transferring and coating a constant amount of the coating solution on the bottom surface of the support at the position where the top surface of the support is in a free state. A roll-form transparent support is continuously unrolled and on one side of the unrolled support, at least one layer out of the hardcoat layer and the low refractive index layer containing a fluorine-containing olefin-based polymer can be coated by the microgravure coating method.

As for the conditions in coating by the microgravure coating method, the number of lines in the gravure pattern engraved on the gravure roll is preferably from 50 to 800 lines/inch, more preferably from 100 to 300 lines/inch, the depth of the gravure pattern is preferably from 1 to 600 µm, more preferably from 5 to 200 µm, the rotation number of the gravure roll is preferably from 3 to 800 rpm, more preferably from 5 to 200 rpm, and the support conveying speed is preferably from 0.5 to 100 m/min, more preferably from 1 to 50 m/min.

In order to supply the film of the present invention at a high productivity, an extrusion method (die coating method) is preferably used. A die coater which can be preferably used in particular is described below.

<Construction of Die Coater>

FIG. 1 is a cross-sectional view of a coater using a slot die, with which the present invention is practiced. In the coater 10, a coating solution 14 formed into a bead 14a is coated from a slot die 13 on a continuously running web W supported by a backup roller 11 to form a film coating 14b on the web W.

A pocket 15 and a slot 16 are formed inside the slot die 13. The cross section of the pocket 15 is constituted by a curve and a straight line and may have, for example, a nearly circular shape or a semicircular shape. The pocket 15 is a liquid reservoir space for the coating solution and has a cross-sectional shape extended in the width direction of the slot die 13, and the length of its effective extension is generally set to be equal to or slightly longer than the coating width. The coating solution 14 is supplied to the pocket 15 from the side surface of the slot die 13 or from the center on the surface opposite the slot opening 16a. Also, in the pocket 15, a stopper for preventing leakage of the coating solution 14 is provided.

The slot 16 is a flow path of the coating solution 14 from the pocket 15 to the web W and, similarly to the pocket 15, has a cross-sectional shape extended in the width direction of the slot die 13, and the opening 16a positioned on the web side is generally adjusted to have nearly the same width as the coating width by using a width regulating plate (not shown). The angle between the slot end of the slot 16 and the tangent line in the web running direction of the backup roller 11 is preferably from 30 to 90°.

The end lip 17 of the slot die 13, where the opening 16a of the slot 16 is positioned, is tapered and the distal end thereof forms a flat part 18 called a land. In this land 18, the upstream side in the travelling direction of the web W with respect to the slot 16 is referred to as an upstream lip land 18a, and the downstream side is referred to as a downstream lip land 18b.

Figure 2A:
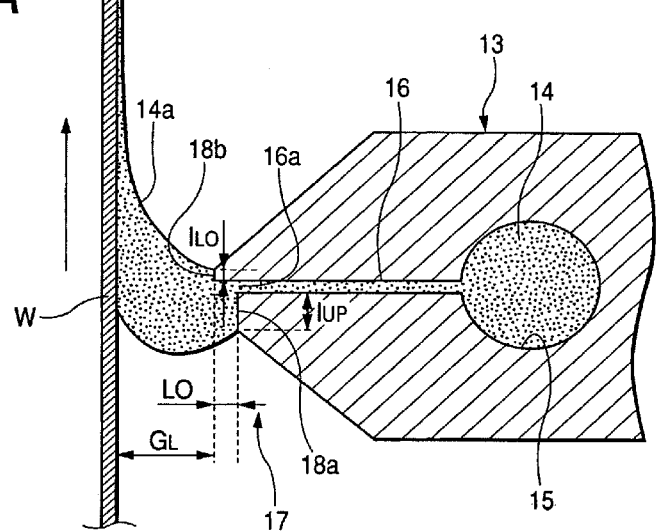
FIG. 2A illustrates one example of the cross-sectional shape of the slot die 13 for use in the present invention and FIG. 2B illustrates one example of the cross-sectional shape of a conventional slot die 30.
Figure 2B:
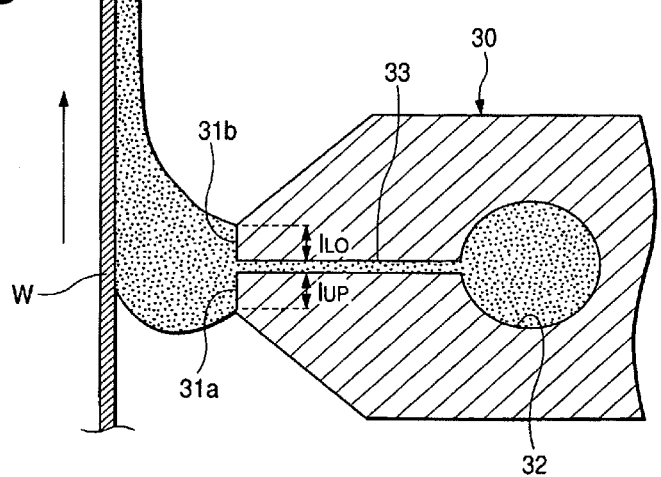

FIGS. 2A and 2B show the cross-sectional shape of the slot die 13 in comparison with a conventional one. FIG. 2A shows the slot die 13 for use in the present invention, and FIG. 2B shows a conventional slot die 30. In the conventional slot die 30, the distances from the web to the upstream lip land 31a and to the downstream lip land 31b are equal. Incidentally, the numeral 32 denotes a pocket, and 33 denotes a slot. On the other hand, in the slot die 13 for use in the present invention, the length $I_{LO}$ of the downstream lip land is made shorter and by virtue of this construction, coating for a wet film thickness of 20 µm or less can be performed with good precision.

The land length $I_{UP}$ of the upstream lip land 18a is not particularly limited but is preferably from 500 µm to 1 mm. The land length $I_{LO}$ of the downstream lip and 18b is from 30 to 100 µm, preferably from 30 to 80 µm, more preferably from 30 to 60 µm. If the land length $I_{LO}$ of the downstream lip is less than 30 µm, the edge or land of the end lip is readily chipped and generation of streaks is liable to occur in the film coating, leading to incapability of coating. Also, the setting of the wet line position on the downstream side becomes difficult and there arises a problem that the coating solution is liable to spread on the downstream side. The wet spreading of the coating solution on the downstream side means that the wet line becomes non-uniform and as conventionally known, this gives rise to a problem of incurring a defective profile such as streak on the coated surface. On the other hand, if the land length $I_{LO}$ of the downstream lip exceeds 100 µm, the bead itself cannot be formed and therefore, thin-layer coating cannot be performed.

The downstream lip land 18b is in the overbite form and approaches closer to the web W than the upstream lip land 18a, so that the degree of reduced pressure can be made small and a bead suitable for thin-film coating can be formed. The difference between the distance from the downstream lip land 18b to the web W and the distance from the upstream lip land 18a to the web W (hereinafter, this difference is referred to as an "overbite length LO") is preferably from 30 to 120 µm, more preferably from 30 to 100 µm, still more preferably from 30 to 80 µm. When the slot die 13 has an overbite shape, the gap $G_L$ between the end lip 17 and the web W indicates the gap between the downstream lip land 18b and the web W.

Figure 3:
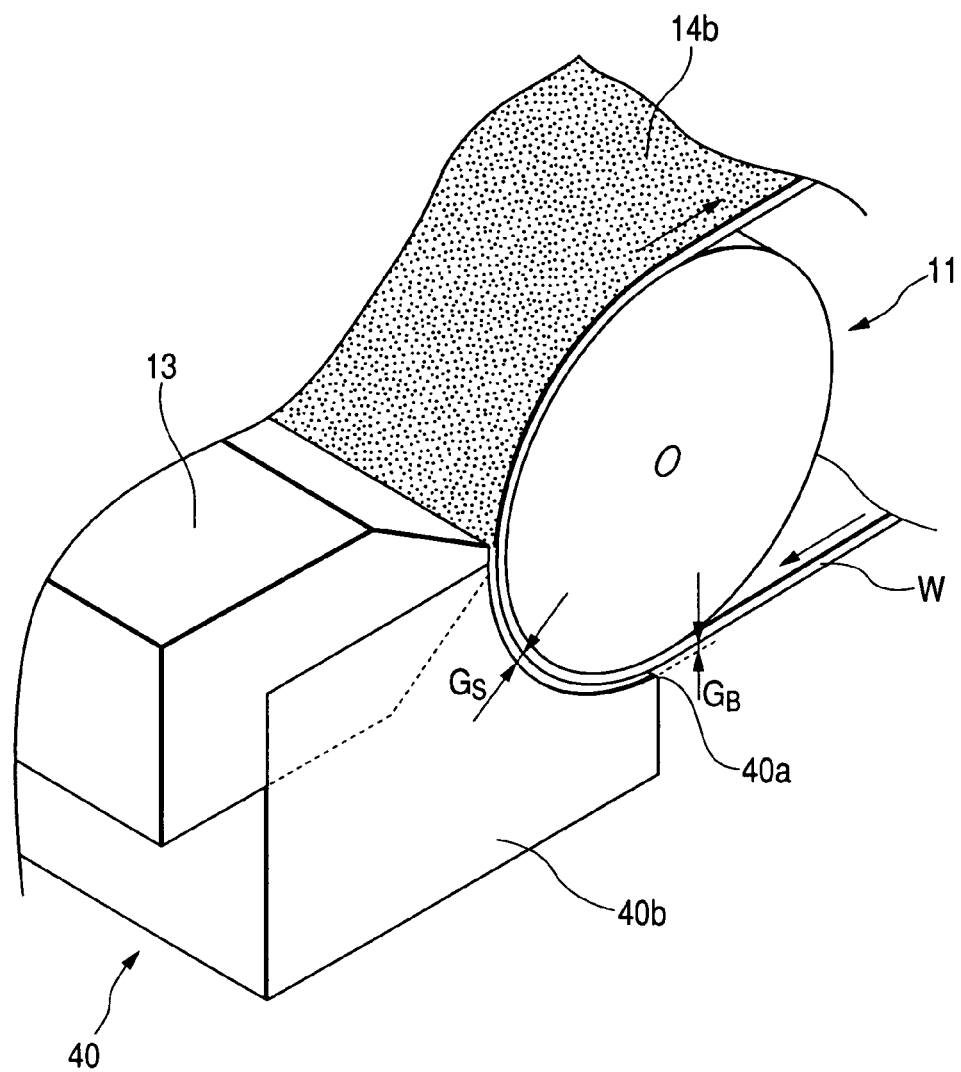
FIG. 3 illustrates one example of the perspective view showing the slot die 13 and its periphery at the coating step in the present invention.

FIG. 3 is a perspective view showing the slot die and the periphery thereof in the coating process for practicing the present invention. On the side opposite the web W travelling direction side, a low-pressure chamber 40 is disposed at the position not coming into contact with the bead so as to satisfactorily adjust the pressure reduction for the bead 14a. The low-pressure chamber 40 comprises a back plate 40a and a side plate 40b for keeping the operation efficiency, and gaps $G_B$ and $G_S$ are present between the back plate 40a and the web W and between the side plate 40b and the web W, respectively.

Figure 4:
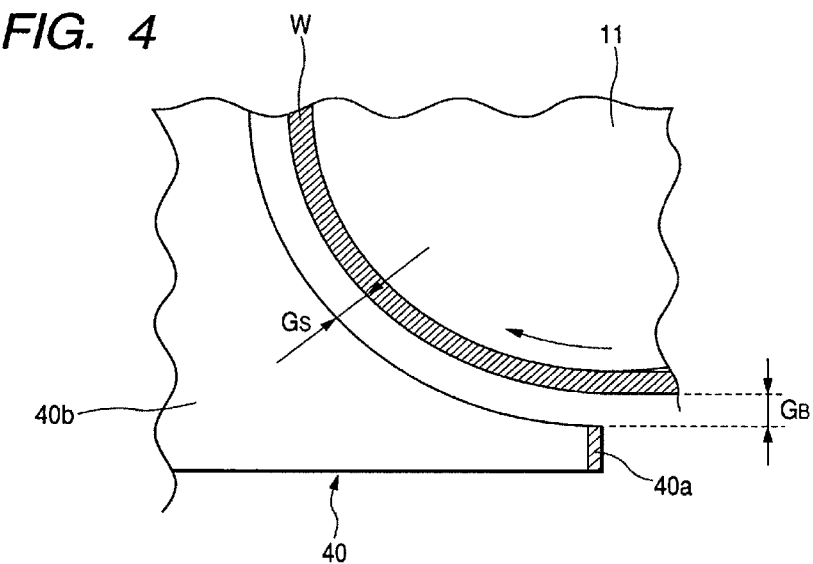
FIG. 4 illustrates one example of the cross-sectional view showing the low-pressure chamber 40 and the web W approaching closer (the back plate 40a is integrated with the chamber 40 body)

FIG. 4 is a cross-sectional view of the low-pressure chamber 40 and the web W approaching closer. The side plate and the back plate may be integrated with the chamber body as shown or may be fixed to the chamber with a screw or the like so as to allow for appropriate change of the gap.

(Drying)

After the coating solution is coated on the support directly or through another layer, the film of the present invention is preferably conveyed in the form of a web to a heated zone for drying the solvent.

As for the method of drying the solvent, various known techniques may be utilized. Specific examples thereof include those described in JP-A-2001-286817, JP-A-2001-314798, JP-A-2003-126768, JP-A-2003-315505 and JP-A-2004-34002.

(Curing)

After drying the solvent, the film of the present invention is passed in the form of a web through a zone for curing each film coating by ionizing radiation and/or heat, whereby the film coating can be cured.

The ionizing radiation for use in the present invention is not particularly limited and according to the kind of the composition for forming a coating, the radiation may be appropriately selected from ultraviolet ray, electron beam, near ultraviolet ray, visible light, near infrared ray, infrared ray, X-ray and the like. Among these, ultraviolet ray and electron beam are preferred, and ultraviolet is more preferred because the handling is easy and a high energy can be easily obtained.

As for the light source of emitting ultraviolet ray for photopolymerizing an ultraviolet-reactive compound, any light source may be used as long as it emits ultraviolet ray. Examples of the light source which can be used include a low-pressure mercury lamp, a medium-pressure mercury lamp, a high-pressure mercury lamp, an ultrahigh-pressure mercury lamp, a carbon arc lamp, a metal halide lamp and a xenon lamp. Furthermore, an ArF excimer laser, a KrF excimer laser, an excimer lamp, synchrotron radiation light and the like may also be used. Among these, an ultrahigh-pressure mercury lamp, a high-pressure mercury lamp, a low-pressure mercury lamp, a carbon arc, a xenon arc and a metal halide lamp can be preferably used.

(Saponification Treatment)

In the case of producing a polarizing plate by using the film of the present invention as one surface protective film out of two surface protective films for a polarizing film, the surface on the side to be laminated with the polarizing film is preferably hydrophilized to improve the adhesive property on the adhesion surface.

(Production of Polarizing Film)

The film of the present invention can be used as a polarizing film or as a protective film disposed on one side or both sides of the polarizing film, enabling use as a polarizing film.

In the case of using the film of the present invention as one protective film, the other protective film may be a normal cellulose acetate film but is preferably a cellulose acetate film produced by the above-described solution film-forming method and stretched in the width direction of the film in a roll form at a draw ratio of 10 to 100%.

Furthermore, in the polarizing plate of the present invention, it is preferred that one surface is an antireflection film and the other protective film is an optically compensatory film having an optically anisotropic layer comprising a liquid crystalline compound.

3. Usage Form of the Present Invention

The film of the present invention is used for an image display device such as liquid crystal display (LCD), plasma display panel (PDP), electroluminescent display (ELD) and cathode ray tube display (CRT). The optical filter according to the present invention can be used on a known display such as plasma display panel (PDP) and cathode ray tube display (CRT).

(Liquid Crystal Display Device)

The film or polarizing plate of the present invention can be advantageously used for an image display device such as liquid crystal display and is preferably used as the outermost surface layer of the display.

The liquid crystal display device comprises a liquid crystal cell and two polarizing plates disposed on both sides thereof, and the liquid crystal cell carries a liquid crystal between two electrode substrates. In some cases, one optically anisotropic layer is disposed between the liquid crystal cell and one polarizing plate, or two optically anisotropic layers are disposed, that is, one between the liquid crystal cell and one polarizing plate, and another between the liquid crystal cell and another polarizing plate.

The liquid crystal cell is preferably in TN mode, VA mode, OCB mode, IPS mode or ECB mode.

<TN Mode>

In the TN-mode liquid crystal cell, rod-like liquid crystalline molecules are oriented substantially in the horizontal alignment at the time of not applying a voltage and furthermore, twisted at an angle of 60 to 120°.

The TN-mode liquid crystal cell is most frequently utilized in a color TFT liquid crystal display device and is described in many publications.

<VA Mode>

In the VA-mode liquid crystal cell, rod-like liquid crystalline molecules are oriented substantially in the vertical alignment at the time of not applying a voltage.

The VA-mode liquid crystal cell includes (1) a VA-mode liquid crystal cell in a narrow sense where rod-like liquid crystalline molecules are oriented substantially in the vertical alignment at the time of not applying a voltage and oriented substantially in the horizontal alignment at the time of applying a voltage (described in JP-A-2-176625); (2) an (MVA-mode) liquid crystal cell where the VA mode is modified into a multi-domain system for enlarging the viewing angle (described in *SID97, Digest of Tech. Papers* (preprints), 28, 845 (1997)); (3) an (n-ASM-mode) liquid crystal cell where rod-like liquid crystalline molecules are oriented substantially in the vertical alignment at the time of not applying a voltage and oriented in the twisted multi-domain alignment at the time of applying a voltage (described in preprints of Nippon Ekisho Toronkai (Liquid Crystal Forum of Japan), 58-59 (1998)); and (4) a SURVAIVAL-mode liquid crystal cell (reported in LCD International 98).

<OCB Mode>

The OCB-mode liquid crystal cell is a liquid crystal cell of bend orientation mode where rod-like liquid crystalline molecules are oriented substantially in the reverse direction (symmetrically) between upper portion and lower portion of the liquid crystal cell, and this is disclosed in U.S. Pat. Nos. 4,583,825 and 5,410,422. Since rod-like liquid crystalline molecules are symmetrically oriented between upper portion and lower portion of the liquid crystal cell, the liquid crystal cell of bend orientation mode has an optically self-compensating ability. Accordingly, this liquid crystal mode is called an OCB (optically compensatory bend) liquid crystal mode. The liquid crystal display device of bend orientation mode is advantageous in that the response speed is fast.

<IPS Mode>

The IPS-mode liquid crystal cell is a system of effecting the switching by applying a transverse electric field to the nematic liquid crystal, and this is described in detail in *Proc. IDRC (Asia Display '95)*, pp. 577-580 and ibid., pp. 707-710.

<ECB Mode>

In the ECB-mode liquid crystal cell, rod-like liquid crystalline molecules are oriented substantially in the horizontal alignment at the time of not applying a voltage. The ECB mode is one of liquid crystal display modes having a simplest structure and is described in detail, for example, in JP-A-5-203946.

(Displays Other than Liquid Crystal Display Device)

<PDP>

The plasma display panel (PDP) is generally composed of a gas, a glass substrate, an electrode, an electrode lead material, a thick print material and a fluorescent material. As for the glass substrate, two sheets of front glass substrate and rear glass substrate are used. An electrode and an insulating layer are formed on the two glass substrates, and a fluorescent material layer is further formed on the rear glass substrate. The two glass substrates are assembled, and a gas is sealed therebetween.

The plasma display panel (PDP) is already available on the market. The plasma display panel is described in JP-A-5-205643 and JP-A-9-306366.

In some cases, a front panel is disposed on the front surface of the plasma display panel. The front panel preferably has sufficiently high strength for protecting the plasma display panel. The front panel may be disposed with spacing from the plasma display panel or may be laminated directly to the plasma display body.

In an image display device like the plasma display panel, the optical filter can be laminated directly to the display surface. In the case where a front panel is provided in front of the display, the optical filter may be laminated to the front side (outer side) or back side (display side) of the front panel.

<Touch Panel>

The film of the present invention can be applied to a touch panel and the like described, for example, in JP-A-5-127822 and JP-A-2002-48913.

<Organic EL Device>

The film of the present invention can be used as a substrate (substrate film) or protective film of an organic EL device or the like.

In the case of using the film of the present invention for an organic EL device or the like, the contents described, for example, in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617 and JP-A-2002-056976 may be applied. Furthermore, the contents described in JP-A-2001-148291, JP-A-2001-221916 and JP-A-2001-231443 are preferably used in combination.

4. Various Characteristic Values

Various measuring methods regarding the present invention are described below.

(Average Distance Sm of Irregularity Shape)

The average distance Sm of the irregularity shape can be measured by using, for example, a two-dimensional roughness gauge, Model SJ-400, manufactured by Mitsutoyo, "Micromap" manufactured by RYOKA SYSTEM Inc., or a scanning probe microscope "SPI3800" {manufactured by Seiko Instrument Corp.}.

(Average Inclination Angle θa)

The irregularity shape on the antireflection film surface can be evaluated using "Micromap" manufactured by Ryoka System Inc., or a scanning probe microscope "SPI3800" {manufactured by Seiko Instrument Corp.}.

Some other measuring devices are known, but as one example, measurement using a scanning probe microscope "SPI3800" {manufactured by Seiko Instrument Corp.} is described.

The average inclination angle is (angle equivalency of) the height average value of the amount of change in the average radius of islands (peaks in the irregularity shape) and is specifically determined through the following procedure:

(1) The number N and total area $S_T$ of islands at a certain height Z are determined;

(2) the average island area value $S_V$ is determined;

$$S_V = S_T/N$$

(3) assuming that the island is a circle, the average radius value $R_V$ is determined;

$$R_V = \sqrt{\frac{S_V}{\pi}}$$

(4) the procedure of (1) to (3) is repeated by varying the height Z, and the average radius $R_V(Z)$ every each height Z is determined;

(5) the variation $\Delta R_V(Z)$ of $R_V(Z)$ with respect to the fine height $\Delta Z$ is determined and averaged by the overall height H (=maximum difference in height; P–V);

$$R_{VH} = \frac{1}{H}\int_0^H \left|\frac{dR_V(Z)}{d}\right| dZ = \frac{1}{H}\int_0^H \left|\frac{d}{dZ}\sqrt{\frac{S_T(Z)}{\pi \cdot N(Z)}}\right| dZ$$

and (6) $R_{VH}$ is converted into an average inclination angle (θa):

$$θa = \arctan(R_{VH}/\Delta Z).$$

(60° Gloss Value)

The 60° gloss value is measured using a gloss meter (VG 2000, manufactured by Nippon Denshoku Industries Co., Ltd.) according to JIS-Z8741.

(Haze)

In the film of the present invention, the surface haze and the internal haze can be freely designed according to the purpose.

The entire haze (H), internal haze (Hi) and surface haze (Hs) of the obtained film are determined by the following measurements.

[1] The entire haze value (H) of the film obtained is measured according to JIS-K7136.

[2] After adding several silicone oil drops on the front and back surfaces of the optical film obtained, the film is sandwiched from front and back by two 1 mm-thick glass plates (Microslide Glass No. S9111, produced by Matsunami K.K.), the haze is measured in a surface haze-removed state by bringing the two glass plates into optical contact with the film obtained, and the value obtained by subtracting, from this haze, the haze separately measured by interposing only the silicone oil between two glass plates is calculated as the internal haze (Hi).

[3] The value obtained by subtracting the internal haze (Hi) calculated in [2] above from the entire haze (H) measured in [1] above is calculated as the surface haze (Hs).

(Measurement of Surface Resistance)

The surface resistance on the surface having the low refractive index layer (outermost layer) of the antireflection film is measured using an ultra-insulating resistance/microammeter "TR8601" {manufactured by Advantest Corp.} under the conditions of 25° C. and a humidity of 60% RH.

(Integrated Reflectance)

As for the measurement of integrated reflectance, an adapter "ILV-471" is mounted on a spectrophotometer "V-550" [manufactured by JASCO Corp.], the integrated reflectance is measured in the wavelength region of 380 to 780 nm in the state of eliminating reflection on the back surface by roughening the surface on the transparent support side of the film with sand paper and then treating the surface with black ink, and an average reflectance in the range of 450 to 650 nm is calculated and used for the evaluation of antireflective property.

(Specular Reflectance)

As for the measurement of integrated reflectance, an adapter "ARV-474" is mounted on a spectrophotometer "V-550" [manufactured by JASCO Corp.], the integrated reflectance is measured in the wavelength region of 380 to 780 nm in the state of eliminating reflection on the back surface by roughening the surface on the transparent support side of the film with sand paper and then treating the surface with black ink, and an average reflectance in the range of 450 to 650 nm is calculated and used for the evaluation of antireflective property.

(Color Tint)

The polarizing plate with antireflection ability of the present invention can be evaluated on the color tint by determining the color tint of regularly reflected light for incident light at an incident angle 5° in the wavelength region of 380 to 780 nm of a CIE standard illuminant $D_{65}$, that is, the L*, a* and b* values of the CIE1976 L*a*b* color space.

The L*, a* and b* values are preferably $3 \leq L^* \leq 20$, $-7 \leq a^* \leq 7$ and $-10 \leq b^* \leq 10$, respectively. Within these ranges, the color tint from red-violet to blue-violet of reflected light, which is a problem in conventional polarizing plates, is reduced, and by setting those values to the ranges of $3 \leq L^* \leq 10$, $0 \leq a^* \leq 5$ and $-7 \leq b^* \leq 0$, the color tint above is greatly reduced, as a result, in applying the polarizing plate to a liquid crystal display device, when outside light with high brightness, such as fluorescent lamp in room, is slightly reflected, the color tint can be neutral and is not annoying. More specifically, when $a^* \leq 7$, the red tint is not too strong, while when $a^* \geq -7$, the cyan tint is not too strong, and this range is preferred. Also, when $b^* \geq -7$, the blue tint is not too strong, whereas when $b^* \leq 0$, the yellow tint is not too strong, and this range is preferred.

Furthermore, the color tint uniformity of reflected light can be determined from a*b* on the L*a*b* chromaticity diagram obtained using a reflection spectrum of reflected light in the range of 380 to 680 nm, and the percentage change of color tint can be determined according to the following mathematical formulae:

$$\text{Percentage change of color tint } (a^*) = \frac{a^*_{max} - a^*_{min}}{a^*_{av}} \times 100$$

$$\text{Percentage change of color tint } (b^*) = \frac{b^*_{max} - b^*_{min}}{b^*_{av}} \times 100$$

In the formulae above, $a^*_{max}$ and $a^*_{min}$ are respectively the maximum value and the minimum value of the a* value; $b^*_{max}$ and $b^*_{min}$ are respectively the maximum value and the minimum value of the b* value; and $a^*_{av}$ and $b^*_{av}$ are the average values of the a* value and the b* value, respectively. The percentage change of each color is preferably 30% or less, more preferably 20% or less, and most preferably 8% or less.

In the antireflection film of the present invention, $\Delta E_w$ which is the change of color tint between before and after a weather resistance test is preferably 15 or less, more preferably 10 or less, and most preferably 5 or less. Within this range, both low reflection and reduction in the color tint of reflected light can be satisfied and in applying the film to the outermost surface of an image display device, when outside light with high brightness, such as fluorescent lamp in room, is slightly reflected, the color tint can be neutral and the displayed image is advantageously assured of good pictorial quality.

The change $\Delta E_w$ of color tint can be determined according to the following mathematical formula:

$$\Delta E_w = [(\Delta L_w)^2 + (\Delta a_w)^2 + (\Delta b_w)^2]^{1/2}$$

In the formula, $\Delta L_w$, $\Delta a_w$ and $\Delta b_w$ are the amounts of change in the L* value, a* value and b* value, respectively, between before and after a weather resistance test.

(Average Particle Diameter, Average Particle Diameter Distribution)

The particle size distribution of the particle is measured by a Coulter counter method, and the measured distribution is converted into a particle number distribution. The average particle diameter is calculated from the obtained particle distribution.

(Maximum Absorption Wavelength)

The maximum absorption wavelength indicates a wavelength at which the absorbance A measured by a spectrophotometer becomes maximum. The absorbance A is measured using a 0.2% dichloromethane solution as the measurement preparation and dichloromethane as the reference by an ultraviolet visible near-infrared spectrophotometer (UV-3150, manufactured by Shimadzu Corp.).

(Dense Black Appearance)

With respect to a liquid crystal display device where a polarizing plate laminated with the optical film is disposed on the viewing side surface, sensory evaluation of the dense black appearance is performed. The evaluation is performed by the method of arraying a plurality of display units in series and relatively comparing these at the same time. The black tint at the power-off time and the black tint (black image) at the power-on time each viewed from the frontal side are compared in each film.

(Reflection of Outside Light or Image)

With respect to a liquid crystal display device where a polarizing plate laminated with the optical film is disposed on the viewing side surface, sensory evaluation of the reflection of outside light or image is performed. The evaluation is performed by the method of arraying a plurality of display units in series and relatively comparing these at the same time. The reflection of outside light or image on black tint (black image) at the power-off time and the power-on time is compared.

(Glaring Evaluation Test)

Whether glaring (roughness) in all directions is generated or not is evaluated on a backlight viewer of a transmissive white surface light source through a matrix filter (thickness: 0.7 mm) with a resolution of 100 ppi in a dark-room environment.

(Evaluation of Steel Wool Scratch Resistance)

The result of a rubbing test performed using a rubbing tester under the following conditions can be used as the index for scratch resistance.

Environmental conditions of evaluation: 25° C. and 60% RH
Rubbing material:

A steel wool (Grade No. 0000, manufactured by Nihon Steel Wool Co., Ltd.) is wound around the rubbing tip (1 cm×1 cm) of the tester, which comes into contact with the sample, and fixed by a band not to move.
Moving distance (one way): 13 cm
Rubbing speed: 13 cm/sec
Load: 500 g/cm² and 200 g/cm²
Contact area of tip: 1 cm×1 cm
Number of rubbings: 10 reciprocations An oily black ink is applied to the back side of the rubbed sample, scratches in the rubbed portion are observed by reflected light with an eye, and the steel wool scratch resistance is evaluated by the difference from the reflected light quantity in the portions other than the rubbed portion.

EXAMPLES

The present invention is described in greater detail below by referring to Examples, but the present invention should not be construed as being limited thereto. Unless otherwise indicated, the "parts" and "%" are on the mass basis.
(Synthesis of Perfluoroolefin Copolymer (1))

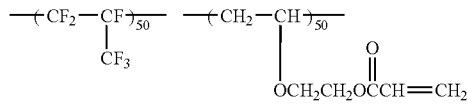

(50:50 indicates the molar ratio)

In a stainless steel-made autoclave having an inner volume of 100 ml and equipped with a stirrer, 40 ml of ethyl acetate, 14.7 g of hydroxyethyl vinyl ether and 0.55 g of dilauroyl peroxide are charged, and the inside of the system is deaerated and displaced with nitrogen gas. Furthermore, 25 g of hexafluoropropylene (HFP) is introduced into the autoclave, and the temperature is elevated to 65° C. The pressure when the temperature in the autoclave reaches 65° C. is 5.4 kg/cm$^2$. The reaction is continued for 8 hours while keeping this temperature and when the pressure reaches 3.2 kg/cm$^2$, the heating is stopped and the system is allowed to cool. At the time when the inner temperature drops to room temperature, the unreacted monomer is expelled, and the reaction solution is taken out by opening the autoclave. The obtained reaction solution is poured in a large excess of hexane, and the solvent is removed by decantation to take out the precipitated polymer. This polymer is dissolved in a small amount of ethyl acetate, and the residual monomer is completely removed by performing reprecipitation from hexane twice. After drying, 28 g of the polymer is obtained. Subsequently, 20 g of the polymer is dissolved in 100 ml of N,N-dimethylacetamide, and 11.4 g of acrylic acid chloride is added dropwise thereto under ice cooling, followed by stirring at room temperature for 10 hours. Thereafter, ethyl acetate is added to the reaction solution, and the resulting solution is washed with water. The organic layer is extracted and concentrated, and the obtained polymer is reprecipitated from hexane to obtain 19 g of Perfluoroolefin Copolymer (1). The refractive index of the obtained polymer is 1.421.
(Preparation of Sol Solution a-1)

In a reaction vessel equipped with a stirrer and a reflux condenser, 120 parts of methyl ethyl ketone, 100 parts of acryloxypropyltrimethoxysilane (KBM-5103, produced by Shin-Etsu Chemical Co., Ltd.) and 3 parts of diisopropoxyaluminum ethyl acetate are added and mixed and after adding 30 parts of ion-exchanged water, the reaction is allowed to proceed at 60° C. for 4 hours. The reaction solution is then cooled to room temperature to obtain Sol Solution a-1. The mass average molecular weight is found to be 1,800 and out of the oligomer or higher components, the proportion of the components having a molecular weight of 1,000 to 20,000 is found to be 100%. Also, from the gas chromatography analysis, it is revealed that the raw material acryloxypropyltrimethoxysilane does not remain at all.
(Preparation of Sol Solution a-2)

In a 1,000 ml-volume reaction vessel equipped with a thermometer, a nitrogen inlet tube and a dropping funnel, 187 g (0.80 mol) of acryloxyoxypropyltrimethoxysilane, 27.2 g (0.20 mol) of methyltrimethoxysilane, 320 g (10 mol) of methanol and 0.06 g (0.001 mol) of KF are charged, and 15.1 g (0.86 mol) of water is gradually added dropwise with stirring at room temperature. After the completion of dropwise addition, the solution is stirred for 3 hours at room temperature and then heated with stirring for 2 hours under reflux of methanol. Thereafter, the low boiling point fraction is removed by distillation under reduced pressure, and the residue is filtered to obtain 120 g of Sol Solution a-2. The thus-obtained substance is measured by GPC, as a result, the mass average molecular weight is found to be 1,500 and out of the oligomer or higher components, the proportion of the components having a molecular weight of 1,000 to 20,000 is found to be 30%.

Also, from the $^1$H-NMR measurement results, the structure of the obtained substance is found to be a structure represented by the following formula (80:20 indicates the molar ratio). Furthermore, from the gas chromatography analysis, the residual ratio of the raw material acryloxypropyltrimethoxysilane is found to be 5% or less.

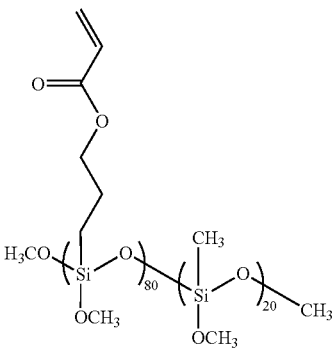

(Preparation of Sol Solution b (Concentration: 15.7%))

In a 2,000 ml-volume reaction vessel equipped with a thermometer, a nitrogen inlet tube and a dropping funnel, 116 parts by mass of dimethyldimethoxysilane, 600 parts by mass of i-propanol and 3 parts by mass of diisopropoxyaluminum ethyl acetate (KEROPE EP-12, produced by Hope Chemical Co., Ltd.) are charged, and 20.0 parts by mass of ion-exchanged water is gradually added dropwise with stirring at room temperature. After the completion of dropwise addition, the solution is stirred for 3 hours at room temperature, the reaction is allowed to proceed at 60° C. for 4 hours, and the reaction solution is then cooled to room temperature to obtain Sol Solution b. The thus-obtained substance is measured by GPC, as a result, Mw is found to be 2,500.
(Preparation of Fluorine-Containing Compound Solution (Preparation of Sol Solution c (Concentration: 7.9%)))

In a 2,000 ml-volume reaction vessel equipped with a thermometer, a nitrogen inlet tube and a dropping funnel, 5.5 parts by mass of Si(OC$_2$H$_5$)$_4$, 47.0 parts by mass of CF$_3$(CF$_3$)$_5$(CH$_2$)$_2$Si(OCH$_3$)$_3$ and 600 parts by mass of i-propanol are charged, and 14.5 parts by mass of 0.1 mol/L hydrochloric acid is gradually added dropwise with stirring at room temperature. After the completion of dropwise addition, the solution is stirred for 3 hours at room temperature, the reaction is allowed to proceed at 60° C. for 8 hours, and the reaction solution is then cooled to room temperature to obtain Sol Solution c. The thus-obtained substance is measured by GPC, as a result, Mw is found to be 8,800.

(Preparation of Hollow Silica Fine Particle Sol Liquid Dispersion a)

30 Parts of acryloyloxypropyltrimethoxysilane (produced by Shin-Etsu Chemical Co., Ltd.) and 1.5 parts of diisopropoxyaluminum ethyl acetate are added and mixed to 500 parts of a hollow silica fine particle sol (isopropyl alcohol silica sol, average particle diameter: 60 nm, thickness of shell: 10 nm, silica concentration: 20 mass %, refractive index of silica particle: 1.31, prepared according to Preparation Example 4 of JP-A-2002-79616 by changing the size), and 9 parts of ion-exchanged water is added thereto. After allowing the reaction to proceed at 60° C. for 8 hours, the reaction solution is cooled to room temperature, and 1.8 parts of acetyl acetone is added. While adding cyclohexanone to 500 g of the resulting liquid dispersion to keep almost constant the silica content, solvent replacement by reduced-pressure distillation is performed under a pressure of 20 kPa. Foreign matters are not generated in the liquid dispersion and when the solid content concentration is adjusted to 20 mass % with cyclohexanone, the viscosity is 5 mPa·s at 25° C. The amount of isopropyl alcohol remaining in the obtained liquid dispersion is analyzed by gas chromatography and found to be 1.5%.

(Preparation of Hollow Silica Fine Particle Sol Liquid Dispersion b)

Dimethyloctadecyl-3-trimethoxy.silylpropylammonium chloride (XS70-241, produced by Toshiba Silicone) is added to a hollow silica fine particle sol (isopropyl alcohol silica sol, average particle diameter: 60 nm, thickness of shell: 10 nm, silica concentration: 20 mass %, refractive index of silica particle: 1.31, prepared according to Preparation Example 4 of JP-A-2002-79616 by changing the size) in an amount of 5 wt % per 100 parts by mass of silica, and the mixture is heat-treated at 50° C. for 1 hour to obtain an isopropyl alcohol liquid dispersion containing 20 wt % of a surface-treated silica fine particle having pores. While adding methyl isobutyl ketone to this liquid dispersion to keep almost constant the silica content, solvent replacement by reduced-pressure distillation is performed under a pressure of 20 kPa. Foreign matters are not generated in the liquid dispersion. The solid content concentration is then adjusted to 20 mass % with methyl isobutyl ketone. The amount of isopropyl alcohol remaining in the obtained Liquid Dispersion b is analyzed by gas chromatography and found to be 1.5%.

(Preparation of Coating Solution for Layer Having Hardcoat Property)

The components shown below are charged into a mixing tank and after stirring, the resulting solution is filtered through a polypropylene-made filter having a pore size of 10 μm to prepare the coating solution.

(Preparation of Coating Solution (HCL-1) for Layer Having Hardcoat Property)

| Component | Amount |
|---|---|
| PETA | 34.90 parts by mass |
| DPHA | 3.90 parts by mass |
| Irgacure 184 | 1.17 parts by mass |
| Irgacure 907 | 0.21 parts by mass |
| Cohesive Silica <1> | 11.53 parts by mass |
| FZ-2191 | 0.013 parts by mass |
| Toluene | 35.98 parts by mass |
| Cyclohexanone | 11.60 parts by mass |

(Preparation of Coating Solution (HCL-2) for Layer Having Hardcoat Property)

| Component | Amount |
|---|---|
| PETA | 34.90 parts by mass |
| DPHA | 3.90 parts by mass |
| Irgacure 184 | 1.17 parts by mass |
| Irgacure 907 | 0.21 parts by mass |
| Cohesive Silica <1> | 8.53 parts by mass |
| 3.5 μm-Acryl Bead <1> (30%) | 5.53 parts by mass |
| FZ-2191 | 0.013 parts by mass |
| Toluene | 35.98 parts by mass |
| Cyclohexanone | 11.60 parts by mass |

(Preparation of Coating Solution (HCL-3) for Layer Having Hardcoat Property)

| Component | Amount |
|---|---|
| PETA | 21.28 parts by mass |
| DPHA | 8.63 parts by mass |
| Acryl polymer | 3.02 parts by mass |
| Styrene•acryl polymer | 0.16 parts by mass |
| Irgacure 184 | 1.96 parts by mass |
| Irgacure 907 | 0.33 parts by mass |
| 3.5-μm Acryl Bead <1> (30%) | 10.53 parts by mass |
| 3.5-μm Acryl Bead <2> (30%) | 5.50 parts by mass |
| FZ-2191 | 0.013 parts by mass |
| Toluene | 30.98 parts by mass |
| Cyclohexanone | 11.60 parts by mass |

(Preparation of Coating Solution (HCL-4) for Layer Having Hardcoat Property)

| Component | Amount |
|---|---|
| PETA | 24.90 parts by mass |
| DPHA | 3.90 parts by mass |
| Irgacure 184 | 1.17 parts by mass |
| Irgacure 907 | 0.21 parts by mass |
| Cohesive Silica <1> | 21.53 parts by mass |
| FZ-2191 | 0.013 parts by mass |
| Toluene | 35.98 parts by mass |
| Cyclohexanone | 11.60 parts by mass |

(Preparation of Coating Solution (HCL-5) for Layer Having Hardcoat Property)

| Component | Amount |
|---|---|
| PETA | 28.90 parts by mass |
| DPHA | 3.90 parts by mass |
| Irgacure 184 | 1.17 parts by mass |
| Irgacure 907 | 0.21 parts by mass |
| 3.5-μm Styrene Bead <1> (30%) | 11.53 parts by mass |
| FZ-2191 | 0.013 parts by mass |
| Toluene | 35.98 parts by mass |
| Cyclohexanone | 11.60 parts by mass |

(Preparation of Coating Solution (HCL-6) for Layer Having Hardcoat Property)

| Component | Amount |
|---|---|
| PET-30 | 27.40 parts by mass |
| Irgacure 184 | 1.17 parts by mass |
| Irgacure 907 | 0.21 parts by mass |
| 8-μm Crosslinked acryl particle (30%) | 12.00 parts by mass |
| 8-μm Crosslinked acryl•styrene particle (30%) | 20.00 parts by mass |
| Cohesive Silica <2> | 8.53 parts by mass |
| FZ-2191 | 0.013 parts by mass |
| MIBK | 16.80 parts by mass |
| MEK | 18.00 parts by mass |

(Preparation of Coating Solution (HCL-7) for Layer Having Hardcoat Property)

| Component | Amount |
|---|---|
| PET-30 | 27.40 parts by mass |
| Irgacure 184 | 1.17 parts by mass |
| Irgacure 907 | 0.21 parts by mass |
| 6-μm Crosslinked acryl particle (30%) | 12.00 parts by mass |
| 6-μm Crosslinked acryl•styrene particle (30%) | 20.00 parts by mass |
| Cohesive Silica <2> | 8.53 parts by mass |
| FZ-2191 | 0.013 parts by mass |
| MIBK | 16.80 parts by mass |
| MEK | 18.00 parts by mass |

(Preparation of Coating Solution (HCL-8) for Layer Having Hardcoat Property)

| Component | Amount |
|---|---|
| PET-30 | 27.40 parts by mass |
| Irgacure 184 | 1.17 parts by mass |
| Irgacure 907 | 0.21 parts by mass |
| 5-μm Crosslinked acryl•styrene particle (30%) | 12.00 parts by mass |
| 3.5-μm Crosslinked acryl•styrene particle (30%) | 12.00 parts by mass |
| Cohesive Silica <2> | 8.53 parts by mass |
| FZ-2191 | 0.013 parts by mass |

-continued

| | |
|---|---|
| MIBK | 16.80 parts by mass |
| MEK | 18.00 parts by mass |

The components above are as follows.

"PETA":

Pentaerythiritol triacrylate (produced by Nippon Kayaku Co., Ltd., refractive index: 1.51).

"DPHA":

Produced by Nippon Kayaku Co., Ltd., refractive index: 1.51.

"Acryl Polymer":

(Produced by Mitsubishi Rayon Co., Ltd., molecular weight: 75,000)

"Styrene.Acryl Polymer":

(Produced by INCTEC Inc., molecular weight: 65,000)

"Irgacure 184":

Photopolymerization initiator (produced by Ciba Specialty Chemicals Corp.).

"Irgacure 907":

Photopolymerization initiator (produced by Ciba Specialty Chemicals Corp.).

"3.5-μm Acryl Bead <1> (30%)":

A 30% toluene liquid dispersion of acryl beads having an average particle diameter of 3.5 μm (produced by Nippon Shokubai Co., Ltd., refractive index: 1.53), used after dispersion by a polytron disperser at 10,000 rpm for 20 minutes.

"3.5-μm Acryl Bead <2> (30%)":

A 30% toluene liquid dispersion of acryl beads having an average particle diameter of 3.5 μm (produced by Nippon Shokubai Co., Ltd., refractive index: 1.52), used after dispersion by a polytron disperser at 10,000 rpm for 20 minutes.

"3.5-μm Styrene Bead <1> (30%)":

A 30% toluene liquid dispersion of styrene beads having an average particle diameter of 3.5 μm (produced by The Soken Chemical & Engineering Co., refractive index: 1.61), used after dispersion by a polytron disperser at 10,000 rpm for 20 minutes.

"Cohesive Silica <1>":

Secondary aggregate diameter: 4 μm, produced by Tosoh Silica Corp.

"FZ-2191":

Polyether-modified silicone (produced by Toray Dow Corning).

"8-μm Crosslinked Acryl Particle (30%)":

A 30% MIBK liquid dispersion of crosslinked acryl particle having an average particle diameter of 8.0 μm (produced by Soken Chemical & Engineering Co., refractive index: 1.50), used after dispersion by a polytron disperser at 10,000 rpm for 20 minutes.

"8-μm Crosslinked Acryle.Styrene Particle (30%)":

A 30% MIBK liquid dispersion of crosslinked acryle.styrene particle having an average particle diameter of 8.0 μm (produced by Soken Chemical & Engineering Co., refractive index: 1.56), used after dispersion by a polytron disperser at 10,000 rpm for 20 minutes.

"6-μm Crosslinked Acryl Particle (30%)":

A 30% MIBK liquid dispersion of crosslinked acryl particle having an average particle diameter of 6.0 μm (produced by Soken Chemical & Engineering Co., refractive index: 1.50), used after dispersion by a polytron disperser at 10,000 rpm for 20 minutes.

"6-μm Crosslinked Acryle.Styrene Particle (30%)":

A 30% MIBK liquid dispersion of crosslinked acryl.styrene particle having an average particle diameter of 6.0 μm (produced by Soken Chemical & Engineering Co., refractive index: 1.56), used after dispersion by a polytron disperser at 10,000 rpm for 20 minutes.

"5-μm Crosslinked Acryle.Styrene Particle (30%)":

A 30% MIBK liquid dispersion of crosslinked acryl.styrene particle having an average particle diameter of 5.0 μm (produced by Soken Chemical & Engineering Co., refractive index: 1.56), used after dispersion by a polytron disperser at 10,000 rpm for 20 minutes.

"3.5-μm Crosslinked Acryl.Styrene Particle (30%)":

A 30% MIBK liquid dispersion of crosslinked acryle.styrene particle having an average particle diameter of 3.5 μm (produced by Soken Chemical & Engineering Co., refractive index: 1.50), used after dispersion by a polytron disperser at 10,000 rpm for 20 minutes.

"Cohesive Silica <2>":

Nipsil SS-30P (secondary aggregate diameter: 8.9 μm, produced by Tosoh Silica Corp.).

(Preparation of Coating Solution for Overcoat Layer)

The components shown below are charged into a mixing tank and after stirring, the resulting solution is filtered through a polypropylene-made filter having a pore size of 10 μm to prepare the coating solution.

| (Preparation of Coating Solution (OCL-1) for Overcoat Layer) | |
|---|---|
| DPHA | 39.30 parts by mass |
| Acryl polymer | 3.13 parts by mass |
| Irgacure 184 | 2.12 parts by mass |
| Irgacure 907 | 0.43 parts by mass |
| FZ-2191 | 0.25 parts by mass |
| Toluene | 49.53 parts by mass |
| Cyclohexanone | 5.48 parts by mass |
| (Preparation of Coating Solution (OCL-2) for Overcoat Layer) | |
| DPHA | 31.44 parts by mass |
| KBM-5103 | 7.86 parts by mass |
| Acryl polymer | 3.13 parts by mass |
| Irgacure 184 | 2.12 parts by mass |
| Irgacure 907 | 0.43 parts by mass |
| FZ-2191 | 0.25 parts by mass |
| Toluene | 49.53 parts by mass |
| Cyclohexanone | 5.48 parts by mass |
| (Preparation of Coating Solution (OCL-3) for Overcoat Layer) | |
| DPHA | 31.44 parts by mass |
| Sol Solution a-2 | 7.86 parts by mass |
| Acryl polymer | 3.13 parts by mass |
| Irgacure 184 | 2.12 parts by mass |
| Irgacure 907 | 0.43 parts by mass |
| FZ-2191 | 0.25 parts by mass |
| Toluene | 49.53 parts by mass |
| Cyclohexanone | 5.48 parts by mass |
| (Preparation of Coating Solution (OCL-4) for Overcoat Layer) | |
| Z-7404 | 75.00 parts by mass |
| KBM-5103 | 5.00 parts by mass |
| FZ-2191 | 0.008 parts by mass |
| MEK | 20.00 parts by mass |
| (Preparation of Coating Solution (OCL-5) for Overcoat Layer) | |
| DPHA | 39.30 parts by mass |
| Acryl polymer | 3.13 parts by mass |
| Irgacure 184 | 2.12 parts by mass |
| Irgacure 907 | 0.43 parts by mass |
| Toluene | 49.53 parts by mass |
| Cyclohexanone | 5.48 parts by mass |

The components above are as follows.

"DPHA":

Produced by Nippon Kayaku Co., Ltd., refractive index: 1.51.

"Acryl Polymer":
(Produced by Mitsubishi Rayon Co., Ltd., molecular weight: 75,000)

"Irgacure 184":
Photopolymerization initiator (produced by Ciba Specialty Chemicals Corp.).

"Irgacure 907":
Photopolymerization initiator (produced by Ciba Specialty Chemicals Corp.).

"FZ-2191":
Polyether-modified silicone (produced by Toray Dow Corning).

"KBM-5103":
Silane coupling agent (produced by Shin-Etsu Chemical Co., Ltd.).

"Z-7404":
Zirconia-containing paint composition (produced by JSR, resin matrix having a refractive index of 1.72, solid content: 60%).

"MIBK": Methyl isobutyl ketone
"MEK": Methyl ethyl ketone (Preparation of Coating Solution for Low Refractive Index Layer)

The components shown below are charged into a mixing tank and after stirring, the resulting solution is filtered through a polypropylene-made filter having a pore size of 3 μm to prepare the coating solution.

(Preparation of Coating Solution (LL-1) for Low Refractive Index Layer)

| | |
|---|---|
| Thermal crosslinking fluorine-containing polymer | 3.44 parts by mass |
| CYMEL 303 | 0.86 parts by mass |
| CATALYST 4050 | 0.08 parts by mass |
| Hollow Silica Fine Particle Sol a | 19.5 parts by mass |
| Sol Solution a-1 | 3.4 parts by mass |
| MEK | 106.1 parts by mass |
| Cyclohexanone | 12.9 parts by mass |

The refractive index of the layer formed of this coating solution is 1.38.

(Preparation of Coating Solution (LL-2) for Low Refractive Index Layer)

| | |
|---|---|
| Perfluoroolefin Copolymer (1) (solid content: 30%) | 15.0 parts by mass |
| X-22-164C | 0.15 parts by mass |
| Irgacure 907 | 0.23 parts by mass |
| Hollow Silica Fine Particle Sol a | 19.5 parts by mass |
| Sol Solution a-1 | 2.4 parts by mass |
| Compound 1. | 0.02 parts by mass |
| MEK | 65.2 parts by mass |
| Cyclohexanone | 8.8 parts by mass |

The refractive index of the layer formed of this coating solution is 1.38.

(Preparation of Coating Solution (LL-3) for Low Refractive Index Layer)

| | |
|---|---|
| Colcoat N103 (2%) | 245 parts by mass |
| Opstar JTA105 (5%) | 100 parts by mass |
| Opstar JTA105A (5%) | 1 part by mass |
| Hollow Silica Fine Particle Sol b | 35 parts by mass |
| Isopropyl alcohol | 200 parts by mass |
| Butyl acetate | 175 parts by mass |

The refractive index of the layer formed of this coating solution is 1.38.

(Preparation of Coating Solution (LL-4) for Low Refractive Index Layer)

| | |
|---|---|
| Hollow Silica Fine Particle Sol a | 14.67 parts by mass |
| STATICIDE | 0.24 parts by mass |
| PETA | 1.71 parts by mass |
| Irgacure 907 | 0.11 parts by mass |
| MIBK | 75.26 parts by mass |
| Cyclohexanone | 8.8 parts by mass |

The refractive index of the layer formed of this coating solution is 1.38.

(Preparation of Coating Solution (LL-5) for Low Refractive Index Layer)

| | |
|---|---|
| Thermal crosslinking fluorine-containing polymer | 3.64 parts by mass |
| CYMEL 303 | 0.91 parts by mass |
| CATALYST 4050 | 0.08 parts by mass |
| MEK-ST-L | 7.6 parts by mass |
| MEK | 77.8 parts by mass |
| Cyclohexanone | 8.9 parts by mass |

The refractive index of the layer formed of this coating solution is 1.43.

(Preparation of Coating Solution (LL-6) for Low Refractive Index Layer)

| | |
|---|---|
| Thermal crosslinking fluorine-containing polymer | 3.00 parts by mass |
| CYMEL 303 | 0.75 parts by mass |
| CATALYST 4050 | 0.07 parts by mass |
| MEK-ST-L | 6.4 parts by mass |
| Sol Solution a-1 | 5.8 parts by mass |
| MEK | 74.2 parts by mass |
| Cyclohexanone | 7.9 parts by mass |

The refractive index of the layer formed of this coating solution is 1.44.

(Preparation of Coating Solution (LL-7) for Low Refractive Index Layer)

| | |
|---|---|
| Thermal crosslinking fluorine-containing polymer | 3.00 parts by mass |
| CYMEL 303 | 0.75 parts by mass |
| CATALYST 4050 | 0.07 parts by mass |
| MEK-ST-L | 6.4 parts by mass |
| Sol Solution a-1 | 5.8 parts by mass |
| Compound 1. | 0.04 parts by mass |
| MEK | 74.2 parts by mass |
| Cyclohexanone | 7.9 parts by mass |

The refractive index of the layer formed of this coating solution is 1.44.

The components above are as follows.

"Thermal Crosslinking Fluorine-Containing Polymer":
The fluorine-containing and silicone-containing heat-curable polymer described in Example 1 of JP-A-11-189621.

"CYMEL 303":
Curing agent (produced by Nihon Cytec Industries Inc.).

"CATALYST 4050":
Curing catalyst (produced by Nihon Cytec Industries Inc.).

"MEK-ST-L":
Colloidal silica liquid dispersion (produced by Nissan Chemicals Industries, Ltd., average particle diameter: 45 nm, solid content concentration: 30%).

"X22-164C":
Reactive silicone (produced by Shin-Etsu Chemical Co., Ltd.).

"Irgacure 907":
Photopolymerization initiator (produced by Ciba Specialty Chemicals Corp.)

"Colcoat N103":
Organosiloxane oligomer (produced by Colcoat Co., Ltd., average molecular weight: 950).

"Opstar JTA105":
Fluorine Compound (B) of the present invention (containing polyethylene glycol, hexamethylolmelamine and acid generator, produced by JSR Corp.).

"Opstar JTA105A":
Curing agent (produced by JSR Corp.).

"STATICIDE":
Antistatic agent (a quaternary ammonium compound, produced by Mitsui Bussan Plastics Co., Ltd.).

"PETA":
Pentaerythritol triacrylate (produced by Nippon Kayaku Co., Ltd., refractive index: 1.51)

"MIBK": Methyl isobutyl ketone
"MEK": Methyl ethyl ketone

Example 1

Production of Antireflection Film

Using Coating Solution (HCL-1) for Layer Having Hardcoat Property (Antiglare Layer), Coating Solution (OCL-1)

for Overcoat Layer and Coating Solution (LL-1) for Low Refractive Index Layer, coating is performed according to the following coating and drying methods. Coating Solution (HCL-1) for Layer Having Hardcoat Property is coated on a 80 μm-thick triacetyl cellulose film (TD80UF, produced by Fujifilm Corp., refractive index: 1.48) by using a gravure coater under the condition of a conveying speed of 20 m/min, dried at 30° C. for 30 seconds in a first (initial) drying zone, further dried at 110° C. for 2 minutes in a second drying zone and then irradiated with an ultraviolet ray at an irradiation dose of 30 mJ/cm$^2$ by using an air-cooled metal halide lamp (manufactured by Eye Graphics Co., Ltd.) under nitrogen purging to an oxygen concentration of 0.05% or less, thereby curing the coating layer, and the resulting film is taken up. The air velocity in the first drying zone is 0.2 m/s at a maximum, and it is confirmed that the film coating is set within the drying zone. The thickness of this layer having hardcoat property is 3.5 μm.

Subsequently, Coating Solution (OCL-1) for Overcoat Layer is coated thereon by using a gravure coater under the condition of a conveying speed of 20 m/min, dried at 30° C. for 30 seconds in a first (initial) drying zone, further dried at 110° C. for 2 minutes and then irradiated with an ultraviolet ray at an irradiation dose of 30 mJ/cm$^2$ by using an air-cooled metal halide lamp (manufactured by Eye Graphics Co., Ltd.) under nitrogen purging to an oxygen concentration of 0.05% or less, thereby curing the coating layer, and the resulting film is taken up.

Furthermore, Coating Solution (LL-1) for Low Refractive Index Layer is coated thereon by using a gravure coater under the condition of a conveying speed of 20 m/min, dried at 25° C. for 30 seconds in a first (initial) drying zone, further dried at 90° C. for 2 minutes and after heat curing at 120° C. for 10 minutes, irradiated with an ultraviolet ray at an irradiation dose of 400 mJ/cm$^2$ by using an air-cooled metal halide lamp (manufactured by Eye Graphics Co., Ltd.) under nitrogen purging to an oxygen concentration of 0.05% or less to provide a low refractive index layer. In this way, Antireflection Laminate (F-101) is produced.

Antireflection Laminates (F-102) to (F-124) are also produced in the same manner as F-101 by using each coating solution shown in Table 1 for each layer. In Table 7, curing conditions (heat curing and/or UV curing) of each layer are shown, and in Table 8, the dry thickness of each layer is shown.

In Tables 6 to 8, the antiglare layer, overcoat layer and antireflection layer indicate the layers stacked on the support starting from the left in the Tables. For example, Sample F-101 has an antiglare layer, an overcoat layer and an antireflection layer in this order on the support.

TABLE 6

| | Sample No. | Antiglare Layer Coating Solution | Overcoat Layer Coating Solution | Antireflection Layer Coating Solution |
|---|---|---|---|---|
| Invention | F-101 | HCL-1 | OCL-1 | LL-1 |
| Invention | F-102 | HCL-1 | OCL-1 | LL-2 |
| Invention | F-103 | HCL-1 | OCL-1 | LL-3 |
| Invention | F-104 | HCL-1 | OCL-1 | LL-4 |
| Invention | F-105 | HCL-1 | OCL-1 | LL-5 |
| Invention | F-106 | HCL-1 | OCL-1 | LL-6 |
| Invention | F-107 | HCL-1 | OCL-1 | LL-7 |
| Invention | F-108 | HCL-1 | OCL-2 | LL-1 |
| Invention | F-109 | HCL-1 | OCL-3 | LL-1 |
| Invention | F-110 | HCL-1 | OCL-4 | LL-1 |
| Invention | F-111 | HCL-1 | OCL-4 | LL-2 |
| Invention | F-112 | HCL-1 | OCL-4 | LL-3 |
| Invention | F-113 | HCL-1 | OCL-4 | LL-4 |
| Invention | F-114 | HCL-1 | OCL-5 | LL-1 |
| Invention | F-115 | HCL-2 | OCL-3 | LL-1 |
| Invention | F-116 | HCL-2 | OCL-3 | LL-2 |
| Invention | F-117 | HCL-2 | OCL-3 | LL-3 |
| Invention | F-118 | HCL-2 | OCL-3 | LL-4 |
| Comparative Example | F-119 | HCL-3 | OCL-1 | LL-2 |
| Comparative Example | F-120 | HCL-3 | OCL-5 | LL-2 |
| Comparative Example | F-121 | HCL-1 | — | LL-1 |
| Comparative Example | F-122 | HCL-4 | OCL-1 | LL-4 |
| Comparative Example | F-123 | HCL-4 | OCL-1 | LL-4 |
| Comparative Example | F-124 | HCL-5 | OCL-1 | LL-4 |
| Invention | F-125 | HCL-1 | OCL-1 | LL-2 |
| Invention | F-126 | HCL-1 | OCL-1 | LL-2 |
| Invention | F-127 | HCL-1 | OCL-1 | LL-2 |
| Invention | F-128 | HCL-6 | OCL-1 | LL-2 |
| Invention | F-129 | HCL-7 | OCL-1 | LL-2 |
| Invention | F-130 | HCL-8 | OCL-1 | LL-2 |
| Comparative Example | F-131 | HCL-1 | OCL-1 | LL-2 |
| Comparative Example | F-132 | HCL-1 | OCL-1 | LL-2 |

TABLE 7

| | Sample No. | Antiglare Layer Curing Conditions | Overcoat Layer Curing Conditions | Antireflection Layer Curing Conditions |
|---|---|---|---|---|
| Invention | F-101 | 30 mJ/cm$^2$ | 30 mJ/cm$^2$ | 120° C., 10 min + 400 mJ/cm$^2$ |
| Invention | F-102 | 30 mJ/cm$^2$ | 30 mJ/cm$^2$ | 400 mJ/cm$^2$ |
| Invention | F-103 | 30 mJ/cm$^2$ | 30 mJ/cm$^2$ | 120° C., 10 min[1] |
| Invention | F-104 | 30 mJ/cm$^2$ | 30 mJ/cm$^2$ | 400 mJ/cm$^2$ |
| Invention | F-105 | 30 mJ/cm$^2$ | 30 mJ/cm$^2$ | 120° C., 10 min + 400 mJ/cm$^2$ |
| Invention | F-106 | 30 mJ/cm$^2$ | 30 mJ/cm$^2$ | 120° C., 10 min + 400 mJ/cm$^2$ |
| Invention | F-107 | 30 mJ/cm$^2$ | 30 mJ/cm$^2$ | 120° C., 10 min + 400 mJ/cm$^2$[1] |
| Invention | F-108 | 30 mJ/cm$^2$ | 30 mJ/cm$^2$ | 120° C., 10 min + 400 mJ/cm$^2$[1] |
| Invention | F-109 | 30 mJ/cm$^2$ | 30 mJ/cm$^2$ | 120° C., 10 min + 400 mJ/cm$^2$[1] |
| Invention | F-110 | 30 mJ/cm$^2$ | 30 mJ/cm$^2$ | 120° C., 10 min + 400 mJ/cm$^2$ |
| Invention | F-111 | 30 mJ/cm$^2$ | 30 mJ/cm$^2$ | 400 mJ/cm$^2$ |
| Invention | F-112 | 30 mJ/cm$^2$ | 30 mJ/cm$^2$ | 120° C., 10 min[1] |
| Invention | F-113 | 30 mJ/cm$^2$ | 30 mJ/cm$^2$ | 400 mJ/cm$^2$ |
| Invention | F-114 | 30 mJ/cm$^2$ | 30 mJ/cm$^2$ | 120° C., 10 min + 400 mJ/cm$^2$ |
| Invention | F-115 | 30 mJ/cm$^2$ | 30 mJ/cm$^2$ | 120° C., 10 min + 400 mJ/cm$^2$ |
| Invention | F-116 | 30 mJ/cm$^2$ | 30 mJ/cm$^2$ | 400 mJ/cm$^2$ |
| Invention | F-117 | 30 mJ/cm$^2$ | 30 mJ/cm$^2$ | 120° C., 10 min[1] |
| Invention | F-118 | 30 mJ/cm$^2$ | 30 mJ/cm$^2$ | 400 mJ/cm$^2$ |
| Comparative Example | F-119 | 30 mJ/cm$^2$ | 30 mJ/cm$^2$ | 400 mJ/cm$^2$ |
| Comparative Example | F-120 | 30 mJ/cm$^2$ | 30 mJ/cm$^2$ | 400 mJ/cm$^2$ |

TABLE 7-continued

|  | Sample No. | Antiglare Layer Curing Conditions | Overcoat Layer Curing Conditions | Antireflection Layer Curing Conditions |
|---|---|---|---|---|
| Comparative Example | F-121 | 30 mJ/cm$^2$ | — | 120° C., 10 min + 400 mJ/cm$^2$ |
| Comparative Example | F-122 | 30 mJ/cm$^2$ | 30 mJ/cm$^2$ | 400 mJ/cm$^2$ |
| Comparative Example | F-123 | 30 mJ/cm$^2$ | 30 mJ/cm$^2$ | 400 mJ/cm$^2$ |
| Comparative Example | F-124 | 30 mJ/cm$^2$ | 30 mJ/cm$^2$ | 400 mJ/cm$^2$ |
| Invention | F-125 | 30 mJ/cm$^2$ | 30 mJ/cm$^2$ | 400 mJ/cm$^2$ |
| Invention | F-126 | 30 mJ/cm$^2$ | 30 mJ/cm$^2$ | 400 mJ/cm$^2$ |
| Invention | F-127 | 30 mJ/cm$^2$ | 30 mJ/cm$^2$ | 400 mJ/cm$^2$ |
| Invention | F-128 | 30 mJ/cm$^2$ | 30 mJ/cm$^2$ | 400 mJ/cm$^2$ |
| Invention | F-129 | 30 mJ/cm$^2$ | — | 400 mJ/cm$^2$ |
| Invention | F-130 | 30 mJ/cm$^2$ | 30 mJ/cm$^2$ | 400 mJ/cm$^2$ |
| Comparative Example | F-131 | 30 mJ/cm$^2$ | 30 mJ/cm$^2$ | 400 mJ/cm$^2$ |
| Comparative Example | F-132 | 30 mJ/cm$^2$ | 30 mJ/cm$^2$ | 400 mJ/cm$^2$ |

[1] The low refractive index layer cured under the above-described conditions is taken up and then subjected to an additional heat treatment at a temperature of 60° C. and a relative humidity of 90% for 40 hours.

TABLE 8

|  | Sample No. | Antiglare Layer Thickness | Overcoat Layer Thickness | Antireflection Layer Thickness | Antiglare Layer Rz | Overcoat Layer Rz | Overcoat Layer Surface Free Energy |
|---|---|---|---|---|---|---|---|
| Invention | F-101 | 3.5 μm | 1 μm | 95 nm | 2.0 μm | 1.4 μm | 35 mJ/cm$^2$ |
| Invention | F-102 | 3.5 μm | 1 μm | 97 nm | 2.0 μm | 1.4 μm | 35 mJ/cm$^2$ |
| Invention | F-103 | 3.5 μm | 1 μm | 96 nm | 2.0 μm | 1.4 μm | 35 mJ/cm$^2$ |
| Invention | F-104 | 3.5 μm | 1 μm | 96 nm | 2.0 μm | 1.4 μm | 35 mJ/cm$^2$ |
| Invention | F-105 | 3.5 μm | 1 μm | 96 nm | 2.0 μm | 1.4 μm | 35 mJ/cm$^2$ |
| Invention | F-106 | 3.5 μm | 1 μm | 94 nm | 2.0 μm | 1.4 μm | 35 mJ/cm$^2$ |
| Invention | F-107 | 3.5 μm | 1 μm | 96 nm | 2.0 μm | 1.4 μm | 35 mJ/cm$^2$ |
| Invention | F-108 | 3.5 μm | 1 μm | 95 nm | 2.0 μm | 1.4 μm | 35 mJ/cm$^2$ |
| Invention | F-109 | 3.5 μm | 1 μm | 98 nm | 2.0 μm | 1.4 μm | 35 mJ/cm$^2$ |
| Invention | F-110 | 3.5 μm | 1 μm | 96 nm | 2.0 μm | 1.3 μm | 37 mJ/cm$^2$ |
| Invention | F-111 | 3.5 μm | 1 μm | 97 nm | 2.0 μm | 1.3 μm | 37 mJ/cm$^2$ |
| Invention | F-112 | 3.5 μm | 1 μm | 96 nm | 2.0 μm | 1.3 μm | 37 mJ/cm$^2$ |
| Invention | F-113 | 3.5 μm | 1 μm | 96 nm | 2.0 μm | 1.3 μm | 37 mJ/cm$^2$ |
| Invention | F-114 | 3.5 μm | 1 μm | 96 nm | 2.0 μm | 1.2 μm | 47 mJ/cm$^2$ |
| Invention | F-115 | 8 μm | 1 μm | 95 nm | 1.9 μm | 1.4 μm | 35 mJ/cm$^2$ |
| Invention | F-116 | 5 μm | 1 μm | 96 nm | 1.9 μm | 1.4 μm | 35 mJ/cm$^2$ |
| Invention | F-117 | 8 μm | 1 μm | 96 nm | 1.9 μm | 1.4 μm | 35 mJ/cm$^2$ |
| Invention | F-118 | 8 μm | 1 μm | 96 nm | 1.9 μm | 1.4 μm | 35 mJ/cm$^2$ |
| Comparative Example | F-119 | 10 μm | 1 μm | 96 nm | 1.7 μm | 1.3 μm | 35 mJ/cm$^2$ |
| Comparative Example | F-120 | 6 μm | 1 μm | 96 nm | 1.7 μm | 1.1 μm | 47 mJ/cm$^2$ |
| Comparative Example | F-121 | 3.5 μm |  | 95 nm | 2.0 μm | — | — |
| Comparative Example | F-122 | 3.5 μm | 0.3 μm | 95 nm | 2.5 μm | 2.4 μm | 35 mJ/cm$^2$ |
| Comparative Example | F-123 | 3.5 μm | 11 μm | 95 nm | 2.5 μm | 0.1 μm | 35 mJ/cm$^2$ |
| Comparative Example | F-124 | 5.0 μm | 1 μm | 95 nm | 2.2 μm | 1.6 μm | 35 mJ/cm$^2$ |
| Invention | F-125 | 3.5 μm | 0.4 μm | 97 nm | 2.0 μm | 1.8 μm | 35 mJ/cm$^2$ |
| Invention | F-126 | 3.5 μm | 2 μm | 97 nm | 2.0 μm | 1.4 μm | 35 mJ/cm$^2$ |
| Invention | F-127 | 3.5 μm | 4.4 μm | 97 nm | 2.0 μm | 1.2 μm | 35 mJ/cm$^2$ |
| Invention | F-128 | 10 μm | 1.5 μm | 97 nm | 2.2 μm | 1.6 μm | 35 mJ/cm$^2$ |
| Invention | F-129 | 10 μm | 1.5 μm | 97 nm | 2.2 μm | 1.6 μm | 35 mJ/cm$^2$ |
| Invention | F-130 | 10 μm | 1.5 μm | 97 nm | 2.2 μm | 1.6 μm | 35 mJ/cm$^2$ |
| Comparative Example | F-131 | 3.5 μm | 0.2 μm | 97 nm | 2.0 μm | 1.9 μm | 35 mJ/cm$^2$ |
| Comparative Example | F-132 | 3.5 μm | 7 μm | 97 nm | 2.0 μm | 0.2 μm | 35 mJ/cm$^2$ |

(Evaluation of Antireflection Laminate)

The film samples obtained are evaluated on the following items, and the results thereof are shown in Tables 9 and 10.

(1) Dense Black Appearance

Using a liquid crystal display device where a polarizing plate laminated with the optical film is disposed on the viewing side surface, sensory evaluation of the dense black appearance is performed. The evaluation is performed by the method of arraying a plurality of display units in series and relatively comparing these at the same time. The black tint at the power-off time and the black tint (black image) at the power-on time each viewed from the frontal side are compared in each film and evaluated according to the following criteria. As the black tint is stronger, the screen is judged to be more distinct.

A: Black tint is strong and the screen appears highly distinct.

B: Black tint is strong and the screen appears distinct.

C: Black tint is slightly tinged with gray but the screen appears distinct.

D: Black but gray-tinged and the screen appears weakly distinct.

E: Significantly strong gray tint and the screen appears indistinct.

(2) Reflection of Outside Light or Image

Using a liquid crystal display device where a polarizing plate laminated with the optical film is disposed on the viewing side surface, sensory evaluation of the reflection of outside light or image is performed. The evaluation is performed by the method of arraying a plurality of display units in series and relatively comparing these at the same time. The reflection of outside light or image on black tint (black image) at the power-off time and the power-on time viewed from the frontal side is compared in each film and evaluated according to the following criteria.

A: Reflection of outside light or image is not annoying.

B: Reflection of outside light or image is recognized but almost not annoying.

C: Reflection of outside light or image is recognized and slightly annoying.

D: Reflection of outside light or image is significantly annoying.

(3) Average Distance Sm of Irregularity Shape

The average distance Sm of the irregularity shape is measured by a two-dimensional roughness gauge, Model SJ-400, manufactured by Mitsutoyo.

(4) Integrated Reflectance

As for the measurement of integrated reflectance, an adapter "ILV-471" is mounted on a spectrophotometer "V-550" [manufactured by JASCO Corp.], the integrated reflectance is measured in the wavelength region of 380 to 780 nm in the state of eliminating reflection on the back surface by roughening the surface on the transparent support side of the film with sand paper and then treating the surface with black ink, and an average reflectance in the range of 450 to 650 nm is calculated and used for the evaluation of antireflective property.

(5) Haze

The entire haze (H), internal haze (Hi) and surface haze (Hs) of the obtained film are determined by the following measurements.

[1] The entire haze value (H) of the film obtained is measured according to JIS-K7136.

[2] After adding several silicone oil drops on the front and back surfaces of the optical film obtained, the film is sandwiched from front and back by two 1 mm-thick glass plates (Microslide Glass No. S9111, produced by Matsunami K.K.), the haze is measured in a surface haze-removed state by bringing the two glass plates into optically complete contact with the film obtained, and the value obtained by subtracting, from this haze, the haze separately measured by interposing only the silicone oil between two glass plates is calculated as the internal haze (Hi).

[3] The value obtained by subtracting the internal haze (Hi) calculated in [2] above from the entire haze (H) measured in [1] above is calculated as the surface haze (Hs).

(6) Evaluation of Steel Wool Scratch Resistance (SW)

A rubbing test is performed on the surface of each antireflection film sample under the following conditions by using a rubbing tester.

Environmental conditions of evaluation: 25° C. and 60% RH

Rubbing material:

A steel wool, "Grade No. 0000" {manufactured by Nihon Steel Wool Co., Ltd.} is wound around the rubbing tip (1 cm×1 cm) of the tester, which comes into contact with the sample, and fixed by a band not to move.

Moving distance (one way): 13 cm

Rubbing speed: 13 cm/sec

Load: 500 g/cm$^2$

Contact area of tip: 1 cm×1 cm

Number of rubbings: 10 reciprocations

An oily black ink is applied to the back side of the rubbed sample, and scratches in the rubbed portion are observed by reflected light with an eye and evaluated according to the following criteria.

A: Scratches are not observed at all even in very careful check.

B: Weak scratches are slightly observed in very careful check.

C: Weak scratches are observed.

D: Moderate scratches are observed.

E: Scratches are recognized at a glance.

TABLE 9

|  | Sample No. | Dense Black Appearance | Reflection of Outside Light or Image | Sm (μm) | Integrated Reflectance (%) | Entire Haze (%) | Internal Haze (%) | SW |
|---|---|---|---|---|---|---|---|---|
| Invention | F-101 | A | A | 160 | 1.7 | 4.7 | 0.8 | B |
| Invention | F-102 | A | A | 155 | 1.7 | 4.6 | 0.7 | B |
| Invention | F-103 | A | A | 163 | 1.7 | 4.8 | 0.7 | D |
| Invention | F-104 | A | A | 160 | 1.7 | 4.9 | 0.8 | B |
| Invention | F-105 | B | B | 155 | 2.6 | 4.6 | 0.8 | D |
| Invention | F-106 | B | B | 158 | 2.6 | 4.8 | 0.7 | B |
| Invention | F-107 | B | B | 160 | 2.6 | 4.9 | 0.8 | B |
| Invention | F-108 | A | A | 165 | 1.7 | 4.9 | 0.7 | A |
| Invention | F-109 | A | A | 160 | 1.7 | 4.6 | 0.8 | A |
| Invention | F-110 | A | A | 165 | 1.7 | 4.8 | 0.8 | A |
| Invention | F-111 | A | A | 170 | 1.7 | 4.9 | 0.7 | A |
| Invention | F-112 | A | A | 165 | 1.7 | 4.8 | 0.8 | D |
| Invention | F-113 | A | A | 170 | 1.7 | 4.9 | 0.8 | A |
| Invention | F-114 | B | A | 120 | 2.1 | 4.7 | 0.7 | B |
| Invention | F-115 | A | A | 120 | 1.8 | 18.5 | 13.8 | A |
| Invention | F-116 | A | A | 110 | 1.8 | 19.0 | 14.2 | A |
| Invention | F-117 | A | A | 115 | 1.8 | 19.5 | 15.0 | D |
| Invention | F-118 | A | A | 115 | 1.8 | 18.8 | 14.2 | A |
| Comparative Example | F-119 | C | A | 90 | 2.1 | 40.5 | 33.8 | B |
| Comparative Example | F-120 | C | A | 60 | 2.2 | 40.5 | 33.5 | B |
| Comparative Example | F-121 | C | A | 80 | 2.2 | 6.2 | 0.8 | C |
| Comparative Example | F-122 | D | A | 35 | 2.1 | 19.0 | 0.8 | D |
| Comparative Example | F-123 | A | D | 250 | 1.7 | 1.0 | 0.8 | B |
| Comparative Example | F-124 | D | A | 50 | 2.1 | 72.0 | 68.0 | D |
| Invention | F-125 | A | A | 90 | 1.9 | 7.2 | 0.8 | B |
| Invention | F-126 | A | A | 180 | 1.8 | 4.2 | 0.8 | B |
| Invention | F-127 | A | B | 200 | 2.0 | 3.3 | 0.8 | B |
| Invention | F-128 | A | A | 120 | 1.8 | 28.5 | 24 | B |

TABLE 9-continued

| | Sample No. | Dense Black Appearance | Reflection of Outside Light or Image | Sm (μm) | Integrated Reflectance (%) | Entire Haze (%) | Internal Haze (%) | SW |
|---|---|---|---|---|---|---|---|---|
| Invention | F-129 | A | A | 140 | 1.8 | 30 | 26 | B |
| Invention | F-130 | A | A | 155 | 1.8 | 42 | 38 | B |
| Comparative Example | F-131 | C | A | 60 | 2.1 | 13.3 | 0.8 | B |
| Comparative Example | F-132 | A | C | 220 | 2.1 | 1.5 | 0.8 | B |

As seen from comparison of the present invention with Comparative Examples, in the present invention where a low refractive index layer is provided on an overcoat layer, the performance in terms of both dense black appearance and reflection of outside light or image is satisfied.

As seen from comparison of F-101 of the present invention with Comparative Example F-121, in the present invention where a low refractive index is provided on an overcoat layer, the low reflectance and the scratch resistance are improved.

As seen from comparison between F-105 and F-106 of the present invention, in F-106 where a silane coupling agent is introduced into the low refractive index layer, the scratch resistance is improved. Also, from comparison of F-101 of the present invention with F-108 to F-110 of the present invention, it is seen that in F-108 to F-110 where a silane coupling agent is introduced into the overcoat layer, the scratch resistance is improved.

As seen from comparison of Inventions 102 and 125 to 127 with Comparative Examples 131 and 132, when the overcoat layer is thick, the performance in terms of reflection of outside light or image is worsened, and when the overcoat layer is thin, the performance in terms of reflection of outside light or image is worsened.

Also, as seen from comparison among Inventions 102 and 125 to 127, when 0.2Rz(HC)<t(OC)<2Rz(HC), the performance in terms of both dense black appearance and reflection of outside light or image is satisfied.

Example 2

Production of Antireflection Laminate (F-201)

A 80 μm-thick triacetyl cellulose film (TD80UF, produced by Fujifilm Corp., refractive index: 1.48) is subjected to destaticization of the surface on the coating side by an ultrasonic dust-removing machine, and Coating Solution (HCL-1) for Layer Having Hardcoat Property is coated thereon using a die coater 10 shown in FIG. 1 at a coating speed of 30 m/min to give a coated amount of 9.0 ml/m². The pressure reduction degree of the low pressure chamber is set to 0.5 kPa. In the coating of HCL-1, coating is performed by setting the gap GL between the downstream lip land 18b and the web 12 to 100 μm. The web after coating is then dried at 80° C. and irradiated with an ultraviolet ray at an irradiation dose of 30 mJ/cm² by using an air-cooled metal halide lamp (manufactured by Eye Graphics Co., Ltd.) under nitrogen purging for giving an atmosphere having an oxygen concentration of 0.05 vol % or less, thereby curing the coating layer, and the resulting film is taken up. In this way, a 6 μm-thick layer having hardcoat property is formed.

On the layer having hardcoat property, Coating Solution (OCL-1) for Overcoat Layer is coated using the above-described die coater at a coating speed of 30 m/min to give a coated amount of 3.0 ml/m². The pressure reduction degree of the low pressure chamber is set to 0.55 kPa. The web after coating is then dried at 25° C. for 30 seconds in a first (initial) drying zone, further dried at 90° C. for 2 minutes and then irradiated with an ultraviolet ray at an irradiation dose of 30 mJ/cm² by using an air-cooled metal halide lamp (manufactured by Eye Graphics Co., Ltd.) under nitrogen purging to an oxygen concentration of 0.05% or less, thereby curing the coating layer, and the resulting film is taken up. In this way, a 1 μm-thick overcoat layer is provided.

On the overcoat layer, Coating Solution (LL-1) for Low Refractive Index Layer is coated using the above-described die coater at a coating speed of 30 m/min to give a coated amount of 5.0 ml/m². The pressure reduction degree of the low pressure chamber is set to 0.55 kPa. The web after coating is then dried at 25° C. for 30 seconds in a first (initial) drying zone, further dried at 90° C. for 2 minutes and after heat curing at 120° C. for 10 minutes, irradiated with an ultraviolet ray at an irradiation dose of 400 mJ/cm² by using an air-cooled metal halide lamp (manufactured by Eye Graphics Co., Ltd.) under nitrogen purging to an oxygen concentration of 0.05% or less, thereby providing a low refractive index layer In this way, an antireflection laminate (F-201) is produced.

Antireflection laminates (F-202) to (F-232) are produced in the same manner as F-201. The coating solutions, curing conditions and film thicknesses of (F-202) to (F-232) correspond to those of (F-102) to (F-132), respectively.

(Evaluation of Antireflection Laminate)

The film samples obtained above are evaluated in the same manner as in Example 1, and the same results are obtained in the film sample produced using the same coating solution.

Example 3

Production of Antireflection Laminate (F-301)

A roll-form triacetyl cellulose film of 80 μm in thickness and 1,340 mm in width, "TAC-TD80U" {produced by Fujifilm Corp.,} is unrolled, and Coating Solution (HCL-1) for Layer Having Hardcoat Property is coated thereon by using a doctor blade and a microgravure roll having a diameter of 50 mm and having a gravure pattern with a line number of 135 lines/inch and a depth of 60 μm under the conditions of a conveying speed of 10 m/min, dried at 60° C. for 150 seconds and further irradiated with an ultraviolet ray at an irradiation dose of 30 mJ/cm² by using an air-cooled metal halide lamp (manufactured by Eye Graphics Co., Ltd.) under nitrogen purging to an oxygen concentration of 0.05 vol % or less to cure the coating layer, whereby a layer having hardcoat property is formed. On this layer, Coating Solution (OCL-1) for Overcoat Layer is coated using a doctor blade and a microgravure roll having a diameter of 50 mm and having a gravure pattern with a line number of 180 lines/inch and a depth of 60 μm, dried at 60° C. for 150 seconds and further irradiated with an ultraviolet ray at an irradiation dose of 30 mJ/cm² by using an air-cooled metal halide lamp (manufactured by Eye Graphics Co., Ltd.) under nitrogen purging to an oxygen concentration of 0.05 vol % or less to cure the coating layer, whereby an overcoat layer is formed. Furthermore, on this overcoat layer, Coating Solution (LL-1) for Low Refractive Index Layer is coated by using a doctor blade and a microgravure roll having a diameter of 50 mm and having a gravure pattern with a line number of 180 lines/inch and a depth of 60 µm, dried at 60° C. for 150 seconds and after heat curing at 120° C. for 10 minutes, further irradiated with an ultraviolet ray at an irradiation dose of 400 mJ/cm² by using an air-cooled metal halide lamp (manufactured by Eye Graphics Co., Ltd.) under nitrogen purging to an oxygen concentration of 0.05% or less to cure the low refractive index layer, whereby three layers, that is, a layer having hardcoat property, an overcoat layer and a low refractive index layer, are continuously coated and cured and the resulting film is taken up by one take-up operation.

Antireflection laminates (F-302) to (F-332) are produced in the same manner as F-301. The coating solutions, curing conditions and film thicknesses of (F-302) to (F-332) correspond to those of (F-102) to (F-132), respectively.

(Evaluation of Antireflection Laminate)

The film samples obtained above are evaluated in the same manner as in Example 1, and the same results are obtained in the film sample produced using the same coating solution.

Example 4

Antireflection laminates are obtained in the same manner as in Examples 1, 2 and 3 except that the triacetyl cellulose film (TD80UF, produced by Fujifilm Corp., refractive index: 1.48) used as the support in Examples 1, 2 and 3 is changed to an optical PET film with an easy adhesion layer (COSMOSHINE A4300, produced by Toyobo Co., Ltd.). In the evaluation of the antireflection laminates, the same results are also obtained. At the same time, the antireflection laminates obtained are improved in the dimensional stability as compared with those of Examples 1, 2 and 3.

Example 5

Antireflection laminates are obtained in the same manner as in Examples 1, 2 and 3 except that the triacetyl cellulose film (TD80UF, produced by Fujifilm Corp., refractive index: 1.48) used as the support in Examples 1, 2 and 3 is changed to a cycloolefin-based resin film (ZEONOR, produced by ZEON Corp.) which is subjected to a corona discharge treatment under the conditions of 2.0 kW and a line speed of 12 mlmin. In the evaluation of the antireflection laminates, the same results are also obtained. At the same time, the antireflection laminates obtained are favored with low moisture absorptivity as compared with those of Examples 1, 2 and 3.

Example 6

Production of Polarizing Plate Protective Film

In the antiglare (antireflection) films (F-101) to (F-104), (F-108) to (F-113), (F-115) to (F-118), (F-201) to (F-204), (F-208) to (F-213), (F-215) to (F-218), (F-225) to (F232), (F-301) to (F-304), (F-308) to (F-313), (F-315) to (F-318) and (F-325) to (F332) produced in Examples 1, 2 and 3, a saponification solution which is an alkali solution comprising 57 parts by mass of potassium hydroxide, 120 parts by mass of propylene glycol, 535 parts by mass of isopropyl alcohol and 288 parts by mass of water and kept at 40° C. is coated on the transparent support surface opposite the side where the layer having hardcoat property is formed, and the transparent support surface is thereby saponified. After thoroughly washing out the alkali solution on the saponified transparent support surface with water, the film is well dried at 100° C. In this way, polarizing plate protective films are produced.

(Production of Polarizing Plate)

A 75 µm-thick polyvinyl alcohol film {produced by Kuraray Co., Ltd.} is dipped in an aqueous solution comprising 1,000 g of water, 7 g of iodine and 10.5 g of potassium iodide for 5 minutes and thereby adsorbed with iodine. Subsequently, this film is uniaxially stretched to 4.4 times in the longitudinal direction in an aqueous 4 mass % boric acid solution and dried while keeping the tensed state, whereby a polarizing film is produced.

Thereafter, the saponified triacetyl cellulose surface of each antiglare (antireflection) film (polarizing plate protective film) of the present invention prepared above is laminated to one surface of the polarizing film by using, as the adhesive, a polyvinyl alcohol-based adhesive. Furthermore, a cellulose acylate film "TD80UF" {produced by Fujifilm Corp.} saponified similarly to the above is laminated to another surface of the polarizing film by using the same polyvinyl alcohol-based adhesive.

(Evaluation of Image Display Device)

The thus-produced polarizing plates of the present invention each is loaded in a TN-, STN-, IPS-, VA- or OCB-mode transmissive, reflective or transflective liquid crystal display device, and evaluation thereof is performed, as a result, these liquid crystal display devices all are favored with excellent antireflection performance and very excellent visibility.

Example 7

The surface of an optically compensatory film "Wide View Film A 12B" {produced by Fujifilm Corp.}, which is opposite the surface where an optically compensatory layer is formed, is saponified under the same conditions as in Example 6.

Subsequently, the saponified triacetyl cellulose surface of each antireflection laminate (polarizing plate protective film) produced in Example 6 is laminated to one surface of the polarizing film produced in Example 6 by using, as the adhesive, a polyvinyl alcohol-based adhesive. Furthermore, the triacetyl cellulose surface of the optically compensatory film subjected to saponification is laminated to another surface of the polarizing film by using the same polyvinyl alcohol-based adhesive.

(Evaluation of Image Display Device)

The thus-produced polarizing plates of the present invention each is loaded in a TN-, STN-, IPS-, VA- or OCB-mode transmissive, reflective or transflective liquid crystal display device, and evaluation thereof is performed, as a result, these liquid crystal display devices all are excellent in the bright-room contrast as compared with those polarizing plates not using an optically compensatory film and also favored with very wide viewing angle in the up/down and left/right directions, excellent antireflection performance and very excellent visibility and display quality.

Example 8

Polarizing plates are produced using the following supports.

Support 1: A triacetyl cellulose film produced according to Example 1 of JP-A-2001-249223.

Support 2: A triacetyl cellulose film produced according to Example 2 of JP-A-2001-249223.

Support 3: A triacetyl cellulose film produced according to Example 2 of JP-A-2003-170492.

Support 4: A 80 μm-thick triacetyl cellulose film "FUJI-TAC TD-80U" {produced by Fujifilm Corp.}.

The retardation values of each support are shown below.
Support 1: Re=40 nm, Rth=130 nm.
Support 2: Re=50 nm, Rth=240 nm.
Support 3: Re=64 nm, Rth=120 nm.
Support 4: Re=4 nm, Rth=45 nm.

[Production of Polarizing Plate (P-1)]

A polarizing film (PF-1) is produced by adsorbing iodine to a stretched polyvinyl alcohol film. First, the commercially available triacetyl cellulose (Support 4) is saponified and laminated to one side of the polarizing film (PF-1) by using a polyvinyl alcohol-based adhesive. Subsequently, Support 1 is saponified and laminated to the opposite side of the polarizing film (PF-1) by using a polyvinyl alcohol-based adhesive. At this time, the transmission axis of the polarizing film (PF-1) and the slow axis of Support 1 are arranged to run in parallel, and the transmission axis of the polarizing film (PF-1) and the slow axis of the commercially available triacetyl cellulose film (Support 4) are arranged to cross each other, whereby a polarizing plate is produced. The thus-obtained polarizing plate is designated as P-1.

[Production of Polarizing Plate (P-2)]

A polarizing plate (P-2) is produced thoroughly in the same manner except that in the polarizing plate (P-1), Support 2 is used in place of Support 1.

[Production of Polarizing Plate (P-3)]

A polarizing plate (P-3) is produced thoroughly in the same manner except that in the polarizing plate (P-1), Support 3 is used in place of Support 1.

[Production of Polarizing Plate (P-4)]

A polarizing plate (P-4) is produced thoroughly in the same manner except that in the polarizing plate (P-1), Support 4 is used in place of Support 1.

[Production of Polarizing Plate (P-1A)]

A polarizing plate (P-1A) is produced thoroughly in the same manner except that in the polarizing plate (P-1), the antiglare (antireflection) film sample F-201 of Example 2 is used in place of Support 1.

[Production of Polarizing Plate (P-2A)]

A polarizing plate (P-2A) is produced thoroughly in the same manner except that in the polarizing plate (P-2), the antiglare (antireflection) film sample F-208 of Example 2 is used in place of Support 2.

[Production of Polarizing Plate (P-3A)]

A polarizing plate (P-3A) is produced thoroughly in the same manner except that in the polarizing plate (P-3), the antiglare (antireflection) film sample F-212 of Example 2 is used in place of Support 3.

Incidentally, in Polarizing Plates P-1A to P-3A, the film sample is disposed such that the low refractive index layer comes to the side not in contact with the polarizing film (PF-1).

Example 9

A pair of polarizing plates and a pair of optically compensatory sheets, provide in a liquid crystal display device "VL-1530S" {manufactured by Fujitsu Ltd.} using a vertical alignment-type liquid crystal cell, are stripped oft and one polarizing plate produced in Example 6 is laminated instead through a self-adhesive material on each of the viewer side and the backlight side in a cross-Nicol arrangement such that the transmission axis of the polarizing plate on the viewer side runs vertically and the transmission axis of the polarizing plate on the backlight side runs horizontally. With respect to the produced liquid crystal display device, a picture image is displayed and sensory evaluation of the reflection of outside light or scene is performed.

It is seen that the devices having the polarizing plates (P-1A to P-3A) of the present invention are assured of reduced reflection of outside light or scene and very high visibility as compared with the devices having the polarizing plates (P-1 to P-4).

Example 10

Antireflection laminates are produced in the same manner except that in the optical films (F-208, F-209, F-210, F-211, F-213, F-215, F-216 and F-218) of Example 2, PET with an easy adhesion layer (COSMOSHINE A4100, produced by Toyobo Co., Ltd., film thickness: 188 μm) is used as the support. The surface film of a 42-inch plasma display without front panel (direct color filter-system PDU-42H6A1, manufactured by Pioneer Corp.) is stripped off, and the antireflection laminate of the present invention is laminated instead through a self-adhesive material such that the low refractive index layer comes to the outer side, as a result, the display device is confirmed to be excellent in the low reflection, scratch resistance and dense black appearance.

Example 11

Antireflection laminates are produced in the same manner except that in the optical films (F-208, F-209, F-210, F-211, F-213, F-215, F-216 and F-218) of Example 2, PET with an easy adhesion layer (COSMOSHINE A4100, produced by Toyobo Co., Ltd., film thickness: 100 μm) is used as the support. The antireflection laminate of the present invention is laminated through a self-adhesive material on the surface of a surface conduction electron emitter display (SED) such that the low refractive index layer comes to the outer side, as a result, the display device is confirmed to be excellent in the low reflection, scratch resistance and dense black appearance.

Example 12

Circularly polarizing plates are produced by laminating a λ/4 plate through a self-adhesive material to the surface on the side opposite the low refractive index layer in the optical films (F-208, F-209, F-210, F-211, F-213, F-215, F-216 and F-218) of Example 2, and each circularly polarizing plate is laminated using a self-adhesive material to the surface of an organic EL display such that the low refractive index layer comes to the outer side, as a result, the display device is confirmed to be excellent in the low reflection, scratch resistance and dense black appearance.

Example 13

The circularly polarizing plates of Example 12 each is used as the polarizing plate on the surface of a reflective liquid crystal display or a transflective liquid crystal display device such that the low refractive index layer comes to the outer side, as a result, the display device is confirmed to be excellent in the low reflection, scratch resistance and dense black appearance.

According to the present invention, an antireflection laminate improved in at least one of reduced reflection, scratch resistance, dense black appearance and less reflection of outside light or exterior image can be provided. More specifically, in an antireflection laminate obtained by stacking a layer having hardcoat property and a low refractive index layer in this order on a support, an overcoat layer is provided directly or indirectly on the layer having hardcoat property, whereby fine irregularities of the layer having hardcoat property can be filled and smoothed to form smooth irregularities. Furthermore, by virtue of providing a low refractive index layer, at least one of reduced reflection, dense black appearance and less reflection of outside light or exterior image can be improved.

It is technically difficult to overlay a uniform optical layer of about 100 nm in thickness on fine irregularities. However, according to the present invention, the layer having hardcoat property has smooth irregularities, so that a layer in thickness close to the designed thickness can be overlaid thereon and an antireflection laminate reduced in reflection can be provided.

Instead of providing a low refractive index layer on fine irregularities of a layer having hardcoat property, an overcoat layer is provided directly or indirectly on the layer having hardcoat property and a low refractive index layer is further provided thereon, whereby scratch resistance is enhanced. It is presumed that by providing a low refractive index layer not on fine irregularities but on smooth irregularities, non-uniformity of the film thickness is improved or satisfactory bonding can be taken at the interface.

An antireflection laminate having desired optical property (at least one of less reflection of outside light or scene, less generation of glaring, high visibility and the like) can be provided. The antireflection laminate of the present invention can be applied, for example, as a surface film of a flat panel display of LCD, PDP, SED and the like or as a protective film for polarizing plates.

The entire disclosure of each and every foreign patent application from which the benefit of foreign priority has been claimed in the present application is incorporated herein by reference, as if fully set forth.

What is claimed is:

1. An antireflection laminate comprising the following layers in order:
    a support;
    a layer having hardcoat property;
    an overcoat layer; and
    a low refractive index layer,
    wherein
       the layer having hardcoat property comprises a metal oxide particle and an organic resin particle,
       the organic resin particle has an average particle diameter of 0.5 to 8 μm,
       the antireflection laminate has a surface haze value of 0 to 12%, an internal haze value of 0 to 60%, and a Sm value of 40 to 200 μm, wherein Sm is an average distance of irregularity shape,
       the metal oxide particle is a cohesive metal oxide particle and has an average secondary particle diameter of 1 to 10 μm,
       the average secondary particle diameter of the metal oxide particle is larger than an average particle diameter of the organic resin particle,
       the difference between the average secondary particle diameter of the metal oxide particle and the average particle diameter of the organic resin particle is from 0.1 to 5 μm, and
       the overcoat layer has a refractive index of 1.48 to 1.65 and satisfies the following formulae (I) and (II):

$0.1Rz(HC) < t(OC) < 3Rz(HC)$      (I)

wherein Rz(HC) represents a ten-point average roughness of the layer having hardcoat property and t(OC) represents a film thickness of the overcoat layer, $0.1Rz(HC) < Rz(OC) < 1Rz(HC)$      (II)

wherein Rz(HC) represents a ten-point average roughness of the layer having hardcoat property and Rz(OC) represents a ten-point average roughness of the overcoat layer.

2. The antireflection laminate according to claim 1, which has an integrated reflectance of 2.0% or less.

3. The antireflection laminate according to claim 1, wherein the overcoat layer has a surface free energy of 20 to 45 mJ/m².

4. The antireflection laminate according to claim 1, wherein the low refractive index layer is formed by coating a low refractive index coating composition that comprises a heat-curable and/or ionizing radiation-curable resin component.

5. The antireflection laminate according to claim 4, wherein the low refractive index coating composition comprises a fluorine-containing resin component.

6. The antireflection laminate according to claim 4, wherein the low refractive index coating composition comprises a solvent having a boiling point of 120° C. or more in an amount of 3 to 50 mass % based on a total amount of the low refractive index coating composition.

7. The antireflection laminate according to claim 1, wherein the low refractive index layer comprises an inorganic fine particle having an average particle diameter of 5 to 200 nm.

8. The antireflection laminate according to claim 7, wherein the inorganic fine particle has, in at least either an inside or a surface thereof, a pore having an average pore diameter of 0.01 to 90 nm.

9. The antireflection laminate according to claim 1, wherein the overcoat layer comprises at least one kind of a fluorine-based leveling agent and/or at least one kind of a silicone-based leveling agent.

10. The antireflection laminate according to claim 1, wherein the overcoat layer is a layer formed by coating a overcoat layer coating composition that comprises:
    a silane coupling agent represented by a following formula (a); and/or
    a hydrolysate of the silane coupling agent and a condensation reaction product of the hydrolysate:

      Formula (a)

wherein
    each of $X^a$('s) independently represents a substituent that is selected from the group consisting of an unsubstituted alkyl group, a hydroxyl group and a hydrolyzable group,
    each of $R^a$('s) independently represents a substituent that is selected from the group consisting of a halogen atom, a hydroxyl group, a mercapto group, a carboxyl group, an epoxy group, an alkenyl group, an acyloxy group, an alkoxycarbonyl group, an aryloxycarbonyl group, a carbamoyl group, an acylamino group and an isocyanate group, and that may be further substituted, and
    m represents an integer of 1 to 3.

11. A polarizing plate comprising:
    a polarizing film; and
    protective films provided on both sides of the polarizing film,
    wherein at least one of the protective films is the antireflection laminate according to claim 1.

12. An image display device comprising:
    the polarizing plate according to claim 11 on a viewing side of a display screen of the image display device.

13. An image display device comprising:
    the antireflection laminate according to claim 1 on a viewing side of a display screen of the image display device.

* * * * *